(12) United States Patent
Podolskiy et al.

(10) Patent No.: US 7,421,178 B2
(45) Date of Patent: Sep. 2, 2008

(54) LEFT-HANDED MATERIALS AND STRUCTURES BASED ON STRONG DIELECTRIC ANISOTROPY

(76) Inventors: Viktor A. Podolskiy, 900 SW. Ceterpointe Dr., K-101, Corvallis, OR (US) 97333; Evgueni E. Narimanov, 120 Prospect Ave., Apt. L-1, Princeton, NJ (US) 08540

( * ) Notice: Subject to any disclaimer, the term of this patent is extended or adjusted under 35 U.S.C. 154(b) by 0 days.

(21) Appl. No.: 11/434,364

(22) Filed: May 12, 2006

(65) Prior Publication Data
US 2006/0257090 A1 Nov. 16, 2006

Related U.S. Application Data

(60) Provisional application No. 60/681,077, filed on May 13, 2005.

(51) Int. Cl.
*G02B 6/10* (2006.01)
(52) U.S. Cl. .................. 385/129; 385/14; 385/130; 385/131; 385/132; 385/141
(58) Field of Classification Search .................... 385/14, 385/129–132, 141
See application file for complete search history.

(56) References Cited

U.S. PATENT DOCUMENTS

| 4,563,397 | A | | 1/1986 | Ishiguro et al. | |
|---|---|---|---|---|---|
| 4,808,279 | A | | 2/1989 | Moskovits et al. | |
| 5,978,539 | A | * | 11/1999 | Davies et al. | 385/129 |
| 2003/0042487 | A1 | * | 3/2003 | Sarychev et al. | 257/53 |
| 2005/0161630 | A1 | * | 7/2005 | Chui et al. | 252/62.51 R |
| 2005/0221128 | A1 | * | 10/2005 | Kochergin | 428/824 |

OTHER PUBLICATIONS

Agranovich et al., "Linear and nonlinear wave propagation in negative refraction metamaterials," *Physical Review B.*, vol. 69, pp. 165112-1 to 165112-7 (2004).

AlMawlawi et al., "Magnetic properties of Fe deposited into anodic aluminum oxide pores as a function of particle size," *J. Appl. Phys.*, vol. 70, No. 8, pp. 4421-4425 (1991).

Alù et al., "An Overview of Salient Properties of Planar Guided-Wave Structures with Double-Negative (DNG) and Single-Negative (SNG) Layers," in *Negative-Refraction Metamaterials: Fundamental Principles and Applications*, Ch. 9, pp. 339-380 (2005).

(Continued)

*Primary Examiner*—Brian Healy
*Assistant Examiner*—Hung Lam
(74) *Attorney, Agent, or Firm*—Klarquist Sparkman, LLP

(57) ABSTRACT

Disclosed herein are exemplary embodiments of materials and structures that have a negative refractive index. For example, one exemplary embodiment is a waveguide structure comprising a first waveguide border element having a first substantially planar surface, and a second waveguide border element spaced apart from the first waveguide border element and having a second substantially planar surface. This exemplary embodiment further comprises a core material positioned between the first substantially planar surface and the second substantially planar surface. The core material has a positive in-plane dielectric constant and a negative perpendicular-to-plane dielectric constant. Furthermore, the first waveguide border element, the second waveguide border element, and the core material form a waveguide exhibiting a negative index of refraction for electromagnetic radiation in a frequency range.

47 Claims, 23 Drawing Sheets

OTHER PUBLICATIONS

Alù et al., "Guided Modes in a Waveguide Filled With a Pair of Single-Negative (SNG), Double-Negative (DNG), and/or Double-Positive (DPS) Layers," *IEEE Trans. on Microwave Theory and Techniques*, vol. 52, No. 1, pp. 199-210 (Jan. 2004).

Belov et al., "Strong spatial dispersion in wire media in the very large wavelength limit," *Physical Review B*, vol. 67, pp. 113103-1 to 113103-4 (2003).

Belov et al., "Subwavelength metallic waveguides loaded by uniaxial resonant scatterers," *Physical Review E*, vol. 72, pp. 036618-1 to 036618-11 (2005).

Boyle et al., "Far Infrared Studies of Bismuth," *Physical Review*, vol. 120, No. 6, pp. 1943-1949 (Dec. 15, 1960).

Brekhovskikh, Chapter 7, "Exact Theory of Waveguide Propagation in Continuously Layered Media. Normal Modes," and Chapter 8, "Propagation of Waves in a Waveguide That Is Inhomogeneous Along Its Route," *Waves in Layered Media*, Second Edition, Academic Press, Inc., pp. 409-462 (1980).

Brown et al., "Second-order resonant Raman spectra of single-walled carbon nanotubes," *Physical Review B.*, vol. 61, No. 11, pp. 7734-7742 (Mar. 15, 2000).

Caswell et al., "Seedless, Surfactantless Wet Chemical Synthesis of Silver Nanowires," *Nano Letters*, vol. 3, No. 5, pp. 667-669 (2003).

Charnay et al., "Reduced Symmetry Metallodielectric Nanoparticles: Chemical Synthesis and Plasmonic Properties," *Journal of Physical Chemistry B*, vol. 107, pp. 7327-7333 (2003).

Cubukcu et al., "Electromagnetic waves—Negative refraction by photonic crystals," *Nature*, vol. 423, pp. 604-605 (Jun. 5, 2003).

Cubukcu et al., "Subwavelength Resolution in a Two-Dimensional Photonic-Crystal-Based Superlens," *Physical Review Letters*, vol. 91, No. 20, pp. 207401-1 to 207401-4 (2003).

Cui et al., "Nanowire Nanosensors for Highly Sensitive and Selective Detection of Biological and Chemical Species," *Science*, vol. 293, p. 1289-1292 (Aug. 17, 2001).

Darmanyan et al., "Nonlinear surface waves at the interfaces of left-handed electromagnetic media," *Physical Review E*, vol. 72, pp. 036615-1 to 036615-6 (2005).

Declaration of Viktor Podolskiy, dated Jul. 5, 2007, and Attached Exhibit A.

Diggle et al., "Anodic Oxide Films on Aluminum," *Chem. Rev.* 69, 365-405 (1969).

Doyle et al., "The influence of particle shape on dielectric enhancement in metal-insulator composites," *J. Appl. Phys.*, vol. 71, No. 8, pp. 3926-3936 (1992).

Draine et al., "Beyond Clausius-Mossotti: Wave Propagation on a Polarizable Point Lattice and the Discrete Dipole Approximation," *Astrophysical Journal*, vol. 405, pp. 685-697 (Mar. 10, 1993).

Draine et al., "Discrete-dipole approximation for scattering calculations," *J. Opt. Soc. Am. A*., vol. 11, pp. 1491-1499 (1994).

Draine, "The Discrete-Dipole Approximation and its Application to Interstellar Graphite Grains," *Astrophysical Journal*, vol. 333, pp. 848-872 (1988).

Ducourtieux et al., "Near-field optical studies of semicontinuous metal films," *Physical Review B*, vol. 64, pp. 165403-1 to 165403-14 (2001).

Edel'man, "Electrons in bismuth," *Advances in Physics*, vol. 25, pp. 555-613 (1976).

Efros et al., "Dielectric photonic crystal as medium with negative electric permittivity and magnetic permeability," *Solid State Communications*, vol. 129, pp. 643-647 (2004).

Fang et al., "Sub-Diffraction-Limited Optical Imaging with a Silver Superlens," *Science*, vol. 308, pp. 534-537 (2005).

Foteinopoulou et al., "Refraction in Media with a Negative Refractive Index," *Physical Review Letters*, vol. 90, No. 10, pp. 107402-1 to 107402-4 (Mar. 2003).

Friedman et al., "Mean Free Path of Carriers in Bismuth at 4.2° K," *Am. Phys. Soc.*, Ser. II, vol. 4, p. 168 (1959).

Garnett, "Colours in Metal Glasses and in Metallic Films," *Philos. Trans. R. Soc. London*, Ser. A., vol. 203, pp. 385-420 (1904).

Govyadinov et al., "Meta-material photonic funnels for sub-diffraction light compression and propagation," downloaded from arXiv:physics/0512189v1, 4 pp. (document marked Dec. 21, 2005).

Grbic et al., "Overcoming the Diffraction Limit with a Planar Left-Handed Transmission-Line Lens," *Physical Review Letters*, vol. 92, No. 11, pp. 117403-1 to 117403-4 (Mar. 2004).

Han et al., "Transition Metal Oxide Core-Shell Nanowires: Generic Synthesis and Transport Studies," *Nanoletters*, vol. 4, No. 7, pp. 1241-1246 (2004).

Haynes et al., "Nanoparticle Optics: The Importance of Radiative Dipole Coupling in Two-Dimensional Nanoparticle Arrays," *Journal of Physical Chemistry B*, vol. 107, pp/ 7337-7342 (2003).

Haynes et al., "Plasmon-Sampled Surface-Enhanced Raman Excitation Spectroscopy," *Journal of Physical Chemistry B*, vol. 107, pp. 7426-7433 (2003).

Iyer et al., "Experimental and theoretical verification of focusing in a large, periodically loaded transmission line negative refractive index metamaterial," *Optics Express*, vol. 11, No. 7, pp. 696-708 (Apr. 2003).

Jackson, "Waveguides, Resonant Cavities, and Optical Fibers," in *Classical Electrodynamics*, Ch. 8, pp. 352-396 (1999).

Jin et al., "Controlling anisotropic nanoparticle growth through plasmon excitation," *Nature*, vol. 425, pp. 487-490 (Oct. 2003).

Jin et al., "Photoinduced Conversion of Silver Nanospheres to Nanoprisms," *Science*, vol. 294, pp. 1901-1903 (Nov. 2001).

Kawai et al., "Magnetic Properties of Anodic Oxide Coatings on Aluminum Containing Electrodeposited Co and Co-Ni," *Journal of Electrochemical Society*, vol. 122, pp. 32-36 (1975).

Kawai et al., "Recent Developments in Perpendicular Recording on Magnetic Anodized Films of Aluminum," *Proc. of the Symposium on Electrochemical Technology in Electronics*, vol. 88-23, pp. 389-400 (1987).

Kawai et al., "Recording Characteristics of Anodic Oxide Films on Aluminum Containing Electrodeposited Ferromagnetic Metals and Alloys," *Journal of Electrochemical Society*, vol. 123, No. 7, pp. 1047-1051 (Jul. 1976).

Keller et al., "Structural Features of Oxide Coatings on Aluminum," *J. Electrochem. Soc.*, vol. 100, pp. 411-419 (1953).

Kittel, "Plasmons, Polaritons, and Polarons," in *Introduction to Solid State Physics*, Ch. 10, pp. 254-288 (1976).

Krecmer et al., "Reversible Nanocontraction and Dilation in a Solid Induced by Polarized Light," *Science*, vol. 277, pp. 1799-1802 (Sep. 1997).

Lagarkov et al., "Electromagnetic properties of composites containing elongated conducting inclusions," *Physical Review B*, vol. 53, No. 10, pp. 6318-6336 (1996).

Lakhtakia et al., "The role of anisotropy in the Maxwell Garnett and Bruggeman formalisms for uniaxial particulate composite media," *J. Phys. D: Appl. Phys.*, vol. 30, pp. 230-240 (1997).

Landau et al., *Physical Kinetics, Course of Theoretical Physics*, vol. 10, pp. 161-167 (1984).

Landau et al., *Electrodynamics of Continuous Media, Course of Theoretical Physics*, vol. 8, pp. 39-44, 283, 289, 293-300, 304-308, 313-319, 333-340 (2000).

Levy et al., "Maxwell Garnett theory for mixtures of anisotropic inclusions: Application to conducting polymers," *Physical Review B.*, vol. 56, No. 13, pp. 8035-8046 (1997).

Li et al., "Highly-ordered carbon nanotube arrays for electronics applications," *Applied Physics Letters*, vol. 75, No. 3, pp. 367-369 (Jul. 1999).

Lieber, "Nanoscale Science and Technology: Building a Big Future from Small Things," *MRS Bulletin*, vol. 28, No. 7, pp. 486-491 (2003).

Linden et al., "Magnetic Response of Metamaterials at 100 Terahertz," *Science*, vol. 306, pp. 1351-1353 (Nov. 2004).

Lu et al., "Experimental demonstration of negative refraction imaging in both amplitude and phase," *Optics Express*, vol. 13, No. 6, pp. 2007-2012 (Mar. 2005).

Maier et al., "Local detection of electromagnetic energy transport below the diffraction limit in metal nanoparticle plasmon waveguides," *Nature Materials*, vol. 2, pp. 229-232 (2003).

Martin, "Nanomaterials: A Membrane-Based Synthetic Approach," *Science*, vol. 266, pp. 1961-1966 (1994).

Masuda et al., "Ordered Metal Nanohole Arrays Made by a Two-Step Replication of Honeycomb Structures of Anodic Alumina," *Science*, vol. 268, pp. 1466-1468 (1995).

Merlin, "Analytical solution of the almost-perfect-lens problem," *Applied Physics Letters*, vol. 84, No. 8, pp. 1290-1292 (Feb. 2004).

Milton, Chapter 7, Assemblages of spheres, ellipsoids, and other neutral inclusions, Chapter 8, "Tricks for generating other exactly solvable microgeometries," and Chapter 9, "Laminate materials," in *The Theory of Composites*, pp. 113-183 (2002).

Murphy et al., "Synthesis, Assembly and Reactivity of Metallic Nanorods," *Chemistry of Nanomaterials*, pp. 285-307 (2004).

*Nanoscale Linear and Nonlinear Optics, AIP Conference Proceedings Series*, vol. 560, pp. 1-364, 377-448 (M. Bertolotti ed., 2001).

Notomi, "Theory of light propagation in strongly modulated photonic crystals: Refractionlike behavior in the vicinity of the photonic band gap," *Physical Review B*, vol. 62, No. 16, pp. 10696-10705 (Oct. 2000).

O'Brien et al., "Near-infrared photonic band gaps and nonlinear effects in negative magnetic metamaterials," *Physical Review B*, vol. 69, pp. 241101-1 to 241101-4 (2004).

Palik, *Handbook of Optical Constants of Solids*, pp. 286-287, 350-351 (1997).

Parazzoli et al., "Experimental Verification and Simulation of Negative Index of Refraction Using Snell's Law," *Physical Review Letters*, vol. 90, No. 10, pp. 107401-1 to 107401-4 (2003).

Parimi et al., "Imaging by flat lens using negative refraction," *Nature*, vol. 426, p. 404 (Nov. 2003).

Park et al., "Mechanically tunable photonic crystal structure," *Applied Physics Letters*, vol. 85, No. 21, pp. 4845-4847 (Nov. 2004).

Pendry et al., "Extremely Low Frequency Plasmons in Metallic Mesostructures," *Physical Review Letters*, vol. 76, No. 25, pp. 4773-4776 (Jun. 1996).

Pendry, "Negative Refraction Makes a Perfect Lens," *Physical Review Letters*, vol. 85, No. 18, pp. 3966-3969 (Oct. 2000).

Pendry, "Positively negative," *Nature*, vol. 423, pp. 22-23 (May 2003).

Pendry, "Perfect cylindrical lenses," *Optics Express*, vol. 11, No. 7, pp. 755-760 (2003).

Pendry et al., "Reversing Light With Negative Refraction," *Physics Today*, vol. 57, No. 6, pp. 37-43 (Jun. 2004).

Peumans et al., "Small molecular weight organic thin-film photodetectors and solar cells," *J. Appl. Phys.*, vol. 93, No. 7, pp. 3693-3723 (Apr. 2003).

Pipino et al., "Surface-enhanced second-harmonic diffraction: Selective enhancement by spatial harmonics," *Physical Review B*, vol. 49, No. 12, pp. 8320-8330 (Mar. 1994).

Podolskiy et al., "Nanoplasmonic approach to strongly anisotropic optical materials," *Conference on Lasers and Electro-optics/Quantum Electronics Conference/Photonics Application Systems Technologies*, OSA Trends in Optics and Photonics Series Optical Society of America, paper JThC3, 3 pp. (May 12, 2005).

Podolskiy et al., "Near-sighted superlens," *Optics Letters*, vol. 30, No. 1, pp. 75-77 (Jan. 2005).

Podolskiy et al., "Nanostructured non-magnetic left-handed composites," 4 pp. (also published as Podolskiy et al., "Nanostructured non-magnetic left-handed composites," vol. 1A, pp. 43-46 (Dec. 12, 2005)).

Podolskiy et al., "Optimizing the superlens: Manipulating geometry to enhance the resolution," *Applied Physics Letters*, vol. 87, pp. 231113-1 to 231113-3 (Dec. 2005).

Podolskiy et al., "Plasmon Modes in Metal Nanowires and Left-Handed Materials," *Journal of Nanolinear Optical Physics and Materials*, vol. 11, No. 1, pp. 65-74 (2002).

Podolskiy et al., "Plasmon modes and negative refraction in metal nanowire composites," *Optics Express*, vol. 11, No. 7, pp. 735-745 (2003).

Podolskiy et al., "Resonant light interaction with plasmonic nanowire systems," *Journal of Optics A: Pure and Applied Optics*, vol. 7, pp. S32-S37 (Jan. 2005).

Podolskiy et al., "Strongly anisotropic media: the THz perspectives of left-handed materials," *Journal of Modern Optics*, vol. 52, No. 16, pp. 2343-2349 (Nov. 2005).

Podolskiy et al., "Strongly anisotropic waveguide as a nonmagnetic left-handed system," *Physical Review B*, vol. 71, pp. 201101-1 to 201101-4 (May 24, 2005).

Pokrovsky et al., "Electrodynamics of Metallic Photonic Crystals and the Problem of Left-Handed Materials," *Physical Review Letters*, vol. 89, No. 9, pp. 93901-1 to 93901-4 (Aug. 2002).

Pokrovsky et al., "Lens based on the use of left-handed materials," *Applied Optics*, vol. 42, No. 28, pp. 5701-5705 (Oct. 2003).

Pokrovsky et al., "New type of lenses based upon left-handed materials," 7 pp. (document marked Dec. 12, 2002).

Pokrovsky et al., "Nonlocal electrodynamics of two-dimensional wire mesh photonic crystals," *Physical Review B*, vol. 65, pp. 45110-1 to 45110-8 (2002).

Purcell et al., "Scattering and Absorption of Light by Nanospherical Dielectric Grains," *Astrophysical Journal*, vol. 186, pp. 705-714 (1973).

Qin et al., "Magnetic force microscopy of magnetic domain structure in highly ordered Co nanowire arrays," *Chemical Physics Letters*, vol. 350, pp. 51-56 (Dec. 2001).

Rabin et al., "Formation of Thick Porous Anodic Alumina Films and Nanowire Arrays on Silicon Wafers and Glass," *Advanced Functional Materials*, vol. 13, No. 8, pp. 631-638 (Aug. 2003).

Reneker, "New Oscillatory Absorption of Ultra-Sonic Waves in Bismuth in a Magnetic Field," *Physical Review Letters*, vol. 1, No. 12, pp. 440-442 (Dec. 1958).

Reneker, "Ultrasonic Attenuation in Bismuth at Low Temperatures," *Physical Review*, vol. 115, No. 2, pp. 303-313 (Jul. 1959).

Samuelson et al., "Semiconductor nanowires for novel one-dimensional devices," *Physica E*, vol. 21, pp. 560-567 (2004).

Sarychev et al., "Electrodynamics of metal-dielectric composites and electromagnetic crystals," *Physical Review B*, vol. 62, No. 12, pp. 8531-8539 (Sep. 2000).

Sarychev et al., "Magnetic Resonance in Metal Nanoantennas," *Proc. SPIE*, vol. 5508, pp. 128-137 (2004).

Sarychev et al., "Optical properties of metal nanowires," *Proc. SPIE*, vol. 5219, pp. 92-98 (Aug. 2003).

Sarychev et al., "Resonance Transmittance Through a Metal Film With Subwavelength Holes," *IEEE J. Quantum Electron.*, vol. 38, pp. 956-963 (Jul. 2002).

Sauer et al., "Highly ordered monocrystalline silver nanowire arrays," *J. Appl. Phys.*, vol. 91, No. 5, pp. 3243-3247 (Mar. 2002).

Schurig et al., "Spatial filtering using media with indefinite permittivity and permeability tensors," *Applied Physics Letters*, vol. 82, No. 14, pp. 2215-2217 (Apr. 2003).

Shadrivov et al., "Nonlinear surface waves in left-handed materials," *Physical Review E*, vol. 69, pp. 16617-1 to 16617-9 (2004).

Shalaev et al., "Negative index of refraction in optical metamaterials," *Optics Letters*, vol. 30, No. 24, pp. 3356-3358 (Dec. 2005).

Shalaev, "Electromagnetic Properties of Random Composites. A Review of Basic Approaches," in *Nonlinear Optics of Random Media*, Ch. 1, pp. 1-14 (2002).

Shelimov et al., "Composite Nanostructures Based on Template-Grown Boron Nitride Nanotubules," *Chem. Mater.*, vol. 12, pp. 250-254 (2000).

Shvets, "Applications of surface plasmon and phonon polaritons to developing left-handed materials and nano-lithography," *Proc. SPIE*, vol. 5221, pp. 124-132 (2003).

Shvets et al., "Electric and magnetic properties of sub-wavelength plasmonic crystals," *Journal of Optics A: Pure and Applied Optics*, vol. 7, pp. S23-S31 (2005).

Shvets et al., "Electromagnetic properties of three-dimensional wire arrays: photons, plasmons, and equivalent circuits," *Proc. SPIE*, vol. 5218, pp. 156-165 (2003).

Shvets et al., "Engineering the Electromagnetic Properties of Periodic Nanostructures Using Electrostatic Resonances," *Physical Review Letters*, vol. 93, pp. 243902-1 to 243902-4 (Dec. 2004).

Shvets, "Photonic approach to making a material with a negative index of refraction," *Physical Review B*, vol. 67, pp. 35109-1 to 35109-8 (2003).

Smith et al., "Composite Medium with Simultaneously Negative Permeability and Permittivity," *Physical Review Letters*, vol. 84, No. 18, pp. 4184-4187 (May 2000).

Smith et al., "Limitations on subdiffraction imaging with a negative refractive index slab," *Applied Physics Letters*, vol. 82, No. 10, pp. 1506-1508 (Mar. 2003).

Smith et al., "Negative Refractive Index in Left-Handed Materials," *Physical Review Letters*, vol. 85, No. 14, pp. 2933-2936 (Oct. 2000).

Smolyaninov et al., "Far-Field Optical Microscopy with a Nanometer-Scale Resolution Based on the In-Plane Image Magnification by Surface Plasmon Polaritons," *Physical Review Letters*, vol. 94, pp. 57401-1 to 57401-4 (Feb. 2005).

Smolyaninov et al., "Immersion microscopy based on photonic crystal materials," 23 pp. (document marked May 13, 2005).

Spitzer et al., "Infrared Properties of Hexagonal Silicon Carbide," *Physical Review*, vol. 113, No. 1, pp. 127-132 (Jan. 1959).

Stockman, "Nanofocusing of Optical Energy in Tapered Plasmonic Waveguides," *Physical Review Letters*, vol. 93, No. 13, pp. 137404-1 to 137404-4 (Sep. 2004).

Thompson et al., "Nucleation and growth of porous anodic films on aluminum," *Nature*, vol. 272, pp. 433-435 (1978).

Veselago, "The Electrodynamics of Substances with Simultaneously Negative Values of E and μ," *Soviet Physics Uspekhi*, vol. 10, pp. 509-514 (1968).

Webb et al., "Metrics for negative-refractive-index materials," *Physical Review E*, vol. 70, pp. 35602-1 to 35602-4 (2004).

Wu et al., "Conducting Carbon Wires in Ordered, Nanometer-Sized Channels," *Science*, vol. 266, pp. 1013-1015 (1994).

Wu et al., "Terahertz plasmonic high pass filter," *Applied Physics Letters*, vol. 83, No. 1, pp. 201-203 (Jul. 2003).

Yeh et al., "Electromagnetic propagation in periodic stratified media. I. General theory," *J. Opt. Soc. Am.*, vol. 67, pp. 423-438 (1977).

Yen et al., "Terahertz Magnetic Response from Artificial Materials," *Science*, vol. 303, pp. 1494-1496 (Mar. 2004).

Zhao et al., "The Extinction Spectra of Silver Nanoparticle Arrays: Influence of Array Structure on Plasmon Resonance Wavelength and Width," *Journal of Physical Chemistry B.*, vol. 107, pp. 7343-7350 (2003).

Ziolkowski et al., "Wave propagation in media having negative permittivity and permeability," *Physical Review E*, vol. 64, pp. 56625-1 to 56625-15 (2001).

\* cited by examiner

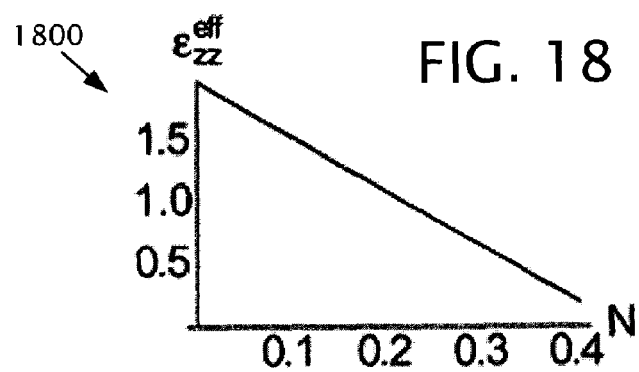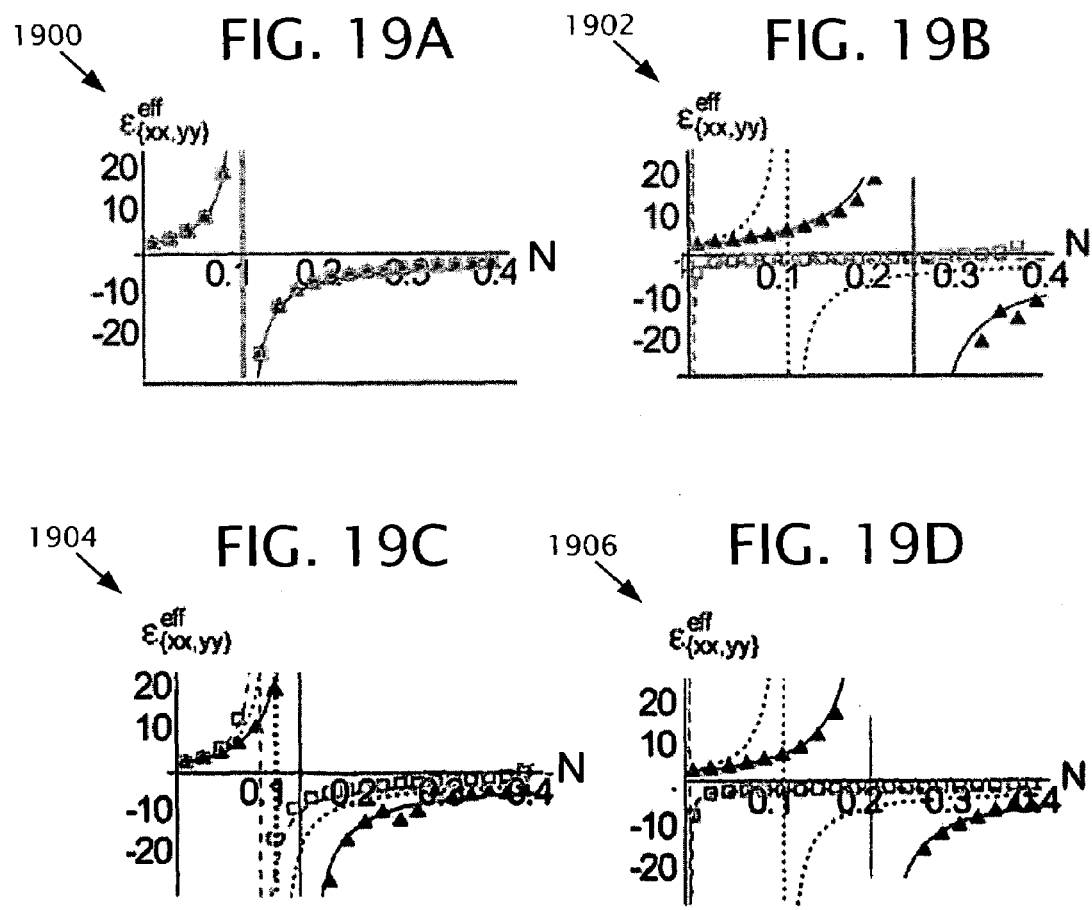

LEFT-HANDED MATERIALS AND STRUCTURES BASED ON STRONG DIELECTRIC ANISOTROPY

CROSS-REFERENCE TO RELATED APPLICATIONS

This application claims the benefit of U.S. Provisional Patent Application No. 60/681,077 filed May 13, 2005, which is hereby incorporated herein by reference.

ACKNOWLEDGMENT OF GOVERNMENT SUPPORT

This invention was made with government support under DMR-0134736 and ECS-0400615 awarded by the National Science Foundation. The government has certain rights in the invention.

FIELD

This application relates generally to the field of materials having negative indexes of refraction, sometimes referred to as "left-handed materials."

BACKGROUND

In 1968, Victor Veselago predicted that media with simultaneously negative dielectric permittivity and magnetic permeability would have an effective refractive index with a negative value. In the same work, he suggested that in such a material all physical phenomena directly related to phase velocity would be reversed. Specifically, the reversal of Snell's law, Cherenkov's radiation, and the Doppler effect were predicted. The characteristic of having simultaneously negative dielectric permittivity and magnetic permeability values creates several challenges in the design and fabrication of so-called negative index materials (NIMs). For example, although negative dielectric constants can be found in a variety of plasmonic materials (e.g., Ag, Au, Cu, and the like) or polar materials (e.g, SiC) materials, no naturally occurring substance is known to exhibit magnetism at sufficiently high frequencies (GHz to optical).

A variety of resonant structures have been proposed to obtain the nontrivial value of magnetic permeability desired in NIMs. However, the intrinsic presence of a resonance in these structures leads to extremely high (resonant) losses in the NIM. Another drawback of the resonant-based designs is their high sensitivity to fabrication defects.

Photonic crystals have also been shown to have a negative value of effective refractive index in the GHz frequency range. Because the typical size of inhomogeneity in these structures is on the order of the wavelength, however, the value of the effective dielectric constant strongly depends on the direction of light propagation. Such an anisotropy of the refraction index produces severe deterioration in image quality in a photonic crystal-based NIM lens, and makes subwavelength resolution in these systems practically unachievable. Furthermore, the crystalline nature of the material requires extremely high accuracy during the fabrication step, thus limiting the possible NIM structures to the GHz-frequency domain.

Accordingly, there is a need for new structures exhibiting a negative refractive index and methods for manufacturing such structures.

SUMMARY

Disclosed below are representative embodiments of materials and structures that have a negative refractive index (also known as "left-handed" materials (LHMs) or structures or as "negative-index materials" (NIM) or structures). Also described are exemplary methods for making such materials and structures, and exemplary environments and applications for the disclosed embodiments. The described materials and structures, and methods for making and using such materials and structures, should not be construed as limiting in any way.

One exemplary embodiment is a waveguide structure comprising a first waveguide border element having a first substantially planar surface, and a second waveguide border element spaced apart from the first waveguide border element and having a second substantially planar surface. This exemplary embodiment further comprises a core material positioned between the first substantially planar surface and the second substantially planar surface. The core material has a positive in-plane dielectric constant and a negative perpendicular-to-plane dielectric constant. Furthermore, the first waveguide border element, the second waveguide border element, and the core material form a waveguide exhibiting a negative index of refraction for electromagnetic radiation in a frequency range. In certain implementations, the waveguide of this embodiment (or any embodiment disclosed herein) exhibits the negative index of refraction for electromagnetic radiation in the frequency range of about $1\times10^9$ Hz to $1\times10^{15}$ Hz (e.g., $3\times10^{12}$ Hz to $7.5\times10^{14}$ Hz) or in the wavelength range of about $1\times10^{-7}$ m to $1\times10^{-1}$ m. The core material can comprise a composite of inclusions having a negative dielectric constant embedded in a host material having a positive dielectric constant. The core material may comprise inclusions distributed substantially homogenously in a host medium, substantially spheroidal inclusions anisotropically distributed in a host material, substantially wire-shaped inclusions having major axes that are substantially aligned with one another in a host material, or a material with an anisotropic effective electron mass. The core material may also comprise a layered structure. At least some of the layers of the layered structure may have thicknesses that are less than the wavelengths in the frequency range. At least two of the layers may contain materials with respective dielectric constants having opposite signs for at least one polarization of electromagnetic radiation. In certain implementations, at least one of the waveguide border elements is solid, liquid, gaseous, or a vacuum.

Another disclosed embodiment is a waveguide configured to propagate electromagnetic radiation in a waveguide plane. This embodiments comprises a core having opposing substantially planar surfaces and a positive magnetic permeability. In this embodiment, the thickness of the core is selected such that the core exhibits a negative refractive index for incident electromagnetic waves in a desired frequency range. The core can have a positive dielectric constant in the selected frequency range in directions substantially parallel to the waveguide plane, and a negative dielectric constant in the selected frequency range in directions substantially perpendicular to the waveguide plane. The core can also comprise a material with an anisotropic effective electron mass, nanowire inclusions in a host material, or interchanging layers of materials having a negative dielectric constant and materials having a positive dielectric constant.

Another disclosed embodiment is a composite comprising a host medium and a plurality of anisotropically-shaped inclusions embedded in the host medium. In this embodiment, the inclusions are substantially oriented in a common direction such that the composite exhibits a positive dielectric constant along a first plane and a negative dielectric constant along a second plane perpendicular to the first plane for incident electromagnetic radiation within a range of wavelengths. Further, the inclusions and the host medium of this embodiment have positive magnetic permeabilities. In some implementations, the composite is a substantially planar slab sandwiched between two conductive planar surfaces. Further, in certain implementations, the inclusions have a negative dielectric constant and the host medium has a positive dielectric constant. The inclusions can be formed from either a plasmonic material or doped semiconductor (e.g., gold, silver, copper, aluminum, and/or silicon carbide), and the host medium can be substantially a dielectric. Further, in certain implementations, the inclusions are substantially wire-shaped. The composite can be part of a structure having a negative index of refraction for electromagnetic radiation frequencies in the range (e.g., a lens).

Another disclosed embodiment is a composite comprising a host medium, and a plurality of isotropically-shaped inclusions embedded in the host medium. In certain implementations, the inclusions are anisotropically distributed throughout the host medium such that the composite exhibits a positive dielectric constant along a first plane and a negative dielectric constant along a second plane perpendicular to the first plane for incident electromagnetic radiation within a range of wavelengths. Further, the inclusions and the host medium can have positive magnetic permeabilities. In certain implementations, the inclusions have a negative dielectric constant and the host medium has a positive dielectric constant. The inclusions can be formed from either a plasmonic material, polar materials, or doped semiconductor (e.g., gold, silver, copper, aluminum, or silicon carbide), and the host medium can be substantially a dielectric. In certain implementations, the inclusions comprise apertures in the host medium. Further, in some implementations, the inclusion size is substantially equal to or less than the range of wavelengths. The composite can be part of a structure having a negative index of refraction for electromagnetic radiation frequencies in the range (e.g., a lens).

Yet another disclosed embodiment is a composite comprising a plurality of layers, where the plurality of layers includes a first layer having a positive dielectric constant and a second layer adjacent the first layer that has a negative dielectric constant. In this embodiment, the composite exhibits a positive effective dielectric constant along a first plane and a negative effective dielectric constant perpendicular to the first plane for incident electromagnetic radiation within a range of wavelengths. Further, the respective thicknesses of the first and the second layers are less than the wavelengths in the range of wavelengths. The first layer can be formed from either a plasmonic material or doped semiconductor (e.g., gold, silver, copper, aluminum, or silicon carbide) and the second layer can be formed from substantially a dielectric (e.g., silicon or gallium arsenide). The composite can be part of a structure having a negative index of refraction for electromagnetic radiation frequencies in the range (e.g., a lens).

Any of the disclosed embodiments can be used in a wide variety of imaging, sensing, and communication systems. Further, any of the disclosed embodiments can be used in methods for imaging an object or methods for modifying amplitude and/or phase information of electromagnetic radiation.

The foregoing and other objects, features, and advantages of the disclosed technology will become more apparent from the following detailed description, which proceeds with reference to the accompanying figures.

BRIEF DESCRIPTION OF DRAWINGS

FIG. 18 shows $\in_{\mathit{eff};z}$ for an exemplary nanowire composite as a function of the nanowire concentration.

FIGS. 19A-D of $\in_{xx}^{\mathit{eff}}$ and $\in_{yy}^{\mathit{eff}}$ components for various embodiments of an exemplary structure as in FIG. 13.

DETAILED DESCRIPTION

I. General Considerations

Figure 1:
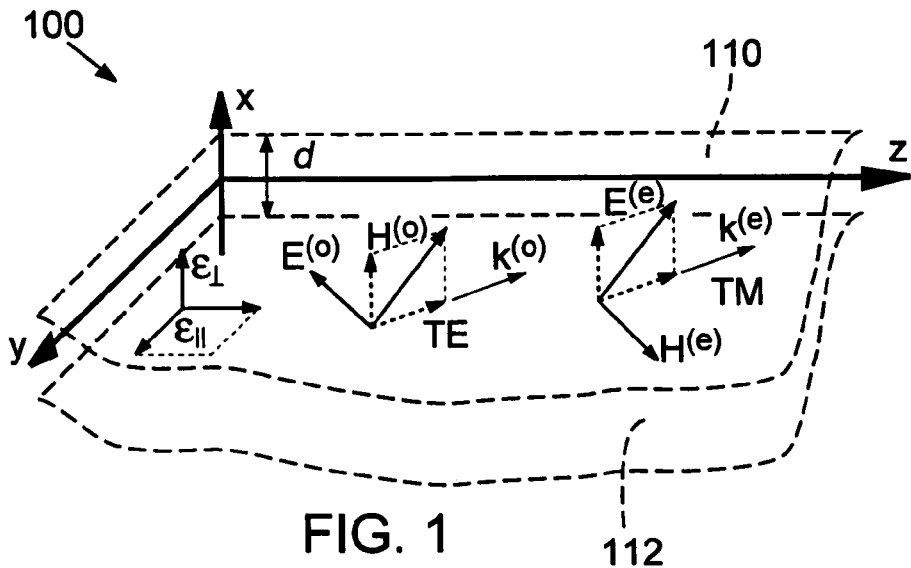
FIG. 1 is a schematic block diagram of an exemplary waveguide architecture as may be used in embodiments of the disclosed-technology.

As used in this application and in the claims, the singular forms "a," "an," and "the" include the plural forms unless the context clearly dictates otherwise. Additionally, the term "includes" means "comprises." Moreover, the terms "planar surface" and "substantially planar surface" refer to surfaces that are generally planar but may include one or more surface deviations or curves that do not significantly alter the mode propagation of electromagnetic radiation through the associated structure.

Disclosed below are representative embodiments of materials and structures that have a negative refractive index (also known as "left-handed" materials (LHMs) or structures or as "negative-index materials" (NIM) or structures). Also described are exemplary methods for making such materials and structures, and exemplary environments and applications for the disclosed embodiments. The described materials and structures, and methods for making and using such materials and structures, should not be construed as limiting in any way. Instead, the present disclosure is directed toward all novel and nonobvious features, aspects, and equivalents of the various disclosed embodiments, alone and in various combinations and sub-combinations with one another. The disclosed technology is not limited to any specific aspect, feature, or combination thereof, nor do the disclosed materials, structures, and methods require that any one or more specific advantages be present or problems be solved. For the sake of simplicity, the attached figures may not show the various ways in which the disclosed apparatus and methods can be used in conjunction with other systems, methods, and apparatus.

The disclosed technology has a number of applications in the fields of optics, imaging, sensing, and communications. For example, the disclosed technology can be used to form a flat lens that can be used in a variety of different display, sensor, or other such applications. For example, the disclosed technology can be implemented as a lightweight, compact, flat lens having a negative index of refraction with little or no spherical aberration. A material or structure having a negative index of refraction (which is substantially matched to the outside dielectric environment) can be used, for instance, for subdiffraction-resolution imaging in the near or far fields. Other applications for the disclosed technology include, but are not limited to, subwavelength, high-resolution imaging for nanolithography. For example, one or more components at least partially comprising embodiments of the disclosed technology can be included in a microlithography system. The materials or structures can also be applied to the field of optical electronics. For instance, optical interconnects at least partially comprising embodiments of the disclosed technology can be used in an optical processor. The materials or structures may also be used in applications where materials having unique optical properties are desirable (e.g., stealth materials used to control or reduce signatures produced by aircraft or other vehicles).

The disclosed technology is not limited, however, to any particular application. For example, embodiments of the disclosed technology can be used as part of any device or system where electromagnetic radiation is desirably managed (e.g., on the nanoscale or microscale). For example, embodiments of the NIM structures can be used in imaging systems to modify or restore amplitude and/or phase information of electromagnetic radiation. It should also be understood that the disclosed technology is not limited to any specific wavelength. For example, the disclosed embodiments or their equivalents can be used, for example, in radio-frequency, THz, infrared, or optical devices.

II. Analytical Description of Exemplary NIM Structures

In this section, exemplary embodiments of NIM structures based on a waveguide architecture are described. Some of the exemplary structures discussed herein comprise a strongly anisotropic dielectric core positioned between two substantially planar waveguide walls, which can be metal or dielectric (including, for example, liquid or gaseous media and vacuums). In certain embodiments, the structures are non-magnetic and non-resonant (that is, non-periodic). Further, certain embodiments can be used at frequencies in the optical and infrared range. Additionally, in contrast to conventional composite resonance-based NIMs, some of the described embodiments can be homogeneous and do not require a resonance to achieve a negative refractive index. In the next section, the theoretical foundation for the exemplary waveguide architecture is discussed, including a derivation of the conditions for its right- and left-handed response and for the excitation of surface waves (polaritons).

A. Theoretical Foundation for Negative Refraction in Exemplary Waveguide Architectures FIG. 1 illustrates the geometry of an exemplary NIM structure. In particular, FIG. 1 shows a substantially planar waveguide 100 parallel to the (y, z) plane of the coordinate system with waveguide boundaries 110, 112 at $x=\pm d/2$. Assume for purposes of this discussion that the material inside the waveguide is non-magnetic (e.g., $\mu=1$), and has an anisotropic uniaxial dielectric constant $\in$, with $\in_x=\in_\perp$ and $\in_y=\in_z=\in_\parallel$. For purposes of this disclosure, the dielectric constant $\in_\parallel$ is sometimes referred to as the "in-plane" dielectric constant, where as the dielectric constant $\in_\perp$ is sometimes referred to as the "perpendicular-to-plane" dielectric constant.

The exemplary structure illustrated in FIG. 1 can support two different kinds of electromagnetic waves. The waves of the first kind have their electric field vector in the (y, z) plane. The propagation of such waves depends on $\in_\parallel$, and is not substantially affected by anisotropy. These waves are also known as "ordinary waves." The waves of the second kind (known as "extraordinary waves") have their magnetic field in the (y, z) plane. Correspondingly, their electromagnetic properties are affected by both $\in_\parallel$ and $\in_\perp$. As is explained below, the ordinary and extraordinary waves are distinct, as they have different dispersion relations and refraction properties.

A wave propagating in the exemplary waveguide 100 of FIG. 1 can be represented as a series of waves having electric and magnetic fields perpendicular to the direction of propagation, known as TE and TM waves, respectively. As the waves propagate through the waveguide 100 of FIG. 1, an extraordinary wave has TM polarization, while an ordinary wave has the TE form.

The $\{x, y, z\}$ components of ordinary $(E^{(o)}, H^{(o)})$ and extraordinary $(E^{(e)}, H^{(e)})$ waves propagating in the (y, z) direction can be represented by the following expressions:

$$E^{(e)} = \left\{ i\frac{k_z^{(e)2}+k_y^{(e)2}}{k_z^{(e)}\varkappa^{(e)2}}\frac{\in_\parallel}{\in_\perp}E_0^{(e)\prime}; \frac{k_y^{(e)}}{k_z^{(e)}}E_0^{(e)}; E_0^{(e)} \right\} \quad (1)$$

$$H^{(e)} = \left\{ 0; i\frac{k\in_\parallel}{\varkappa^{(e)2}}E_0^{(e)\prime}; -i\frac{kk_y^{(e)}\in_\parallel}{k_z^{(e)}\varkappa^{(e)2}}E_0^{(e)\prime} \right\}$$

$$E^{(o)} = \left\{ 0; E_0^{(o)}; -\frac{k_y^{(o)}}{k_z^{(o)}}E_0^{(o)} \right\}$$

$$H^{(o)} = \left\{ -\frac{k_z^{(o)2}+k_y^{(o)2}}{kk_z^{(o)}}E_0^{(o)}; -\frac{ik_y^{(o)}}{kk_z^{(o)}}E_0^{(o)\prime}; -\frac{i}{k}E_0^{(o)\prime} \right\},$$

where $k=\omega/c$, and prime (') denotes the differentiation with respect to x. The field $E_0^{(e|o)}(x, y, z; t)= E_0^{(e|o)}(x)e^{-i\omega t+ik_y^{(e|o)}y+ik_z^{(e|o)}z}$ can be defined from the equation.

$$E_0^{(e|o)\prime\prime} + \varkappa^{(e|o)2}E_0^{(e|o)}=0, \quad (2)$$

with the conventional boundary conditions for tangential (y, z) components of the electric field corresponding to the waveguide walls. For illustrative purposes, perfectly conducting waveguide boundaries are assumed. As explained below with respect to FIG. 2, the theoretical foundation described here can be extended to the case of dielectric walls, where similar effects are exhibited.

Equation (2) yields a series of solutions (modes) defined by the corresponding boundary conditions. For example, for "ideal metal" boundary conditions, Equation (2) yields: $E^{0(e|o)}(x)=A_m^{(e|o)}\cos(\varkappa)$ with $\varkappa=(2m+1)\pi/d$, and $E_0^{(e|o)}(x)=A_m^{(e|o)}\sin(\varkappa)$, with $\varkappa=2m\pi/d$ (where m is an integer number). Note that the structure of the mode in the x direction is described by the parameter $\varkappa$, which for the case of perfectly conducting walls considered here is determined by the waveguide thickness d and does not depend on the dielectric properties of the core. In general, each waveguide mode has its own dispersion relation:

$$k_z^{(e|o)2}+k_y^{(e|o)2}=\in^{(e|o)}v^{(e|o)}k^2; \quad (3)$$

where, $$\in^{(e)}=\in_\perp; \in^{(o)}=\in_\parallel; v^{(e|o)}=1-\varkappa^{(e|o)2}/(\in_\parallel k^2) \quad (4)$$

Note that due to different geometries, the TM and TE modes described herein are somewhat different from the conventional waveguide solutions presented in common textbooks. For discussion purposes, the focus is on a planar waveguide unbounded in the (y, z) plane with a strongly anisotropic core in contrast to bounded in the (x, y) directions by a "tubular" structure with isotropic filling where waves can propagate in the z direction. It is straightforward, however, to obtain the well-known TE ($E_z=0$) and TM ($H_z=0$) "isotropic tubular" solutions as the linear combination of the waves from Equation (2). Also, as an alternative to the formalism-presented herein, the exemplary system can also be described in terms of a generalized dielectric tensor with spatial dispersion. See, e.g., Agranovich, V. M., et al., "Linear and Nonlinear Wave Propagation in Negative Refraction Metamaterials," *Phys. Rev. B.* 69, 165112 (2004).

An arbitrary wave inside the exemplary waveguide 100 illustrated in FIG. 1 can be represented as a linear combination of waveguide modes (corresponding to different values of $\varkappa$). For purposes of presentation, however, this discussion assumes that only a single mode is excited. This assumption does not restrict the generality of the disclosed approach, however, because it does not limit the (y, z) structure of the solutions or their polarization, and different modes of the waveguide do not couple to each other. The generalization of the expressions presented here to the multiple-mode case is straightforward and is readily apparent to one of ordinary skill in the art.

From Equation (3), it can be seen that a propagating solution (described by real $k_z$ and $k_y$) occurs when the corresponding parameters $\in$ and v are of the same sign. The first case where $\in>0$ and $v>0$ results when an isotropic material is inside the planar (transmitting) waveguide. The second case where $\in>0$ and $v<0$ corresponds to the so-called "subcritical waveguide," which does not support propagating modes and reflects all "incident" radiation. The third case where $\in<0$ and $v>0$ can be realized in a waveguide with an isotropic core and describes a perfectly conducting interior, which again does not support the propagation of waves. Finally, the fourth case where $\in<0$ and $v<0$ (and which is the focus of many of the embodiments of this disclosure) can be realized for an extraordinary wave in a strongly anisotropic material. For example, the waveguide 100 illustrated in FIG. 1 is transparent for the TM wave, whereas the TE solution exponentially decays into the structure.

While Equation (3) defines the magnitude of the phase velocity of the mode, the sign of the phase velocity cannot be determined by Equation (3) alone. To define the sign of the phase velocity (and consequently the "handedness" of the media), consider the refraction of a wave at the interface between a transparent isotropic media ("right-handed" media) and a media with $\in<0$ and $v<0$ inside the same waveguide. For this example, assume also that the interface coincides with the coordinate plane $z=0$.

First consider the special case of the normal (z) propagation of a TM-polarized wave. Since in such a wave $H_z=H_x=0$, neither refracted nor reflected ordinary waves are excited. Since for $k_y=0$, the components $H_y$ and $E_x$ are related to each other by $H_y=((k\in_\perp)/k_z)E_x$ (see Equation (2)), the requirement for continuity of tangential fields across the boundary $z=0$ shows that the sign of $k_z$ should coincide with that of $\in_\perp$. This indicates that media with $\in<0$ and $v<0$ are left-handed.

Figure 2:
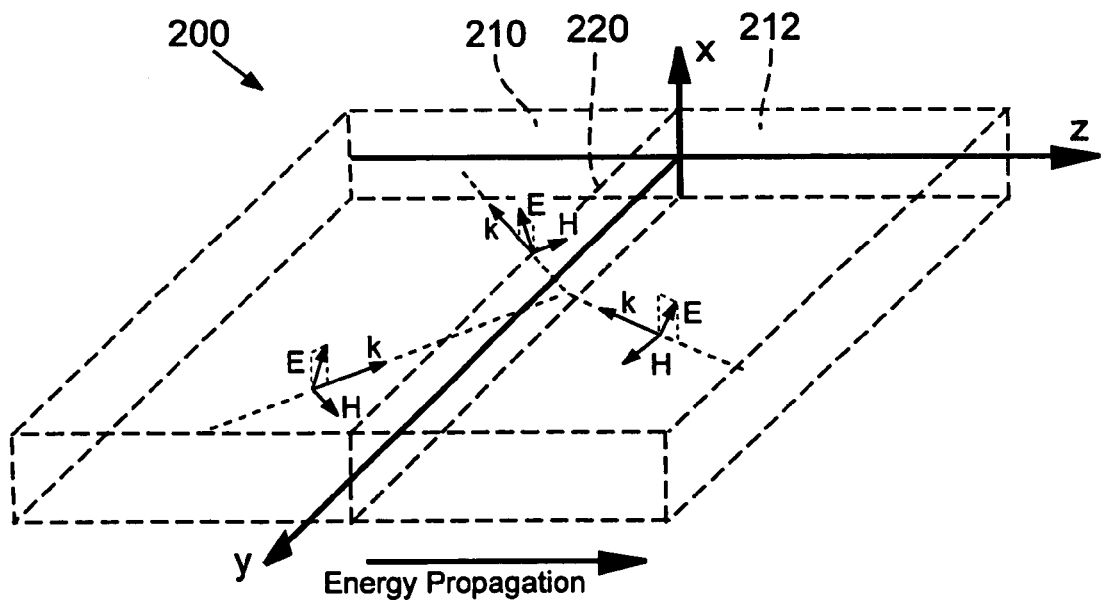
FIG. 2 is a schematic block diagram of an exemplary waveguide having a planar slab of right-handed media adjacent to a planar slab of left-handed media.

The analysis of a general case of an obliquely incident wave (illustrated in FIG. 2) is more complicated because, in general, an ordinary reflected wave is also excited, and the direction of the refracted (extraordinary) wave should be determined by the causality principle. See, e.g., Landau, L. D., et al., *Course of Theor. Phys.*, vol, 8, 2nd ed., Reed Ltd. (1984). In particular, FIG. 2 is a schematic illustration of an exemplary waveguide 200 having a substantially planar slab of right-handed media 210 adjacent to a substantially planar slab of left-handed media 212. FIG. 2 shows the refraction of an exemplary TM wave at a right-hand medium (RHM)/left-hand medium (LHM) interface 220 (note that the ordinary wave is not shown). The analysis of the incident TM wave can be performed, for instance, using 3-D numerical calculations. For example, the fields can be represented as a series of waveguide modes as described above and use a full set of boundary conditions for E and H fields to find the necessary coefficients. Further, an assertion may be made that the wave propagating in the real (absorbing) media decays in the direction of its propagation.

Figure 3A:
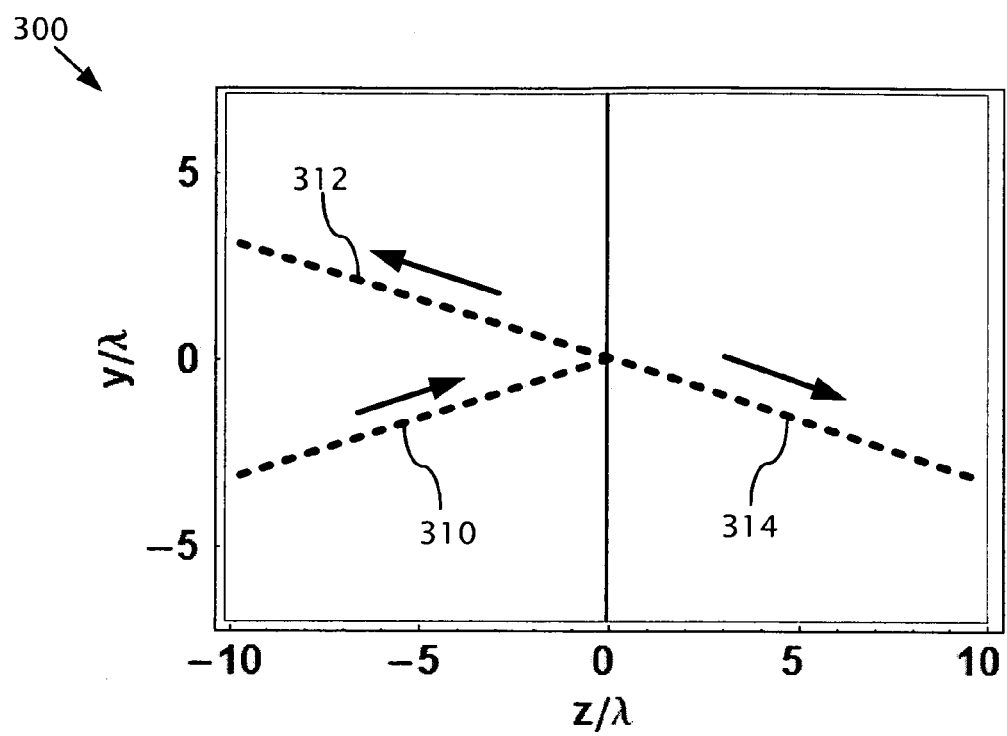
FIG. 3A is a diagram showing the results of numerical calculations of the refraction of a wave in the exemplary waveguide of FIG. 2 with perfectly conducting walls.
Figure 3B:
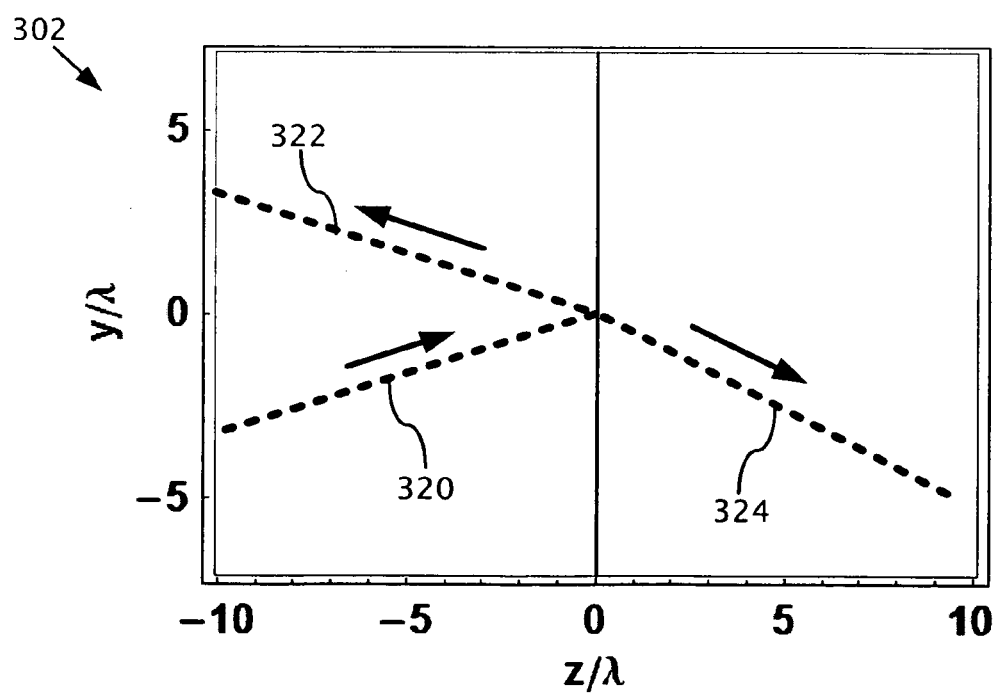
FIG. 3B is a diagram showing the results of numerical calculations of the refraction of a wave in the exemplary waveguide of FIG. 2 with walls having a finite conductance.

Results for the example in FIG. 2 are shown in FIGS. 3A-B. In particular, FIG. 3A is a diagram 300 showing the results of numerical calculations of the refraction of the mode in an exemplary planar waveguide with perfectly conducting walls, where $\varkappa=k/2$, RHM parameters (z<0) $\in=v=1/2+0.002i$, LHM parameters (z>0) $\in=v=-1/2+0.003i$, the angle of incidence is $\pi/10$, and the normalized real part of $E_x$ is shown. In FIG. 3A, wave 310 is the incident wave, wave 312 is the reflected wave, and wave 314 is the refracted wave (as is also indicated by the adjacent arrows).

Figure 4:
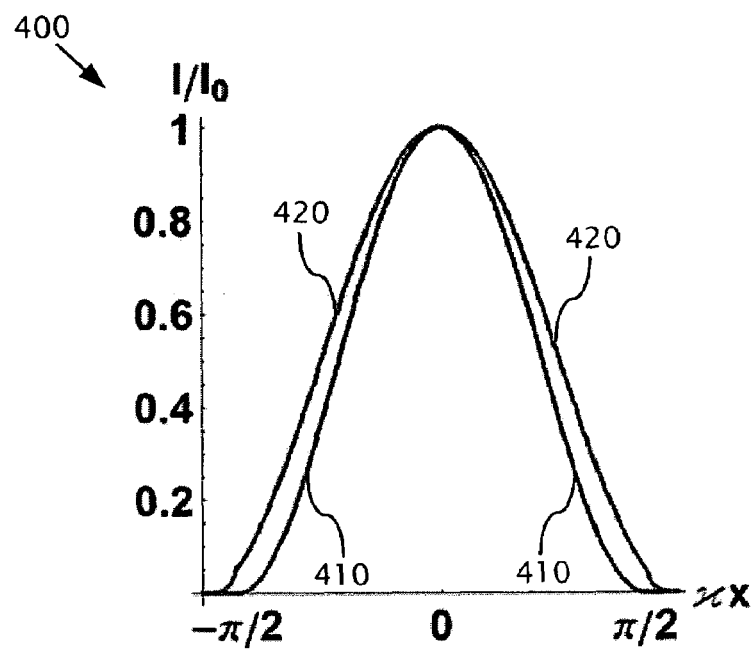
FIG. 4 is a graph showing the intensity profile of the systems in FIGS. 3A and 3B.

FIG. 3B is a diagram 302 showing the same experiment as FIG. 3A, but with waveguide walls of a finite conductance (silver; $\lambda=0.75$ μm; $\in_w=-25+0.3i$). In FIG. 3B, wave 320 is the incident wave, wave 322 is the reflected wave, and wave 324 is the refracted wave (as is also indicated by the adjacent arrows). FIG. 4 shows the intensity profile of $E_z$ for the systems in FIGS. 3A and 3B. Plot 410 corresponds to FIG. 3A whereas plot 420 corresponds to FIG. 3B.

From the results in FIGS. 3 and 4, it can be observed that Snell's law is reversed, meaning that the phase velocity in the medium with $\in<0$ and $v<0$ is negative, and the resulting wave is left-handed for the general case of oblique incidence. As is discussed in Veselago, V. G., "The Electrodynamics of Substances with Simultaneously Negative Values of $\in$ and μ," *Soviet Physics Uspekhi* 10, 509 (1968), optical effects directly related to the phase velocity (for example, Snell's law, Doppler Effect, Cherenkov radiation, and the like) are also reversed in such a medium.

Another class of phenomena commonly associated with NIMs involves the propagation of surface waves, also known as polaritons, at the left- and right-handed media interface. See, e.g., Pendry, J. B., "Negative Refraction Makes a Perfect Lens," *Phys. Rev. Lett.* 85, 3966 (2000); Agranovich, V. M., et al., "Linear and Nonlinear Wave Propagation in Negative Refraction Metamaterials," *Phys. Rev. B*. 69, 165112 (2004). In the following calculations, it is noted that the surface wave on the non-magnetic interface has a TM structure. See, e.g., Landau, L. D., et al, *Course of Theor. Phys.*, vol, 8, 2nd ed., Reed Ltd. (1984). The fields and the electromagnetic constant of right-handed media (which fill the region z<0 in the exemplary structure shown in FIG. 2) are represented with superscript (−), whereas the fields and electromagnetic constant of left-handed media (which fills the region z>0 in the exemplary structure shown in FIG. 2) are represented with superscript (+).

In the following discussion, the following polariton solutions are searched for: (E, H)$^{(-)} \propto \exp[ik_y y + \xi^{(-)} z]$ and (E, H)$^{(+)} \propto \exp[ik_y y - \xi^{(+)} z]$ with real $k_y$ and positive $\xi^{(-|+)}$ (the "anti-polariton" solution that corresponds to negative $\xi^{(-|+)}$ and that exponentially grows away from the interface exists in a finite region of space).

While the NIM region has $\in_\perp<0$, $\in_\parallel>0$, the "right-handed" medium can be constructed by either $\in_\perp>0$, $\in_\parallel>0$ or by $\in_\perp>0$, $\in_\parallel<0$. These two combinations of the dielectric constants lead to different conditions for polariton propagation. Specifically, for the case where $\in_\parallel^{(-)}>0$, $\in_\perp^{(-)}>0$, which is typically realized in an isotropic right-handed medium, the polaritons are only possible for $k_y=0$ and have the dispersion relation:

$$v^{(-)}/\in_\perp^{(-)} = v^{(+)}/\in_\parallel^{(+)} \qquad (5)$$

Such waves however assume propagation along the x direction.

The existence of these waves in the waveguide geometry illustrated in FIG. 1 is limited to a number of "modes," each forming a standing wave between the waveguide plates and fulfilling the corresponding boundary conditions (see Equation (2) and the accompanying discussion). However, if the right-hand medium has $\in_\parallel<0$, and $\in_\perp>0$, the propagation of polaritons with non-zero $k_y$ is possible when:

$$\in_\parallel^{(-)} v^{(-)} = \in_\parallel^{(+)} v^{(+)} \qquad (6)$$

This equation again relates $\varkappa$ to k. When Equation (6) is satisfied, the surface wave exists for any given $|k_y|^2 > \in v k^2$, and the relation between $k_y$ and $\xi$ is given by Equation (3), where the following substitution is made: $k_z^2 = -\xi^2$. Note that a similar situation takes place in the 3-D geometry on the boundary between the right-handed medium ($\in^{(-)}>0$, $\mu^{(+)}>0$) and the "conventional" LHM ($\in^{(+)}<0$, $\mu^{(+)}<0$), where for the same frequency the polaritons exist for any wavevector provided that $\in^{(-)} = -\in^{(+)}$, $\mu^{(-)} = -\mu^{(+)}$.

The existence of surface waves for a wide range of wavevectors makes super-lensing possible. See, e.g., Pendry, J. B., "Negative Refraction Makes a Perfect Lens," *Phys. Rev. Lett.* 85, 3966 (2000). The evanescent components, which carry the information about the subwavelength features of the source, exponentially decay away from the object plane. Their resonant enhancement by a slab of either planar LHM (such as an embodiment described herein) or 3-D LHM (described, for example, in Pendry, J. B., "Negative Refraction Makes a Perfect Lens," *Phys. Rev. Lett.* 85, 3966 (2000) and Veselago, V. G., "The Electrodynamics of Substances with Simultaneously Negative Values of $\in$ and μ," *Soviet Physics Uspekhi* 10, 509 (1968)) can be represented as a resonant coupling of the original evanescent wave to the surface modes on both interfaces of the LHM lens. In such a process, the original evanescent wave excites an anti-polariton mode (a surface mode growing away from the interface) on the front interface, which in turn excites the true-polariton mode on the back interface of the slab. The part of this surface mode exponentially decaying away from the lens represents the LHM-enhanced evanescent wave.

Figure 5:
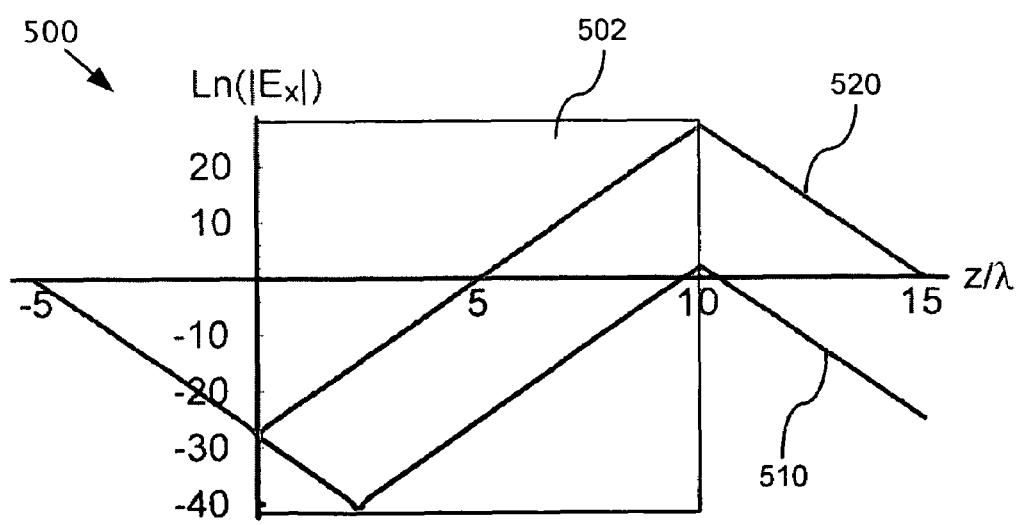
FIG. 5 is a schematic block diagram illustrating evanescent waves being resonantly enhanced inside an exemplary slab of left-handed material in the presence of polaritons.

This concept is illustrated in schematic diagram 500 of FIG. 5, where the transmission of an evanescent component through an exemplary slab of planar LHM (such as described herein and illustrated in FIG. 1) is calculated. FIG. 5 illustrates that the evanescent wave decaying through the right-handed media is resonantly enhanced inside an exemplary LHM slab only in the presence of polaritons. In FIG. 5, a lossless LHM is assumed, as finite losses limit the "restoration ability" of the LHM material. See, e.g., Podolskiy, V. A., et al., "Near-Sighted Superlens," *Optics Letters* 30, 75

(2005). In particular, FIG. 5 shows the amplification of an evanescent field by a parallel slab 502 of LHM where $1\varkappa = k/2$. Line 510 corresponds to the non-plasmonic case. In the example in FIG. 5, the right-hand media (RHM) parameters are $\in^{(RHM)} = v^{(RHM)} = 1/2$, and the left-hand media (LHM) parameters are $\in^{(LHM)} = v^{(LHM)} = -1/2$, and $k_y = 2k$. Line 520 shows the case of resonant excitation of polariton waves where $\in^{(RHM)} = 3/2$, $v^{(RHM)} = 4$, $\in^{(LHM)} = -6/5$, $v^{(LHM)} = -5$, and $k_y = \sqrt{9/8}k$. Further, in the illustrated example, the slab of LHM 502 is positioned between z=0 and z=10λ.

B. Expanded Analysis of Electromagnetic Characteristics of Exemplary NIM Structures Having Strong Anisotropy For purposes of this section and its subsections, reference will be made to the exemplary geometry shown in FIG. 6, which schematically shows a cross-sectional side view of an embodiment of the architecture illustrated in FIG. 1. The embodiment in FIG. 6 comprises a waveguide 600 having a core 610 extending in the directions (y, z) and bordered by waveguide border elements 620, 622.

Propagation in the exemplary waveguide 600 is allowed in the y and z directions, while the waveguide border element occupy the regions |x|>d/2. Furthermore, the exemplary waveguide core 610 is assumed to be a homogeneous, non-magnetic (μ=1) material. The exemplary core 610 further has a uniaxial anisotropic dielectric constant with dielectric permittivities $\in_\perp$ and $\in_\parallel$ along and perpendicular to the optical axis, respectively. The optical axis of the core material (C) is assumed to be perpendicular to the direction of the wave propagation in the media (C|x). Therefore, despite the anisotropy of the system, the effective refractive index of propagation in the planar geometry is isotropic.

As more fully discussed above, it can be shown that any wave propagating in such a system can be represented as a series of different waveguide modes. Each such mode is characterized by its polarization and structure in x direction. Namely, one can distinguish two fundamentally different kinds of modes. The modes of the first kind (known as TE or ordinary waves) have their E vector in the (y, z) plane. Therefore, the propagation of such waves depends only on $\in_\parallel$ (see, for example, FIG. 1). The modes of the second kind (TM or extraordinary waves) have their H field in the waveguide plane. The waves whose propagations are affected by both $\in_\parallel$ and $\in_\perp$ are the primary focus of this discussion.

In the subsections below, further aspects of the exemplary NIM structure based on a waveguide architecture (such as waveguide 600) are described. The analytical descriptions presented below are limited to the case of single-mode propagation, though it should be understood that the descriptions nonetheless provide complete information about the linear properties of the waveguide structure since an arbitrary wave packet in the system can be represented as a linear combination of modes. For example, the numerical simulations of the imaging properties of exemplary NIM structures were based on this property.

1. Waveguides with Perfectly Conducting Walls

As noted above, the propagation of a mode in a planar waveguide can be described by the free-space-like dispersion relation:

$$k_y^2 + k_z^2 = \in v k^2 \qquad (7)$$

where $\in$ is $\in_\parallel$ for TE modes and $\in_\perp$ for TM modes, $k_y$ and $k_z$ are the propagation components of the wave vector, and k=ω/c (with ω and c being the free-space angular frequency of the radiation and the speed of light in a vacuum, respectively). The propagation constant v is given by:

$$v = 1 - \frac{\kappa^2}{\in_\parallel k^2}, \qquad (8)$$

and the parameter κ defines the mode structure in the x direction. (Note that the parameter κ is sometimes written as $\varkappa$ in this disclosure.)

As follows from Eq. (7), the phase velocity of a propagating mode is equal to $$v_p = nk, \qquad (9)$$

where the effective refraction index $n^2 = \in v$. Note that similar to the case of the plane-wave propagation in free space, the refraction index contains a product of two (mode-specific) scalar constants. A transparent structure has both propagation constants of the same sign. The case of positive $\in$ and v corresponds to conventional (positive refraction index) material. The case of negative $\in$ and v describes a negative index material (NIM), where phenomena directly related to phase velocity (for example, Snell's law) are reversed. As shown below, NIM behavior can be also illustrated by comparing the Poynting vector $S_z$ and the wavevector $k_z$.

Figure 6:
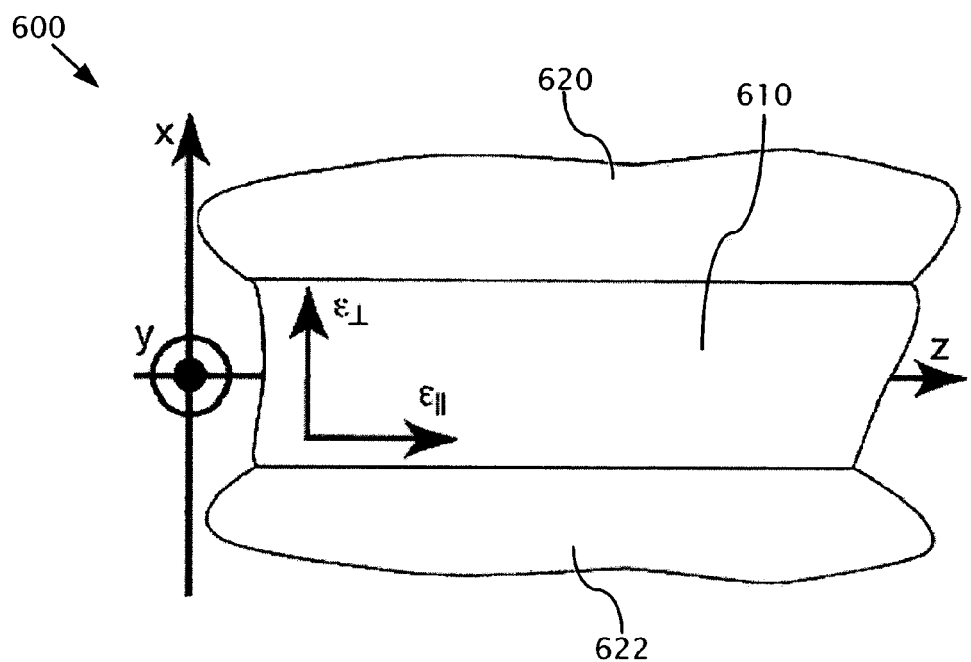
FIG. 6 is a schematic block diagram showing a side view of the exemplary waveguide architecture of FIG. 1.

As more fully explained above, the mode in the exemplary waveguide architecture shown in FIGS. 6 and 1 can be related to the x profile of the longitudinal field component. To better illustrate the physical picture behind the mode propagation, analytical results for the case of perfectly conducting waveguide walls are presented. In this case, the EM energy is confined to the waveguide core and the longitudinal field has a cos(κX) or sin(κx) profile, depending on the symmetry with respect to the x=0 plane, with κ=(2j+1)π/d for symmetric and κ=2πj/d for antisymmetric modes, and with the integer mode number j. The deviation from this idealized picture due to finite conductance of the waveguide material does not significantly alter the results. For example, the case of metals with relative high conductance at near-IR to terahertz frequencies (e.g., Ag, Al, and Au) can be treated perturbatively. The results of such a perturbation approach are presented in the next section.

The electric ($U_E$) and magnetic ($U_H$) field contributions to the energy density of a mode in weakly dispersive material ($|\in/\omega| \gg |d\in/d\omega|$) can be given by $U_E = (1/8\pi d)\int (D \cdot E^*)dx$ and $U_H = (1/8\pi d)\int (H \cdot H^*)dx$, respectively (where the asterisks denote the complex conjugation). Using the explicit mode structure for TE and TM waves, the following relationships can be obtained:

$$U_E^{(TM)} = U_H^{(TM)} = \frac{1}{16\pi} \frac{\in_\parallel^2 k^2}{\kappa^2} |A_0|^2, \qquad (10)$$

$$U^{(TM)} = U_E^{(TM)} + U_H^{(TM)} = \frac{\in_\parallel^2 k^2}{8\pi \kappa^2} |A_0|^2,$$

$$U_E^{(TE)} = U_H^{(TE)} = \frac{\in_\parallel}{16\pi} |A_0|^2, \qquad (11)$$

$$U^{(TE)} = U_E^{(TE)} + U_H^{(TE)} = \frac{\in_\parallel}{8\pi} |A_0|^2,$$

where $A_0$ is the mode amplitude. Thus, extending the similarity between the waveguide system described here and free-space propagation, the EM energy of a propagating wave is positive and contains equal (or substantially equal) contributions from the electric and magnetic components of the field. It can also be observed that the TE mode is in some sense very similar to the conventional plane wave propagating in the isotropic homogeneous dielectric. For instance, energy density of the TE waves is equal (or substantially equal) to that of the plane waves and there is no wave propagation in material with $\in_\parallel < 0$. In contrast to this behavior, the sign of the dielectric permittivity alone does not impose limitations on the propagation of TM modes.

Another characteristic of the energy transport in the EM system is the average energy flux given by the propagating component of the Poynting vector $S=(c/4\pi)$ [E×H]. Selecting the direction of the wave propagation as z axis, the following can be obtained:

$$S_z^{(TE,TM)} = c \frac{k_z}{\epsilon_{(\parallel,\perp)} k} U^{(TE,TM)}. \tag{12}$$

It can be seen from Equation (12) that the relationship between the direction of the phase velocity and direction of the energy flux is defined by the sign of the dielectric constant (for a given mode polarization). In particular, $\in > 0$ means $n > 0$ propagation, whereas $\in < 0$ signifies the NIM case. Further, the medium should be transparent. In other words, the propagation constants $\in$ and $v$ should be of the same sign.

As can be seen from Eq. (7), the NIM condition can be satisfied for TM waves when $\in_\parallel \in_\perp < 0$ (that is, when the in-plane and perpendicular-to-plane dielectric constants have different signs). When $\in_\parallel \in_\perp < 0$, a material or structure is referred to herein as having "strong dielectric anisotropy" or having a "strongly anisotropic dielectric constant." Occasionally, and as will be readily discernible from the context, such materials or structures having strong dielectric anisotropy are sometimes referred to as simply being "anisotropic." Although the term "strongly" is often used, it should be understood that the relative difference between the dielectric constants $\in_\parallel$ and $\in_\perp$ in the exemplary structures will vary widely from implementation to implementation and may be small.

2. The Effect of Finite Wall Conductance

In this subsection, certain characteristics of practical implementations of the exemplary systems are examined. Specifically, this discussion concerns a waveguide architecture wherein a strongly anisotropic core material is surrounded by metallic walls. The electromagnetic properties of metals at high frequencies are dominated by the dynamics of the free-electron plasmalike gas. Following the approach described in E. M. Lifshitz, et al., *Course of Theoretical Physics*, Vol. 10 (Reed, 1984), it is possible to write down the high-frequency effective permittivity of metal in Drude form:

$$\epsilon_m(\omega) = \epsilon_\infty - \frac{\Omega_{pl}^2}{\omega(\omega + i\tau)}, \tag{13}$$

where the constant term $\in_\infty$ describes the contribution of the bound electrons, $\tau$ is responsible for EM losses due to (inelastic) processes, and $\Omega_{pl} = N_e e^2/m_{eff}$ is the plasma frequency with $N_e$, $e$, and $m_{eff}$ being the free-electron concentration, charge, and effective mass, respectively. Note that for $\omega < \Omega_{pl}/((\in_\infty)^{1/2})$, the permittivity of the metal becomes negative $\in'_m < 0$. (For purposes of this discussion, single and double primes denote the real and imaginary parts, respectively.) For most metals of relatively high conductivity (e.g., Ag, Al, Au) the plasma frequency is of the order of 10 eV and $\in_\infty \approx 1$, which means that $\in'_m$ is negative from optical to gigahertz frequencies. The losses, given by the parameter $\in''_m/|\in'_m| << 1$ are typically small in these spectral ranges.

Similar to the case of perfectly conducting waveguide walls, the structure of the modes in the finite-wall-conductance system can be derived from the dependence of the longitudinal (z) field component on the x coordinate, which has $\cos(\kappa x)$ or $\sin(\kappa x)$ behavior, depending on its symmetry. The value of the mode parameter $\kappa$ can be given by the in-plane (y,z) field components' continuity throughout $x=\pm d/2$ planes. For the symmetric (cosine) mode profile, the following can be obtained:

$$\tan\left[\frac{\kappa^{(TM)} d}{2}\right] = -\frac{\epsilon_m \kappa^{(TM)}}{[k^2 \epsilon_\parallel^2 (\epsilon_\perp - \epsilon_m) - \kappa^{(TM)^2} \epsilon_\parallel \epsilon_\perp]^{1/2}}, \tag{14}$$

$$\tan\left[\frac{\kappa^{(TE)} d}{2}\right] = \frac{[k^2(\epsilon_\parallel - \epsilon_m) - \kappa^{(TE)^2}]^{1/2}}{\kappa^{(TE)}}$$

In the limit of $\in_m \to -\infty$, these equations yield the values $\kappa_0 = \pi(2j+1)/d$ from the previous subsection. As noted, these values correspond to the well-known condition of zero mode magnitude at the waveguide boundary. In the limit of sufficiently large $|\in_m|$, it is possible to find the correction to the above values of the mode parameter $\kappa$. Specifically, $$\kappa^{(TM)} \approx \kappa_0\left(1 - \frac{2k\epsilon_\parallel}{\kappa_0^2 d \sqrt{-\epsilon_m}}\right), \tag{15}$$

$$\kappa^{(TE)} \approx \kappa_0\left(1 - \frac{2}{kd\sqrt{-\epsilon_m}}\right).$$

Figure 7A:
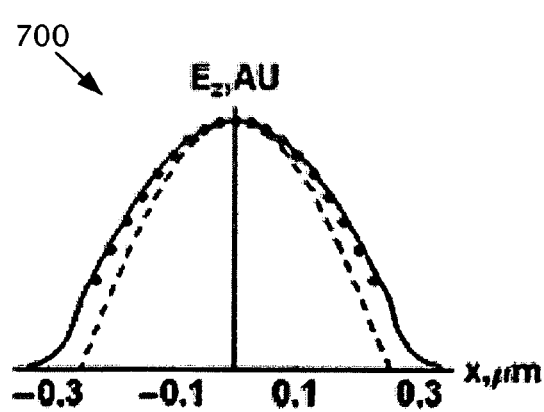
FIGS. 7A and 7B show cross-sections of a field in an exemplary waveguide. In particular, FIG. 7A corresponds to the TM mode, and FIG. 7B corresponds to the TE mode.
Figure 7B:
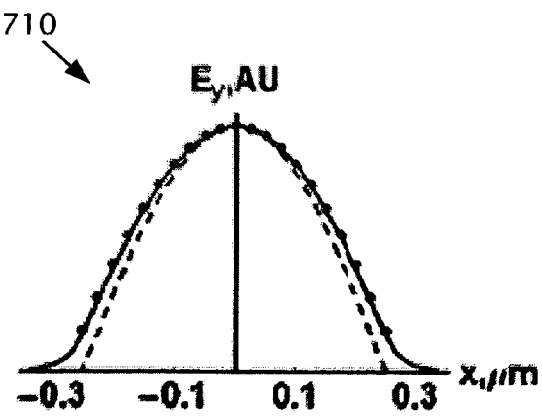

As the mode parameter $\kappa$ corresponds to an inverse confinement length of the mode in the x direction, the negative K correction signifies the "mode expansion" into the waveguide wall region. Such a mode expansion is illustrated in the diagrams 700 and 710 of FIGS. 7A and 7B, respectively. In particular, FIGS. 7A and 7B show the cross-section of a field in an exemplary planar waveguide with a hollow $d=0.5$ µm thick core. The dashed curves in the figures illustrate the case of $\in_m = -\infty$ (a perfect metal boundary), whereas the solid curves represent a silver (Ag) boundary for $\lambda=0.85$ µm, and the points (or dots) plot values of $\kappa$ calculated using Equation (15). Further, FIG. 7A corresponds to the TM mode and FIG. 7B corresponds to the TE mode.

The immediate effect of such a change in the mode structure is the change of the effective phase velocity, given by the refraction index:

$$\kappa^{(TM)} \approx \kappa_0\left(1 - \frac{2k\epsilon_\parallel}{\kappa_0^2 d \sqrt{-\epsilon_m}}\right), \tag{16}$$

$$\kappa^{(TE)} \approx \kappa_0\left(1 - \frac{2}{kd\sqrt{-\epsilon_m}}\right).$$

In Equation (16), $v_0 = 1 - \kappa_0^2/(\in_\parallel k^2)$. As was described above, the sign of the refraction index for the TM polarization has to be selected positive for $\in_\perp > 0$ and $v > 0$, and negative for $\in_\perp < 0$ and $v < 0$.

Penetration of the mode into the waveguide wall region has another effect on the wave propagation. Namely, the finite value of $\epsilon_m''$ introduces an additional absorption into the system with respect to the core material. As a result, the magnitude of a mode will exponentially decay as it propagates through the system. Such an attenuation can be related to the imaginary part of the effective refractive index through $E \propto \exp(-n''kz)$. In the limit of small absorption in the metal ($\epsilon_m''/|\epsilon_m'| \ll 1$), the "waveguide-induced" mode decay can be described by:

$$n^{(TM)''} \approx \frac{1}{kd}\left(\frac{\epsilon_\perp}{v_0|\epsilon_m|}\right)^{1/2}\frac{\epsilon_m''}{|\epsilon_m'|}, \qquad (17)$$

$$n^{(TE)''} \approx \frac{\kappa_0^2}{k^3 d(\epsilon_\parallel v_0|\epsilon_m|)^{1/2}}\frac{\epsilon_m''}{|\epsilon_m'|}.$$

It can also be obersved that in agreement with the causality principle, the losses in the system are positive, regardless of the sign of the refractive index. Using Equation (17), it can be estimated that for wavelengths $\lambda \geq 850$ nm, the losses introduced by silver waveguide walls are substantially small ($n''/n \lesssim 0.01$).

III. Exemplary Physical Embodiments of the NIM Structures

In this section, exemplary embodiments of the NIM structures are more specifically discussed. Several of the exemplary embodiments are based on the waveguide architecture introduced above (as shown, for instance, in FIGS. 1 and 6). For example, in certain embodiments, the exemplary NIM structures comprise a strongly anisotropic dielectric core positioned between two substantially planar waveguide walls or border elements, which can be metal or dielectric (including, for example, liquid or gaseous media and vacuums). In desirable embodiments, the effective in-plane dielectric constant of the core is positive ($\epsilon_\parallel > 0$) and the effective perpendicular-to-plane dielectric constant is negative ($\epsilon_\perp < 0$).

In several of the described embodiments, the structures are non-magnetic (e.g., the core is formed of materials having a positive magnetic permeability). Further, several of the described structures are non-resonant. For instance, some of the described embodiments do not require a resonance to achieve a negative refractive index.

In particular embodiments, the strong anisotropy of the dielectric constant can be obtained using a core material having a layered structure, a core material with aligned wire structures, or other anisotropic nanoplasmonic systems. The structures can also be comprised of materials with strongly anisotropic effective carrier mass or other compositions and/or materials.

In certain embodiments of the disclosed technology, the class of nanoengineered media known as "metamaterials" can be used to achieve the desired anisotropy. For example, in exemplary composites, nanostructured particles are used to achieve the desired electromagnetic properties. In particular embodiments, and in order to realize the desired anisotropy, a combination of plasmonic or polar particles (having $\epsilon < 0$) and dielectric media (having $\epsilon > 0$) are used. In general, the characteristic size of inhomogeneities in the exemplary composites and the typical separation between particles embedded in the composites are smaller than the wavelength of incident radiation. Thus, the exemplary composites typically support plane-wave-like modes. The EM properties of these modes can be described, for example, in terms of the effective dielectric constant $\epsilon_{eff}$:

$$\langle D(r)\rangle_\alpha = \langle \epsilon(r)_{\alpha,\beta} E(r)_\beta \rangle = \epsilon_{eff\alpha,\beta}\langle E(r)\rangle_\beta, \qquad (18)$$

where the angled brackets denote the averaging over the microscopically large (multiparticle) and macroscopically small (subwavelength) spatial area, where the Greek indices denote Cartesian components, and where the summation over repeated indices is assumed.

Since the size of a particle a typically enters Maxwell equations in the combination ka, size-related effects play a minor role in the considered quasi-static averaging process. Therefore, the exemplary embodiments described in this section can be considered as being highly tolerant to size variation. Further, because the desired characteristics of the composites originate from the averaged (or effective medium) properties of the metamaterials, fabrication of the exemplary embodiments does not typically require any specific periodicity of the particle arrangement. Instead, only the average concentration may be controlled during the fabrication step.

In the following subsections, two particular designs of strongly anisotropic composites are described in further detail. The described embodiments are suitable for, though not limited to, the optical and infrared spectrum ranges. Instead, the described embodiments can be used for a wider range of electromagnetic radiation (e.g., for wavelengths from $1\times10^{-7}$ m to $3\times10^{-1}$ m).

A. Exemplary Layered Systems

Figure 8:
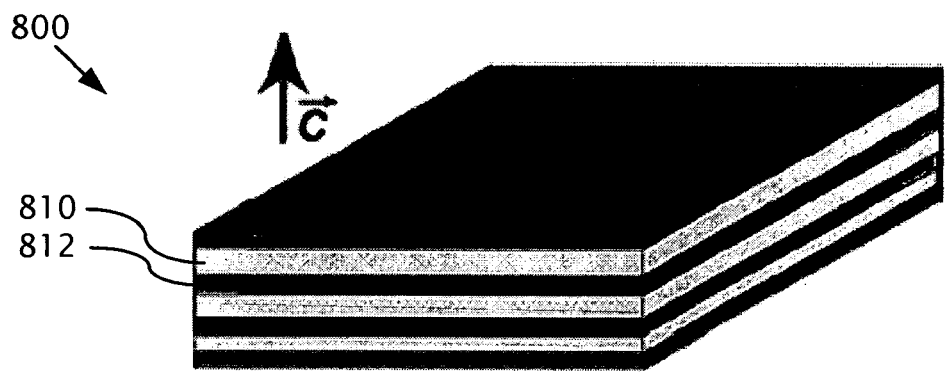
FIG. 8 is a block diagram of an exemplary layered structure as may be used in the core of the waveguide architecture illustrated in FIGS. 1 and 6.

In certain embodiments, the NIM structure is based on a stack of interlacing layers. For example, specific implementations comprise interlaced plasmonic ($\epsilon_{pl} < 0$) (e.g., Ag, Au, Al) and dielectric ($\epsilon_d > 0$) (e.g., Si, GaAs) layers. Other implementations comprise interlaced polar layers ($\epsilon_{pl} < 0$) (e.g., SiC) and dielectric layers ($\epsilon_d > 0$) (e.g., Si, GaAs) layers. For purposes of this discussion, it is assumed that the layers are generally aligned in the y-z plane of a waveguide. An example layered system 800 having layers 810 with a negative dielectric constant and layers 812 with a positive dielectric constant is illustrated schematically in FIG. 8. In general, the wave propagation in the layered materials of these embodiments depends on the polarization, the ratio of the typical layer thickness $\delta$ to the wavelength $\lambda$, and the microgeometry of the system. Furthermore, the wave propagation may become complicated due to the excitation of coupled-surface plasmon-polariton modes, or one-dimensional photoniccrystal-related effects. In the case of thin layers (e.g., $\delta \ll \{\lambda,d\}$), some of the modes propagating in the system have a plane-wave-like structure and can be successfully described by an effective medium approximation. As noted above, the absolute thickness of the layers is generally not determinative of the propagation of these modes. Instead, the average concentration of the plasmonic layers $N_{pl}$ typically controls the propagation.

To compute the effective dielectric constant $\epsilon_{eff}$ for exemplary embodiments of the layered structures, it can be noted that $E_y$, $E_z$, and $\epsilon E_x$ are continuous throughout the system, leading to:

$$\epsilon_\parallel = \epsilon_{eff_{y,z}} = N_{pl}\epsilon_{pl} + (1-N_{pl})\epsilon_d, \qquad (19)$$

$$\epsilon_\perp = \epsilon_{eff_x} = \frac{\epsilon_{pl}\epsilon_d}{(1-N_{pl})\epsilon_{pl} + N_{pl}\epsilon_d}.$$

Figure 9A:
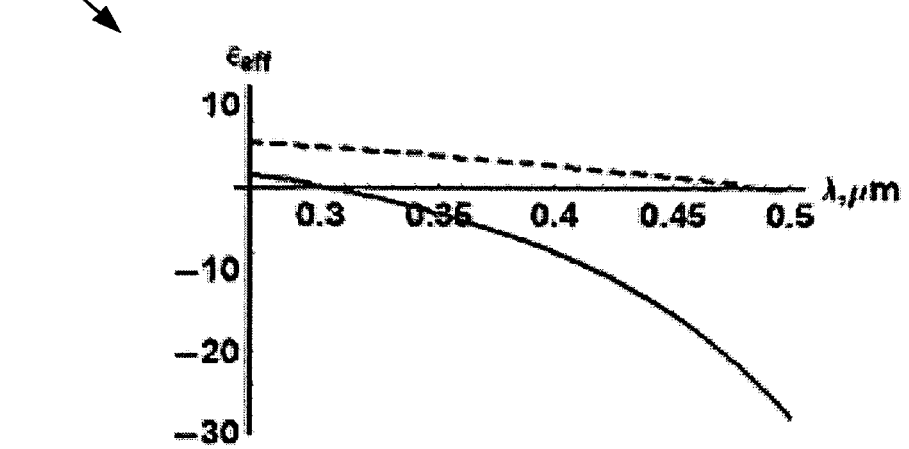
FIG. 9A is a graph showing the real part of the effective $\in_\perp$ and $\in_\parallel$ for a first exemplary layered structure as in FIG. 8.
Figure 9B:
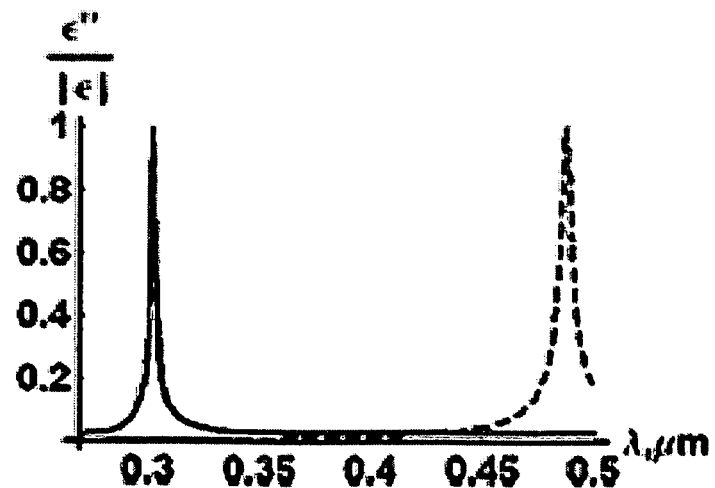
FIG. 9B is a graph showing the corresponding absorption of the system considered in FIG. 9A.

The effective permittivities for several exemplary layered composites are shown in FIGS. 9A and 9B, 10A and 10B, and 11A and 11B. In particular, FIG. 9A is a graph 900 showing the real part of the effective $\epsilon_\perp$ (shown as the solid curve) and $\epsilon_\parallel$ (shown as the dashed curve) for a layered system comprising interlaced Ag and Si where $N_{pl}=0.6$. FIG. 9B is a graph 910 showing the corresponding absorption of the system.

Figure 10A:
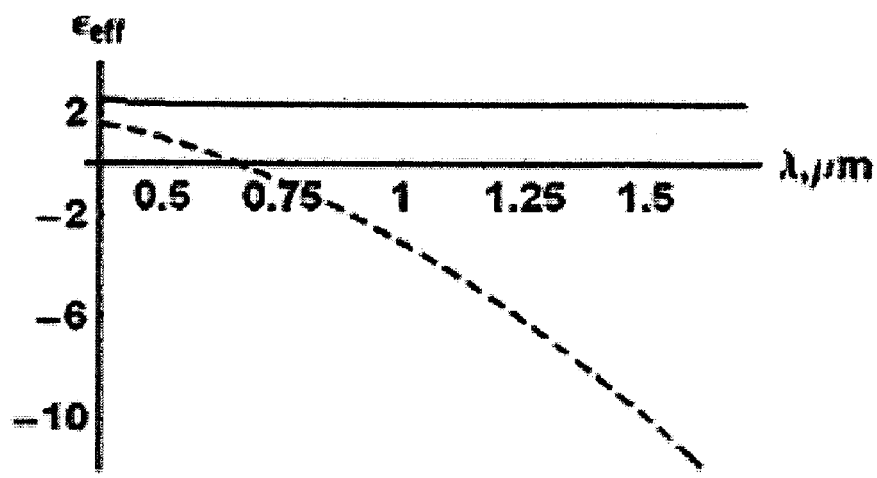
FIG. 10A is a graph showing the real part of the effective $\in_\perp$ and $\in_\parallel$ for a second exemplary layered structure as in FIG. 8.
Figure 10B:
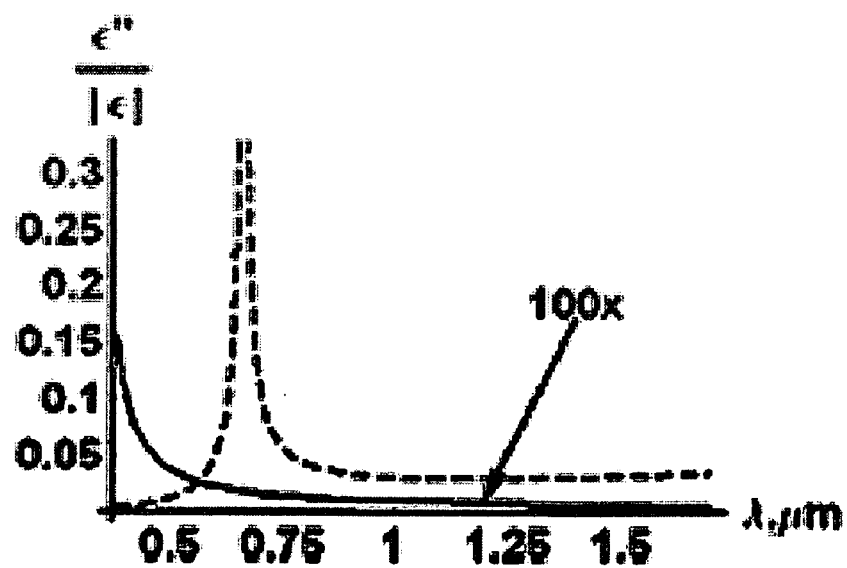
FIG. 10B is a graph showing the corresponding absorption of the system considered in FIG. 10A.
Figure 11A:
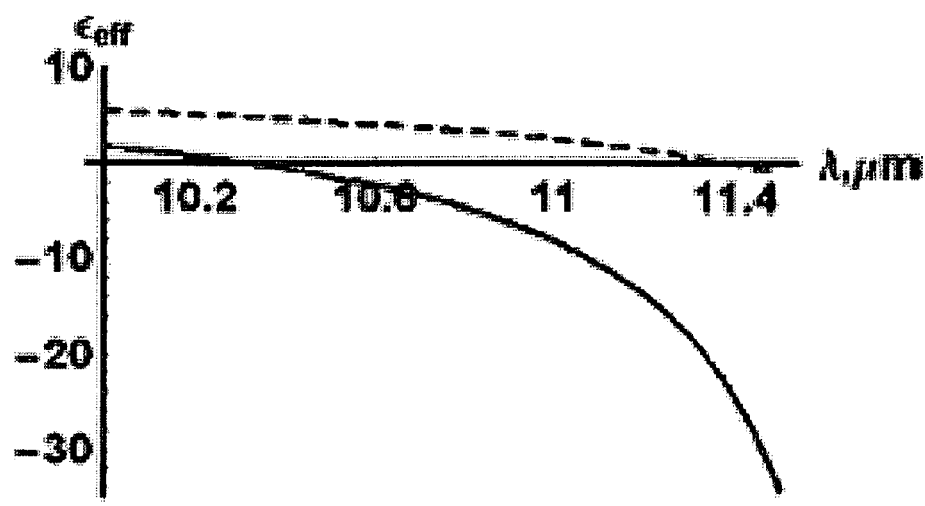
FIG. 11A is a graph showing the real part of the effective $\in_\perp$ and $\in_\parallel$ for a third exemplary layered structure as in FIG. 8.
Figure 11B:
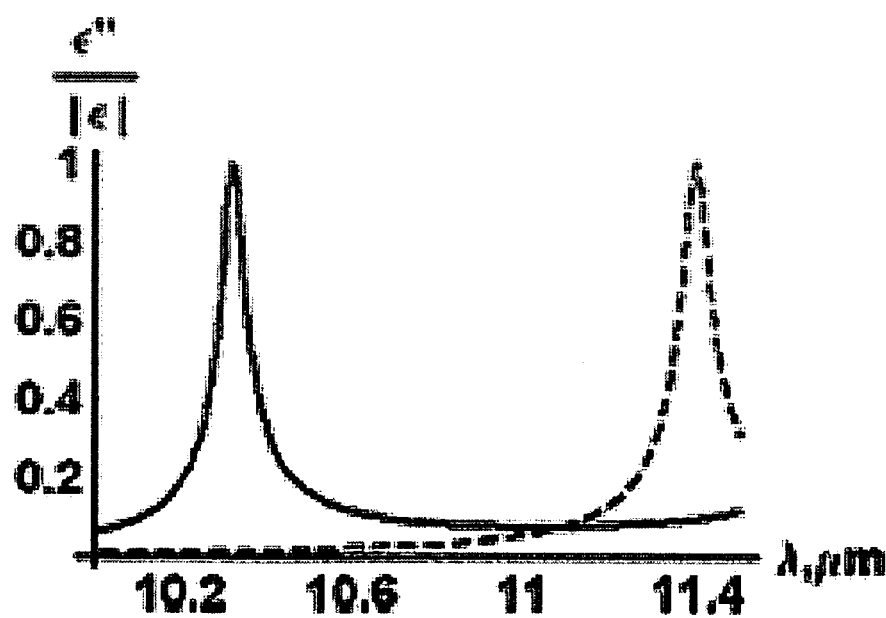
FIG. 11B is a graph showing the corresponding absorption of the system considered in FIG. 11A.

FIG. 10A is a graph 1000 showing the real part of the effective $\epsilon_\perp$ (shown as the solid curve) and $\epsilon_\parallel$ (shown as the dashed curve) for a layered system comprising interlaced Ag and SiO$_2$ where N$_{pl}$=0.1. FIG. 10B is a graph 1010 showing the corresponding absorption for the system. Note the small absorption of this system. FIG. 11A is a graph 1100 showing the real part of the effective $\epsilon_\perp$ (shown as the solid curve) and $\epsilon_\parallel$ (shown as the dashed curve) for a layered system comprising interlaced SiC and Si where N$_{pl}$=0.1. FIG. 11B is a graph 1110 showing the corresponding absorption for the system.

Although the anisotropy $\epsilon_\perp \epsilon_\parallel <0$ can be achieved in a layered system, actual realizations of materials with $\epsilon_\parallel >0$ and $\epsilon_\perp <0$ that are suitable for high-frequency NIM are exhibit have substantial absorption. On the other hand, materials with $\epsilon_\parallel <0$ and $\epsilon_\perp >0$ (achieved, for example, by a repeated deposition of Ag—Si layers) form low-loss media. While such a configuration has a positive refraction index, it can be used to concentrate propagating modes in subwavelength areas.

In the following paragraphs, the electromagnetic properties of exemplary structures formed of interchanging layers of dielectric and plasmonic (polar) materials with dielectric constants $\epsilon_d >0$, and $\epsilon_{pl}<0$, and thicknesses a$_d$, a$_{pl}$, respectively, are described in further detail. The wave propagation in such a system (also known as a 1-D photonic crystal) can be given by the dispersion relation:

$$\cos[\kappa(a_d+a_{pl})] = \cos(k_d a_d)\cos(k_{pl}a_{pl}) - \gamma \sin(k_d a_d)\sin(k_{pl}a_{pl}), \quad (20)$$

where $k_d^2 = \epsilon_d \omega^2/c^2 - k_y^2 - k_z^2$, $k_{pl}^2 = \epsilon_{pl}\omega^2/c^2 - k_y^2 - k_z^2$, and the parameter $\gamma$ is equal to $\gamma_{TM} = 1/2((\epsilon_{pl}/\epsilon_d)(k_d/k_{pl}) + (\epsilon_d/\epsilon_{pl})(k_{pl}/k_d))$ and $\gamma_{TE}=1/2((k_d/k_{pl}) + (k_{pl}/k_d))$ for TM and TE modes, respectively. In the limit of thin layers, and a relatively thick (although still subwavelength) waveguide $|k_d(a_d+a_{pl})| <<1$, $|k_{pl}(a_d+a_{pl})|<<1$, $|\kappa(a_d+a_{pl})|<<1$, the above dispersion relation can be further simplified via Taylor expansion to a form describing the "effective" dielectric constants:

$$\epsilon_\perp = \frac{\epsilon_d \epsilon_{pl}(a_d+a_{pl})}{a_d \epsilon_{pl} + a_{pl}\epsilon_d}, \quad (21)$$

$$\epsilon_\parallel = \frac{a_d \epsilon_d + a_{pl}\epsilon_{pl}}{a_d + a_{pl}}.$$

Figure 12:
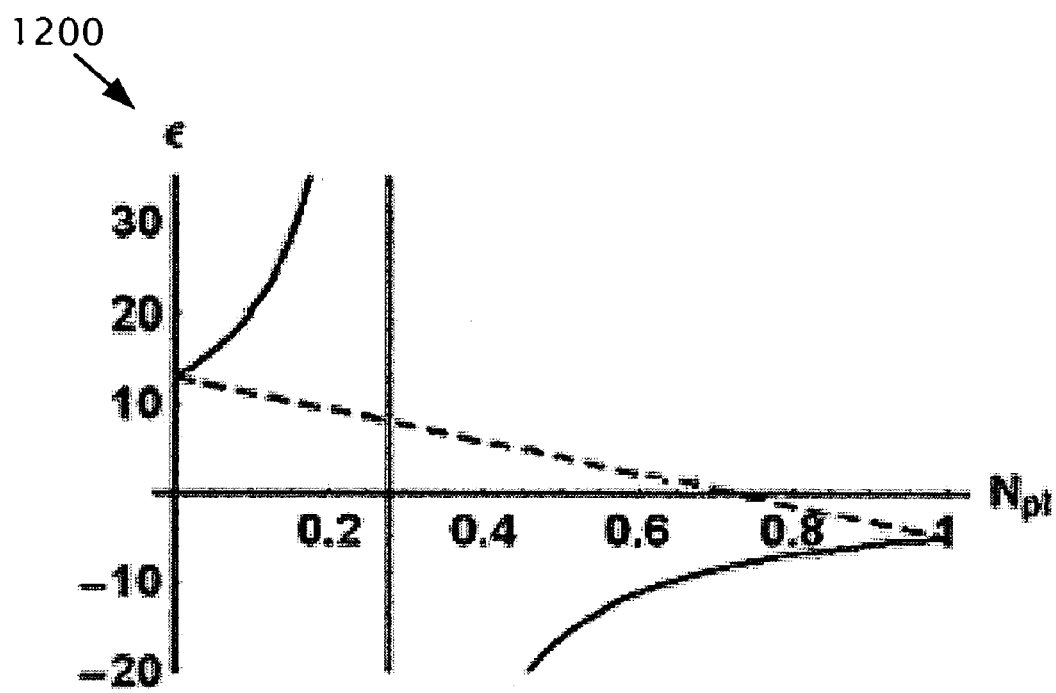
FIG. 12 is a graph showing effective perimittivities $\in_\perp$ and $\in_\parallel$ for a fourth exemplary layered structure.

These values of effective permittivities, derived here for a photonic crystal system, are substantial identical to the ones which can be obtained using the "effective medium theory" (EMT). Since the EMT corresponds to the first-band response of a photonic crystal system (which typically is least affected by the crystalline defects or lack of periodicity), Equations (21) can be used to describe an arbitrary layered system with the only control parameter being the relative (volume) concentration of plasmonic layers N$_{pl}$=a$_{pl}$/(a$_d$+a$_{pl}$). It should be noted, however, that the condition $|\kappa(a_d+a_{pl})|<<1$, which defines the limits of applicability of EMT, can be viewed as a limiting factor, defining the minimum size of a planar waveguide with a negative refractive index. The presence of the strong anisotropy of permittivity in the layered plasmonic-dielectric materials is illustrated in FIG. 12. In particular, FIG. 12 is a graph 1200 showing effective permittivities $\epsilon_\parallel$ (shown as the dashed line) and $\epsilon_\perp$ (shown as the solid line) as functions of concentration N$_{pl}$ for an exemplary layered structure where $\epsilon_d$=13 and $\epsilon_{pl}$=−5.

B. Exemplary Aligned Wire Structures

1. Overview of Aligned Wire Embodiments

Figure 13:
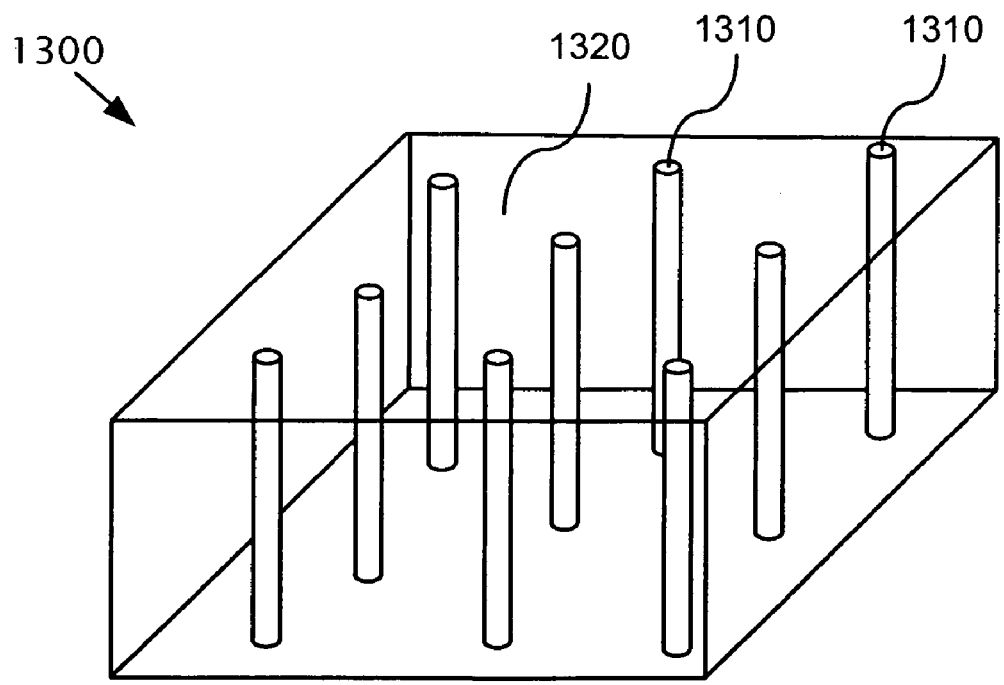
FIG. 13 is a schematic block diagram of an aligned wire structure as may be used in the core of the waveguide architecture illustrated in FIGS. 1 and 6.

Another exemplary system exhibiting desirable NIM characteristics comprises an array of aligned or substantially aligned wires (e.g., nanowires or nanotubes) in a dielectric host. FIG. 13 is a schematic block diagram showing an exemplary structure 1300 comprising an array of aligned wires 1310 ($\epsilon_{pl}<0$) embedded in a dielectric host 1320 ($\epsilon_d>0$). The structure 1300 can be viewed in many respects as a counterpart of the layered system described above. Although a generalized analytical solution of this problem is complicated, the case of a relatively small plasmonic material concentration for nearly normal incidence $\kappa \approx 0$ can be adequately described by the Maxwell-Garnett approximation (MGA):

$$\epsilon_\parallel = \epsilon_{eff_{y,z}} = \frac{N_{pl}\epsilon_{pl}E_{in} + (1-N_{pl})\epsilon_d E_0}{N_{pl}E_{in} + (1-N_{pl})E_0}, \quad (22)$$

$$\epsilon_\perp = \epsilon_{eff_x} = N_{pl}\epsilon_{pl} + (1-N_{pl})\epsilon_d,$$

where $E_{in} = (2\epsilon_d/\epsilon_d+\epsilon_{pl})E_0$ is the field inside the plasmonic inclusion and E$_0$ is the excitation field.

To check the validity of the MGA, the two-dimensional analog of the coupled-dipole approach can be used to numerically solve Maxwell's equations in the nanowire geometry. See, e.g, Podolskiy, V. A., et al., "Plasmon modes and negative refraction in metal nanowire composites," *Opt. Express* 11, 735-745 (2003); Podolskiy, V. A., and Narimanov, E. E., "Nanoplasmonic approach to strongly anisotropic optical materials," in *Conference on Lasers and Electro-optics/Quantum Electronics Conference/Photonics Applications Systems Technologies, OSA Trends in Optics and Photonics Series, Optical Society of America* (2005), paper JThC3; and Podolskiy, V. A., et al., "Resonant light interaction with plasmonic nanowire systems," *J. Opt. A, Pure Appl. Opt.* 7, S32-S37 (2005).

For example, in this approach, each metallic wire can first be represented as an array of point (2-D) dipoles, positioned in the nodes of a digitization mesh and numbered by a single index. The excitation field, acting on a selected point dipole can then be assumed to be the sum of a homogeneous excitation field, and the field scattered by all other dipoles. Thus, the dipole moment of dipole with index i is coupled to the dipole moments of all other dipoles through the following coupled-dipole equations:

$$d_i = a_0\left[E_0 + \sum_{i \neq j} \hat{G}(r_i - r_j)d_j\right], \quad (23)$$

where the regular part of the quasistatic 2-D Green's function $\hat{G}$ is given by:

$$\hat{G}_{\alpha\beta}(r) = -\frac{2\delta_{\alpha\beta}}{R^2} + \frac{4r_\alpha r_\beta}{R^4}, \quad (24)$$

where the dipole polarizability a$_0$ is defined as follows:

$$a_0 = \frac{R_0^2}{2}\frac{\epsilon_{pl}-\epsilon_d}{\epsilon_{pl}+\epsilon_d}, \quad (25)$$

and where the Greek indices denote the Cartesian components, $r_i$ is the position of a dipole i, $R^2 = r \cdot r$, and $R_0$ (which formally corresponds to the radius of a single dipole in the units of mesh size) is a fitting parameter. In simulations that were performed, $R_0 \approx 1/\sqrt{\pi} \approx 0.56$, which corresponds to the condition that the total area of dipoles in the simulations is substantially identical to the total area of wires in the original system.

Figure 14:
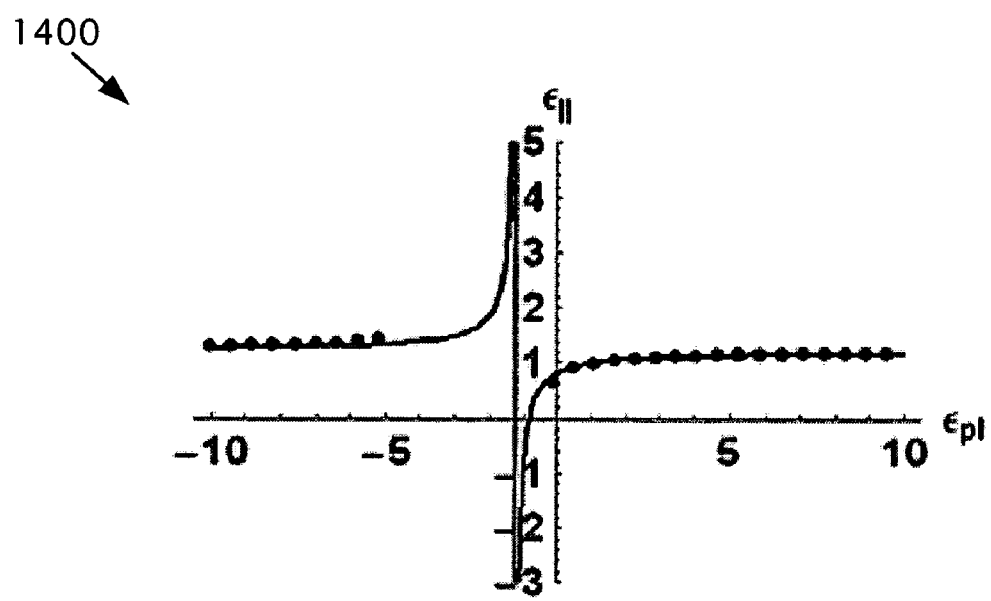
FIG. 14 a graph illustrating the dependence of $\in_\parallel$ on the dielectric constant of inclusions for a fixed $N_{pl}$ for a first exemplary aligned wire structure as in FIG. 13.
Figure 15:
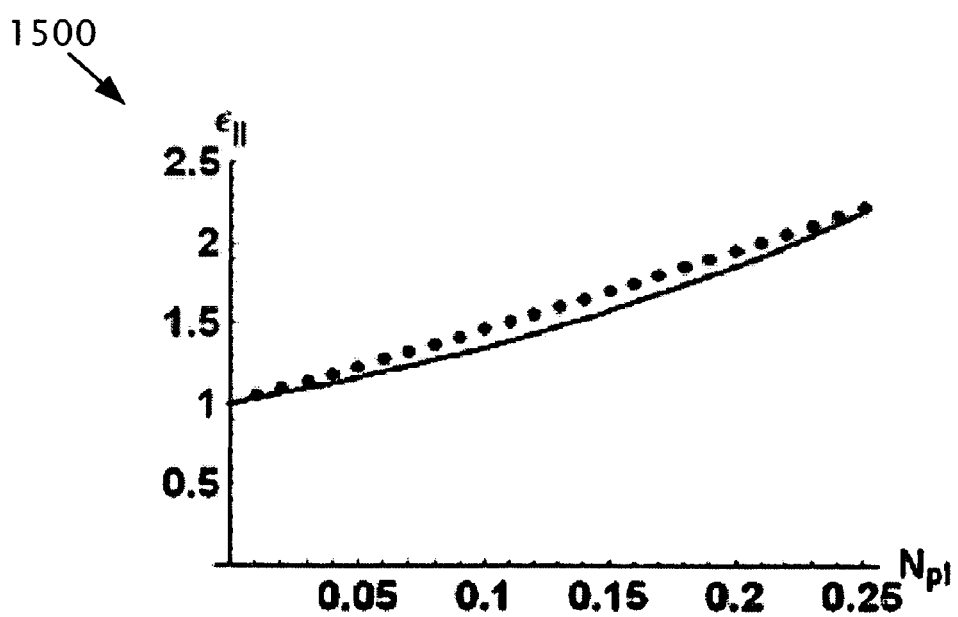
FIG. 15 is a graph illustrating the dependence of $\in_\parallel$ on the concentration $N_{pl}$ for a second exemplary aligned wire structure as in FIG. 13.

The solution of the coupled-dipole equations provides information about the electromagnetic field distribution in the system, and can be used to find the effective permittivity of a composite structure. The agreement between numerical simulations and the MGA results is shown in FIG. 14. In particular, FIG. 14 is a graph 1400 showing a comparison of the dependence of $\epsilon_\parallel$ on the dielectric constant of the inclusions for a fixed $N_{pl}$. FIG. 15 is a graph 1500 showing a comparison of the dependence of $\epsilon_\parallel$ on the concentration $N_{pl}$ for $\epsilon_d = 1$ and $\epsilon_{pl} = -5$. In both FIGS. 14 and 15, the solid line is plotted according to Equation (22) and the dashed line is plotted according to the coupled-dipole equations.

Figure 16A:
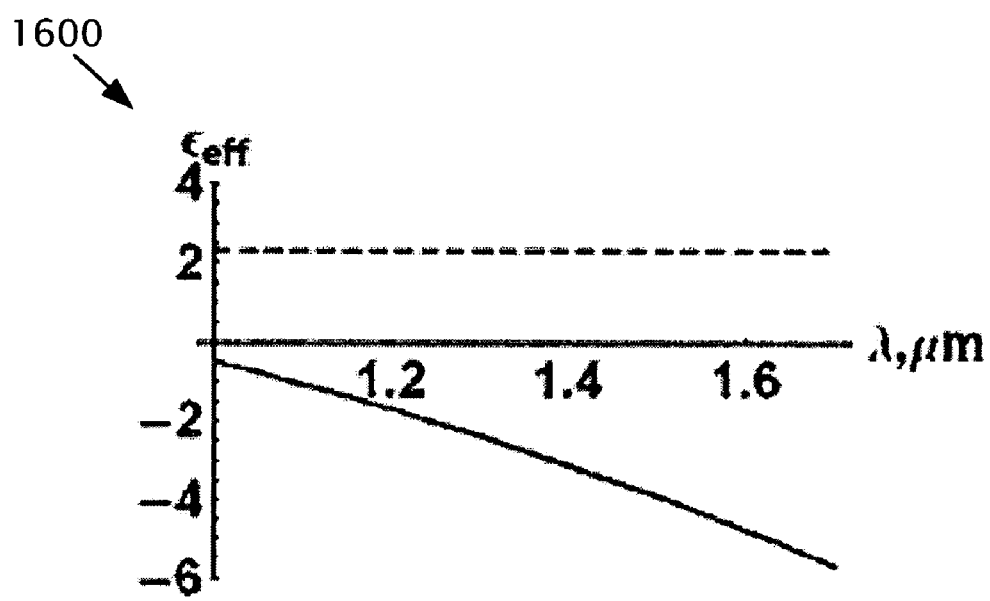
FIG. 16A is a graph showing the real part of the effective $\in_\perp$ and $\in_\parallel$ for a third exemplary aligned wire structure as in FIG. 13.
Figure 16B:
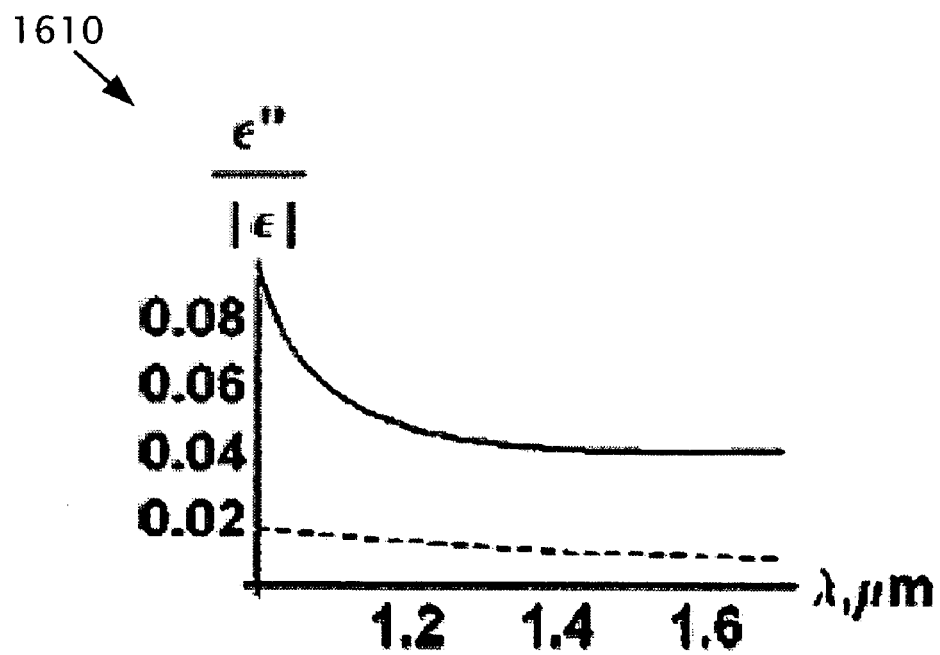
FIG. 16B is a graph showing the corresponding absorption of the system considered in FIG. 16A.
Figure 17A:
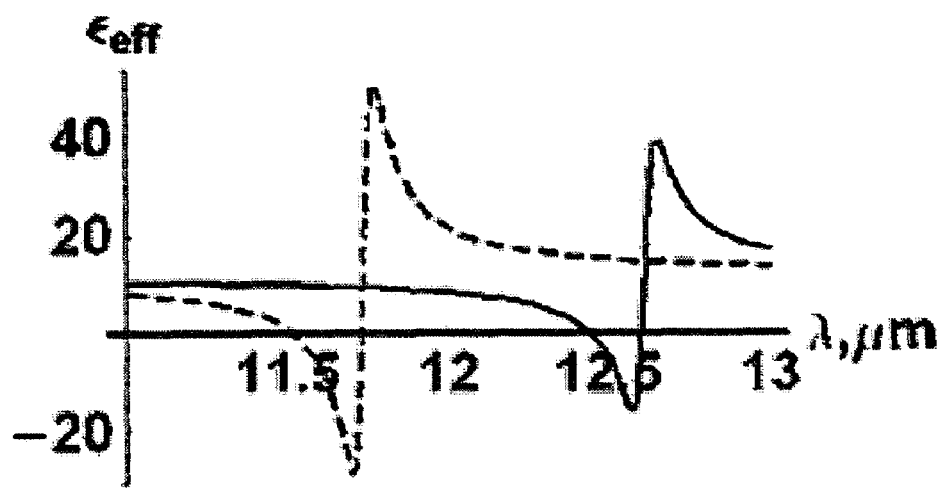
FIG. 17A is a graph showing the real part of the effective $\in_\perp$ and $\in_\parallel$ for a fourth exemplary aligned wire structure.
Figure 17B:
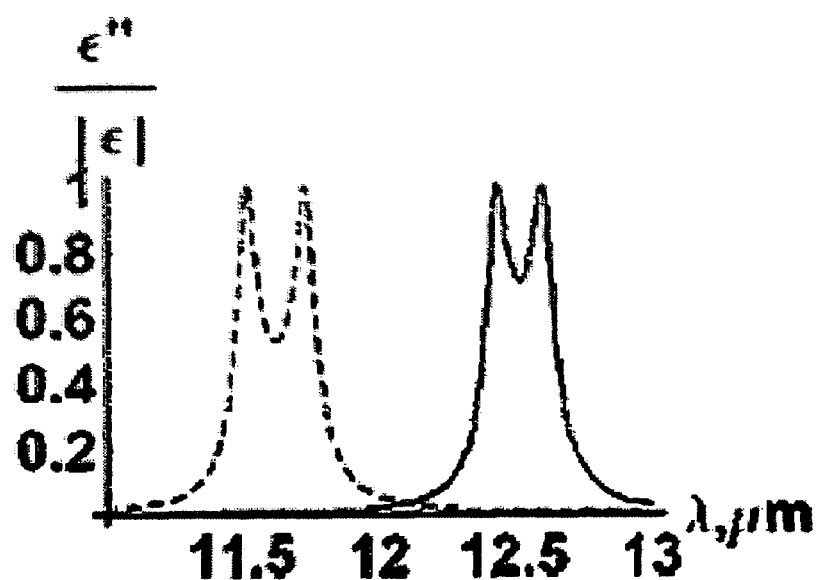
FIG. 17B is a graph showing the corresponding absorption of the system considered in FIG. 17A.

FIGS. 16A and 16B and FIGS. 17A and 17B illustrate the effective dielectric constants for several exemplary aligned wire structures. In particular, FIG. 16A is a graph 1600 showing the real part of the effective $\epsilon_\perp$ (shown as solid curve) and $\epsilon_\parallel$ (shown as dashed curve) for an exemplary aligned wire system comprising embedded Ag nanowires in SiO2 where $N_{pl} = 0.05$. FIG. 16B is a graph 1610 showing the corresponding absorption of the system. FIG. 17A is a graph 1700 showing the real part of the effective $\epsilon_\perp$ (shown as the solid curve) and $\epsilon_\parallel$ (shown as the dashed curve) for an exemplary aligned wire system comprising embedded SiC nanowires in Si where $N_{pl} = 0.1$. FIG. 17B is a graph 1710 showing the corresponding absorption for the system. Note that in contrast to the layered system described above, these wired composites have low absorption in the near-IR-NIM regime.

2. Expanded Discussion of the Electromagnetic Properties of Exemplary Aligned Wire Structures In the following section, an expanded discussion of the electromagnetic characteristics of the exemplary aligned architecture introduced above is provided. This discussion shows, for example, that the stretching/compression of the wire structures (e.g., by about 10%) can dramatically affect the electromagnetic properties of the system and, in some cases, change the sign of the components of permittivity tensor.

The geometry of the exemplary wire composites considered is shown in FIG. 13. Because the exemplary wires considered are on the nanometer scale, they are sometimes referred to as "nanowires," though it should be understood that the disclosed technology is not limited to wires on the nanometer scale and may instead be smaller or larger. In the exemplary structures, nanowires with permittivity $\epsilon_{in}$ are embedded into a host material with permittivity $\epsilon_{out}$. The nanowires are aligned along the z direction of the Cartesian coordinate system. It is assumed for purposes of this discussion that the nanowires have an elliptic cross-section with the semi-axes $r_x$ and $r_y$ directed along x and y coordinate axes, respectively, though other cross-sections are possible. The typical separation between the nanowires' x and y directions can be denoted as $l_x$ and $l_y$. This discussion is principally focused on the case of "homogeneous metamaterial," where the inhomogeneity scale is smaller than the wavelength ($r_\alpha$, $l_\alpha \ll \lambda$) and the nanowire concentration N is small so that lattice feedback effects can be treated using perturbative techniques as described below. Under these conditions, Maxwell equations have free-space-like solutions that can be represented as a series of plane electromagnetic waves propagating inside a material with some effective dielectric permittivity $\epsilon_{eff}$:

$$\langle D_\alpha \rangle = \epsilon_{\alpha\beta}^{eff} \langle E_\beta \rangle. \tag{26}$$

In Equation (26), the angled brackets denote the average over a microscopically large (multi-wire), macroscopically small (subwavelength) region of the space, the Greek indices corresponding to Cartesian components, and the summation over the repeated index is assumed. If both $\epsilon_{in}$ and $\epsilon_{out}$ are isotropic, the normal axes of the tensor of effective dielectric permittivity coincide with the coordinate axes. Thus, in the exemplary geometry, the permittivity tensor becomes diagonal:

$$\epsilon_{\alpha,\beta}^{eff} = \delta_{\alpha\beta} \epsilon_{\beta\beta}^{eff}, \tag{27}$$

with $\delta_{\alpha\beta}$ being the Kronecker delta function.

Expressions for the components of the effective permittivity $\epsilon_{xx}^{eff}$, $\epsilon_{yy}^{eff}$, $\epsilon_{zz}^{eff}$ can now be derived. Specifically, using the continuity of the $E_z$ component, Equation (27) yields:

$$\epsilon_{zz}^{eff} = N\epsilon_{in} + (1-N)\epsilon_{out}. \tag{28}$$

Note that the single parameter that determines the z component of the permittivity in the effective medium regime is the nanowire concentration N.

In-plane (x, y) components of the permittivity tensor can be found using the Maxwell-Garnett approximation (MGA). In this approach, the nanowire concentration is considered to be small and therefore the local field in the exemplary aligned wire structure is considered to be homogeneous across a nanowire. Consequently, the field inside the nanowire $E_{in}$ is also homogeneous and can be related to the local excitation field $E_{ex}$ via $$E_{in;\alpha} = \frac{\epsilon_{ex}}{(1-n_\alpha)\epsilon_{out} + n_\alpha \epsilon_{in}} E_{ex;\alpha}, \tag{29}$$

with $\{n_x, n_y\} = \{r_y/(r_x+r_y), r_x/(r_x+r_y)\}$ being the depolarization factors determined by the nanowire cross-section. A combination of Equations (27) and (29) yields the following expression for the in-plane components of permittivity:

$$\epsilon_{\alpha\alpha}^{eff} = \frac{N\epsilon_{in} E_{in;\alpha} + (1-N)\epsilon_{out} E_{out;\alpha}}{N E_{in;\alpha} + (1-N) E_{out;\alpha}}, \tag{30}$$

with $E_{out}$ being the average field between the nanowires as described below. As seen from Eq. (30), the effective-medium response of the nanowire composite can be determined by nanowire cross-section and average concentration of the nanowires N. Further, the effective medium properties are also influenced by the nanowire distribution (given by the parameters $l_x$, $l_y$), which affect both $E_{in}$ and $E_{out}$. To calculate the effect of distribution anisotropy on the permittivity tensor, a microscopically large, macroscopically small region of the composite subjected to the incident field $E_0$ can be considered. In the limit $N \ll 1$ considered here, the excitation field acting on a nanowire in the sample $E_{ex}$ will contain the major contribution from external field $E_0$ and the feedback field scattered by all other nanowires in the structure $\hat{\chi} E_0$. Such a feedback field will in turn contribute to the excitation field in the system, and will consequently result in the secondary excitation $\hat{\chi}^2 E_0$. The direct summation of these series yields the equilibrium state $E_{ex;\alpha}=[\delta_{\alpha\beta}-\chi_{\alpha\beta}]^{-1}E_{0;\beta}$. For rectangular, triangular, and other highly-symmetrical lattices, as well as for a wide-class of random nanowire micro-arrangements, the feedback tensor becomes diagonal, so that $$E_{ex;\alpha} = \frac{1}{1-\chi_{\alpha\alpha}} E_{0;\alpha}. \tag{31}$$

Specifically, for rectangular lattices, the straightforward summation of dipole fields yields:

$$\chi_{\alpha\alpha} = \frac{\epsilon_{in}-\epsilon_{out}}{\epsilon_{out}+n_\alpha(\epsilon_{in}-\epsilon_{out})} \times \frac{r_x r_y}{4 l_x l_y}\left[\gamma_{l;\alpha}S(\gamma_{l;\alpha}) - \frac{1}{\gamma_{l;\alpha}}S\left(\frac{1}{\gamma_{l;\alpha}}\right)\right] \simeq \tag{32}$$

$$\frac{0.16N(\epsilon_{in}-\epsilon_{out})(1-\gamma_{l;\alpha})}{\epsilon_{out}+n_\alpha(\epsilon_{in}-\epsilon_{out})}$$

where the lattice distortion vector $\{\gamma_{l;x}, \gamma_{l;y}\}=\{1_x/1_y, 1_y/1_x\}$ is introduced, and where the function $$S(\xi) = \sum_{ij} \frac{i2}{(i^2+\xi^2 j^2)^2}$$

with summation going over all pairs of i,j except coordinate origin. Note that the feedback parameter disappears for the isotropic nanowire distribution $l_x=l_y$ yielding the well-known MGA result. The average field across the typical nanowire cell, $E_{out}$ can be described by:

$$E_{out;\alpha} \simeq E_{0;\alpha} + \frac{E_{ex;\alpha}N}{2\pi(1-N)} \frac{\epsilon_{in}-\epsilon_{out}}{\epsilon_{out}+n_\alpha(\epsilon_{in}-\epsilon_{out})} \times [\gamma_{l;\alpha}- \tag{33}$$

$$\gamma_{r;\alpha}+(\pi-2)(\gamma_{l;\alpha}-1-N(\gamma_{r;\alpha}+\gamma_{l;\alpha}-2))]$$

with shape vector $\{\gamma_{l;x}, \gamma_{l;y}\}=\{r_x/r_y, r_y/r_x\}$.

To study the limitations of the MGA technique, 3-D Maxwell equations were numerically solved with COMSOL Multiphysics 3.2 and compared with the results of the analytical approach described above. In particular, two types of numerical simulations were performed. In the first set of numerical experiments, the quasi-static response of the exemplary aligned wire structures was studied. FIGS. 18 and 19A-D show the agreement between the direct solution of Maxwell equations and the MGA approach presented above for concentrations N≦0.3 and deformations $|\gamma_{r;\alpha}-1|$, and $|\gamma_{l;\alpha}-1|$≦0.3. In particular, FIG. 18 shows $\in_{\mathit{eff};z}$ for an exemplary nanowire composite with $\in_{in}=-2.5$ and $\in_{out}=2$, corresponding to Ag nanowires in a polymer for λ≅360 nm as a function of the nanowire concentration. FIGS. 19A-D show respective graphs 1900, 1902, 1904, 1906 of $\in_{xx}^{eff}$ and $\in_{yy}^{eff}$ components of an exemplary structure as in FIG. 13. In FIGS. 19A-D, the triangles show the numerical calculations of $\in_{xx}^{eff}$, solid lines show the result of Equation (30) for $\in_{xx}^{eff}$, rectangles show the numerical calculations of $\in_{yy}^{eff}$, and the dashed lines show the result of Equation (30) for $\in_{yy}^{eff}$. Further, in FIG. 19A, $\gamma_{l;x}=\gamma_{r;x}=1$; in FIG. 19B, $\gamma_{l;x}=1.2$ and $\gamma_{r;x}=0.8$; in FIG. 19C, $\gamma_{l;x}=1.2$ and $\gamma_{r;x}=1$; and in FIG. 19D, $\gamma_{l;x}=1$ and $\gamma_{r;x}=0.8$. As can be seen, the breakdown of MGA occurs at high nanowire concentrations, when the local field becomes inhomogeneous on the scale of $r_\alpha$.

The numerical simulations indicate that the quasi-static material properties can be described by average parameters (N; $l_\alpha$; $r_\alpha$) and are almost unaffected by local nanowire arrangements. This particular property indicates that the exemplary strongly anisotropic aligned wire structures and other similar inclusion-based designs are highly tolerant to potential fabrication defects. Further, even 10% anisotropy in inclusion shape or distribution may dramatically affect material properties and result in a change of the sign of dielectric permittivity. Thus, optical components (e.g., polarizers, beam shapers, and so on) can be created having widely controllable optical-mechanical properties. Strongly anisotropic aligned wire structures can also be used for high-performance polarization-sensitive sensing and fluorescence studies, as well as for a wide class of ultra-compact waveguides since the material properties may be tuned between $\in\approx 0$ and $|\in|>>1$.

Figure 20:
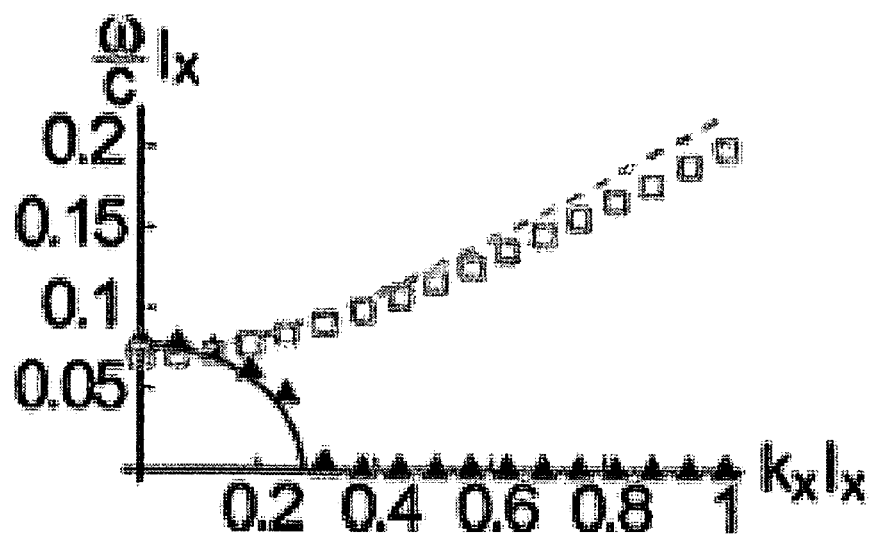
FIG. 20 is a graph showing dispersion characteristics of the TM mode and TE mode in another exemplary waveguide.
Figure 21:
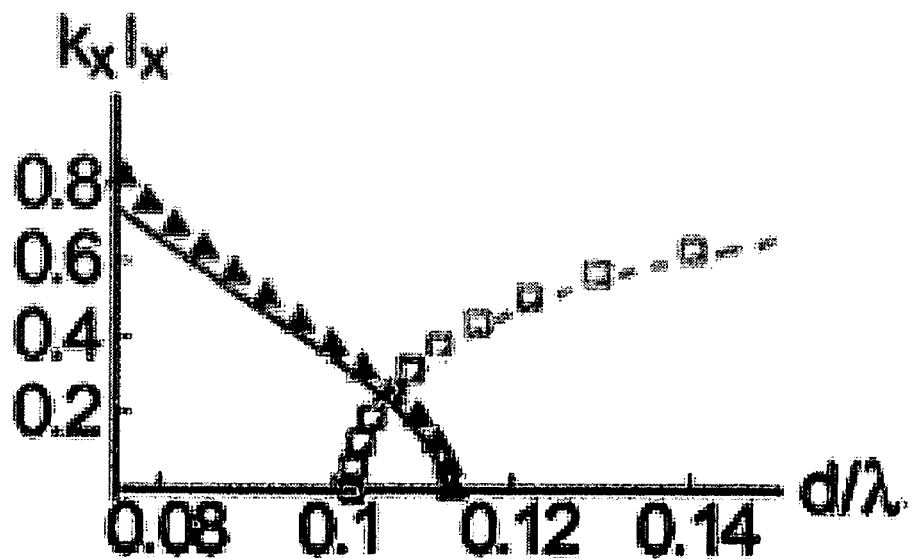
FIG. 21 is a graph showing modal propagation as a function of waveguide size for an exemplary waveguide.

To investigate the effects related to nonlocal material response, the x-direction wave propagation through a planar waveguide was simulated with an exemplary composite core consisting of 10% Ag nanowires in a Si host. FIGS. 20 and 21 show a comparison of these simulations to the dynamics of TE and TM modes propagating in a waveguide with a homogeneous strongly anisotropic core, described by:

$$\frac{\pi^2}{\epsilon_{yy}^{eff}d^2}+\frac{k_x^{(TE)2}}{\epsilon_{yy}^{eff}}=\frac{\omega^2}{c^2}; \frac{\pi^2}{\epsilon_{xx}^{eff}d^2}+\frac{k_x^{(TM)2}}{\epsilon_{zz}^{eff}}=\frac{\omega^2}{c^2}, \tag{34}$$

with $k_x$ being the modal wavevector, c being speed of light in the vacuum, d being the waveguide thickness, and ω=2π/λ. In particular FIG. 20 is a graph 2000 showing the dispersion characteristics of the fundamental TM mode (where triangles show the simulation results and solid lines show results of Equation (34)) and the TE mode (where squares show the simulation results and dashed lines show the results of Equation (34)) in an exemplary waveguide with d=400 nm having a nanowire composite core with $\in_{in}=13$, $\in_{out}=-120$, $\gamma_{l;x}=1.2$, $\gamma_{r;x}=0.8$, $l_x=40$ nm, and $r_x=10$ nm. Note the existence of a negative refraction mode.

FIG. 21 is a graph 2100 showing the modal propagation constant for λ=1.5 µm as a function of waveguide size. In FIG. 21, perfectly conducting waveguide walls were assumed. The solid and dashed lines in FIG. 21 correspond to modes in waveguides with homogeneous dielectric cores with $\in_{eff}$ given by Equations (28) and (30). The symbols in FIG. 21 correspond to numerical solutions of 3-D Maxwell equations. The breakdown of MGA corresponds to $|k_\alpha l_\alpha|\sim 1$.

From FIGS. 20 and 21, it can be observed that the MGA technique describes well the response of aligned wire systems when $|k_\alpha l_\alpha|<<1$. Further, in the effective-medium regime $|k_{g\alpha}l_{60}|>>1$, the material properties are independent of local wire arrangements (e.g., the type of crystalline lattice), while the point of EMT breakup ($|k_\alpha l_\alpha|_{max}$) depends on the local geometry and is maximized for almost-rectangular lattices, which were assumed in the derivation of Equation (32). In general, the spatial dispersion leads to a cut-off of the modes. FIGS. 20 and 21 also show that a negative refraction index can be obtained in a wire-based non-magnetic low-loss planar waveguide.

The discussion above demonstrates how an aligned wire composite can be used to achieve strong anisotropy at optical and IR frequencies with a controlled effective permittivity ranging from $\in<<-1$ to $\in\approx 0$ to $\in>>1$. Further, the analytical techniques can be readily applied to dielectric, plasmonic, and polar-wire composites at optical, IR, and THz frequencies, and can be further extended to the cases of non-alligned inclusions, anisotropic $\in_{in}$ and $\in_{out}$, and 3D composites similar to what have been done for isotropic-arrangement cases in, for example, Levy, O., et al., "Maxwell-Garnett Theory for Mixtures of Anisotropic Inclusions: Application to Conducting Polymers," *Phys. Rev. B* 56, 8035 (1997); Lakhtakia, A., et al, "The Role of Anisotropy in the Maxwell-Garnett and Bruggeman Formalisms for Uniaxial Particulate Composite Media," *J. Phys. D: Appl. Phys.* 30, 230 (1997); and Milton, G. W., *The Theory of Composites*, Cambridge U. Press (Cambridge, UK 2002).

C. Exemplary Embodiments Using Materials With an Effective Electron Mass Anisotropy As discussed, certain embodiments of the disclosed left-handed materials desirably have a strongly anisotropic dielectric response. To implement these embodiments, a material with an effective electron mass anisotropy can be used. For example, monocrystalline bismuth is one such material and can be used in embodiments of the disclosed technology.

The high-frequency dielectric constant of a (semi-)conductor material containing a substantial amount of free electrons or holes is typically dominated by the dynamics of the free charge carriers. The resulting response is plasma-like, with the dielectric constant being adequately described by the Drude model:

$$\epsilon(\omega) = \epsilon_0 + \frac{\omega_p^2}{\omega(\omega + i\Gamma)}, \quad (35)$$

where $\in_0$ is the (frequency-independent) contribution of the bound electrons, $\Gamma$ describes inelastic processes, and the plasma frequency $\omega_p$ is defined by the free-charge-carrier concentration N and the effective mass $m_{eff}$. Further, $$\omega_p^2 = \frac{Ne^2}{m_{eff}}. \quad (36)$$

See, e.g., Landau, L. D., et al, *Course of Theor. Phys.*, vol, 8, 2nd ed., Reed Ltd. (1984).

As can be seen from Equations (35) and (36), the effective dielectric constant changes sign when the excitation frequency crosses the plasma frequency. See, e.g., Kittel, C. *Introduction to Solid State Physics* (Wiley, New York 1976). Also, the anisotropy of the effective mass leads to the anisotropy of the plasma frequency, and correspondingly, to the anisotropy of the dielectric constant. The strongly anisotropic dielectric constants can therefore be obtained by selecting a material that has strongly anisotropic effective carrier mass for a system that operates at a frequency between the plasma frequencies corresponding to the different effective mass directions.

For example, a thin monocrystalline bismuth film can be used (e.g. having the trigonal axis ($C_3$) perpendicular to the film surface). The strong anisotropy of the effective masses of the electrons and holes in this semimetal (by a factor of up to ~100 for the electron pockets) leads to different values of the plasma frequency depending on the direction of the electric field. For instance, in one exemplary configuration considered, $\omega_{p,\perp}=187$ cm$^{-1}$ for the electric field perpendicular to its $C_3$ crystalline axis, and $\omega_{p,\parallel}=158$ cm$^{-1}$ for the electric field parallel to the $C_3$ axis. See, e.g., Boyle, W. S., et al., "Far Infrared Studies of Bismuth," *Phys. Rev.* 120, 1943 (1960). Therefore, for the frequencies $\omega_{p,\parallel}<\omega<\omega_{p,\perp}$ (corresponding to the THz domain), $\in_\perp<0$ and $\in_\parallel>0$.

Figure 22:
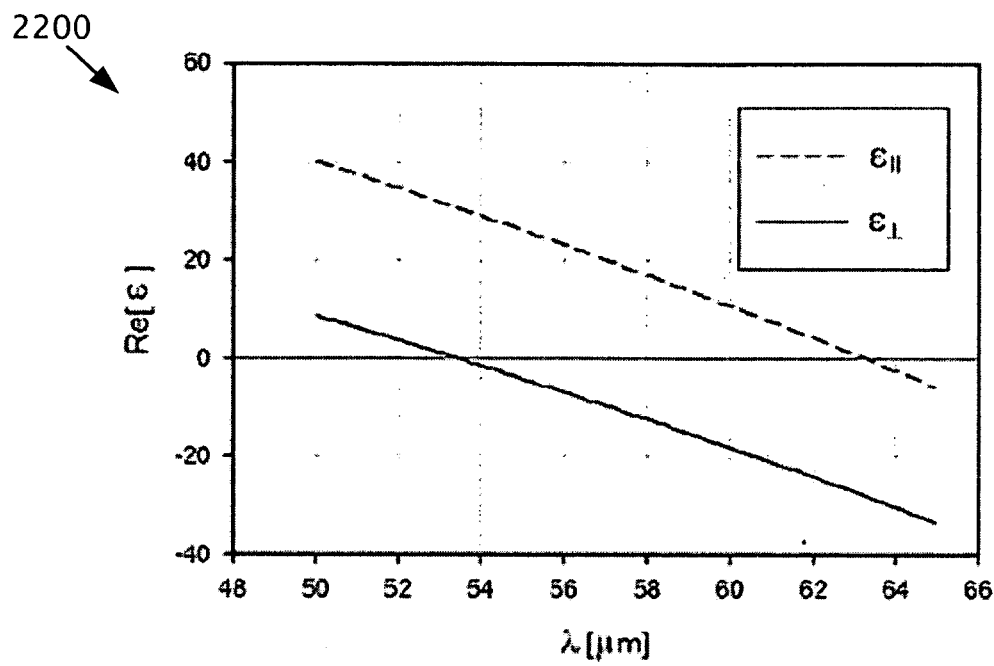
FIG. 22 is a graph showing the real part of the dielectric function of bismuth at the liquid helium temperature as a function of the wavelength for an exemplary left-handed system based on a bismuth film.
Figure 23:
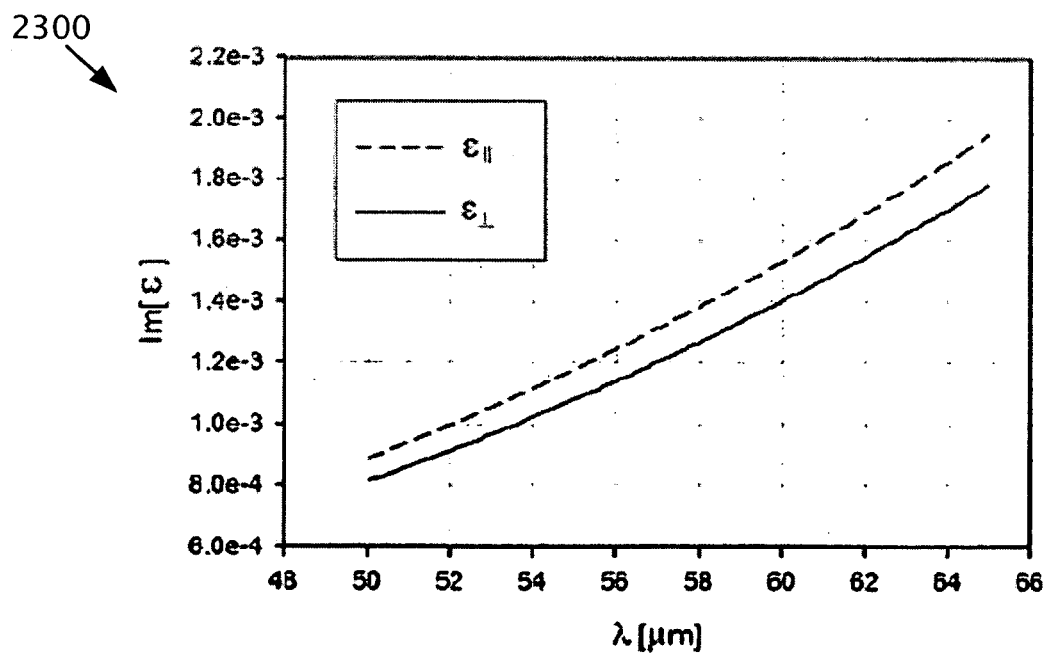
FIG. 23 is a graph showing the imaginary part of the dielectric function of bismuth at the liquid helium temperature as a function of the wavelength for the exemplary left-handed system based on a bismuth film.

Another property that can be realized in left-handed systems based on bismuth film is low material loss. For example, bismuth mono-crystalline systems can yield the carrier mean free path at liquid helium temperatures on the order of millimeters. See, e.g., Friedman, A. N., et al., *Am. Phys. Soc. Ser. II* 4, 168 (1959); Reneker, D. H., "New Oscillatory Absorption of Ultrasonic Waves in Bismuth in a Magnetic Field," *Phys. Rev. Letters* 1, 440 (1958); Reneker, D. H., "Ultrasonic Attenuation in Bismuth at Low Temperatures," *Phys. Rev.*, 115, 303 (1959). As a result, the typical imaginary part of the dielectric constant of Bi can reach values on the order of $10^{-6}$. For example, FIGS. 22 and 23 are graphs 2200 and 2300 showing the real parts and the imaginary parts, respectively, of the dielectric function of bismuth at the liquid helium temperature as functions of the wavelength in the THz frequency range. The "perpendicular" direction ($\perp$) is that of the $C_3$ crystallographic axis. The x-axis corresponds to the zero of the dielectric constant. Such a low loss can be advantageous for imaging and transmission applications. See, e.g., Poldolskiy V., "Near-sighted Superlens," *Optics Letters* 30, 75 (2005).

Figure 24:
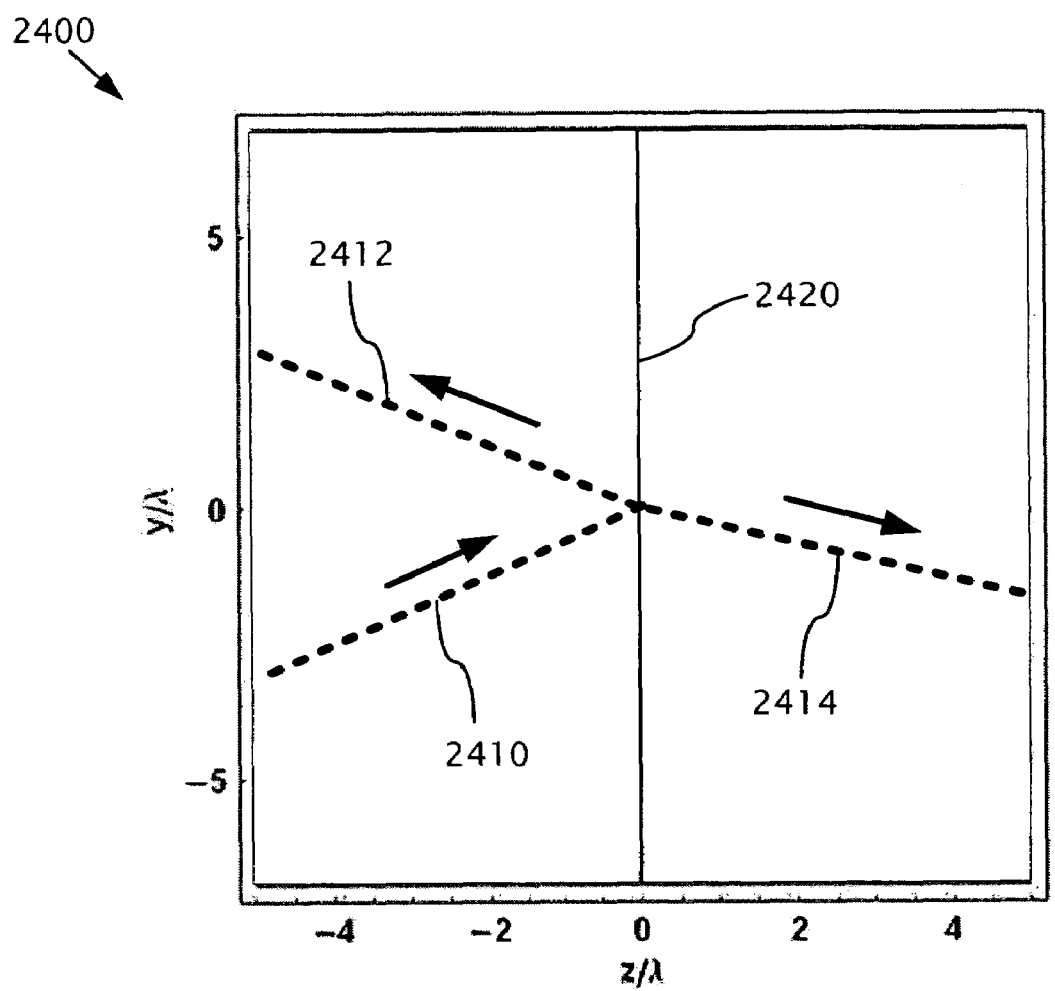
FIG. 24 is a diagram demonstrating the refraction of a wavepacket incident on an exemplary Bismuth-based LHM system from a conventional waveguide.

FIG. 24 is a schematic diagram 2400 demonstrating the refraction of a wavepacket incident on the Bi-based LHM system from a conventional waveguide. More specifically, FIG. 24 shows the refraction of a beam incident on an exemplary waveguide with a bismuth core for a wavelength within the negative index of refraction interval as described above obtained from direct numerical solutions of Maxwell's equations. The arrows show the direction of the propagation of incident beam 2410, reflected beam 2412, and refracted beam 2414. The medium on the left side of the boundary 2420 is an isotropic dielectric with $\in=55$, whereas the medium on the right side is monocrystalline bismuth, and the whole system is in a metallic waveguide with a thickness of d=4.5 μm and a (free space) wavelength of λ=61 μm. In other embodiments, the desired response can be obtained using other intrinsically anisotropic semi-metal crystals.

D. Alternative Inclusion-Based Embodiments

In addition to the embodiments described above having nanowires embedded in a dielectric host, other composites having inclusions embedded in a host material can be used to achieve the desired left-handed optical characteristics. For example, randomly distributed inclusions (e.g., nanoparticles) with a negative dielectric constant and having a variety of shapes can be embedded into a transparent dielectric host having a positive dielectric constant. The negative $\in$ in these embodiments can be achieved both in optical and infrared frequency ranges by using plasmonic (e.g., Ag, Au, and the like) or polar (e.g., SiC, and the like) materials to at least partially form the inclusions.

In the following analytical descriptions of such composites, it is assumed that the typical size of the inclusions is much smaller than the wavelength, that the inclusions have an elliptical shape, and that the average inclusion concentration is small. Thus, the field inside the inclusion $E_{in}$ can be considered to be homogeneous, and the field inside the dielectric host can be considered to have two components—a homogeneous part $E_0$, and a "dipole" component $E_d$. The effective dielectric constant of the composite can be calculated using:

$$\epsilon_{\mathit{eff}} = \frac{p\epsilon_m E_{in} + (1-p)\epsilon_d(E_0 + <E_d>)}{pE_{in} + (1-p)(E_0 + <E_d>)} \qquad (37)$$

where $\epsilon_m$ and $\epsilon_d$ are the dielectric constants of the inclusion and host materials, and p is the average inclusion concentration.

It can be shown that for the case of evenly distributed spherical particles, the value $<E_d>=0$, so that Equation (37) yields the well-known Maxwell-Garnett result, which can be extended for the case of evenly distributed spherical inclusions with a strongly anisotropic dielectric constant. See, e.g., Levy, O. et al., "A Maxwell-Garnett Theory for Mixtures of Anisotropic Inclusions: Applications to Conducting Polymers," *Phys. Rev. B* 56, 8035 (1997).

If the inclusions have an anisotropic shape (for example, ellipsoidal), or if the average separation between the inclusions is anisotropic (this can be achieved, for example, by stressing (or deforming) the composite with an isotropic inclusion concentration), $E_d$ does not disappear and can be estimated using:

$$<E_d> = \frac{p}{4} \frac{\epsilon_d(\epsilon_m - 1)\left(I(\alpha_d) - \frac{I(\alpha_d)}{\pi}\right)}{(1-n)\epsilon_d + n\epsilon_m} E_0, \qquad (38)$$

where n is the so-called depolarization factor, $a_d$ and $a_i$ describe the anisotropy of the inclusion shape and distribution correspondingly, and the function I is obtained from a direct integration of a dipole field over the elliptical cell.

In particular, if the system is represented by metallic-dielectric layers stacked in the x-direction using $n_x=1$, $n_y=n_z=0$, the following relationships are obtained:

$$\epsilon_{\parallel} = p\epsilon_m + (1-p)\epsilon_d \qquad (39)$$

$$\epsilon_{\perp} = \frac{\epsilon_d \epsilon_m}{p\epsilon_d + (1-p)\epsilon_m}.$$

Figure 25A:
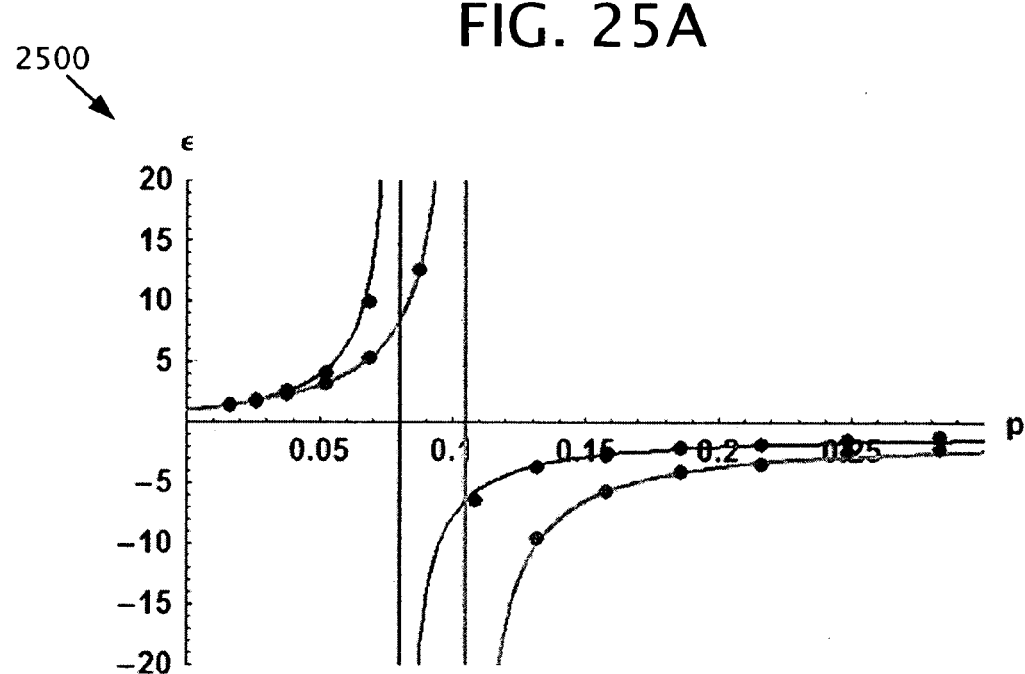
FIG. 25A is a graph showing the effective dielectric constant in a structure comprising metallic elliptic cylinders homogenously distributed in a dielectric host.
Figure 25B:
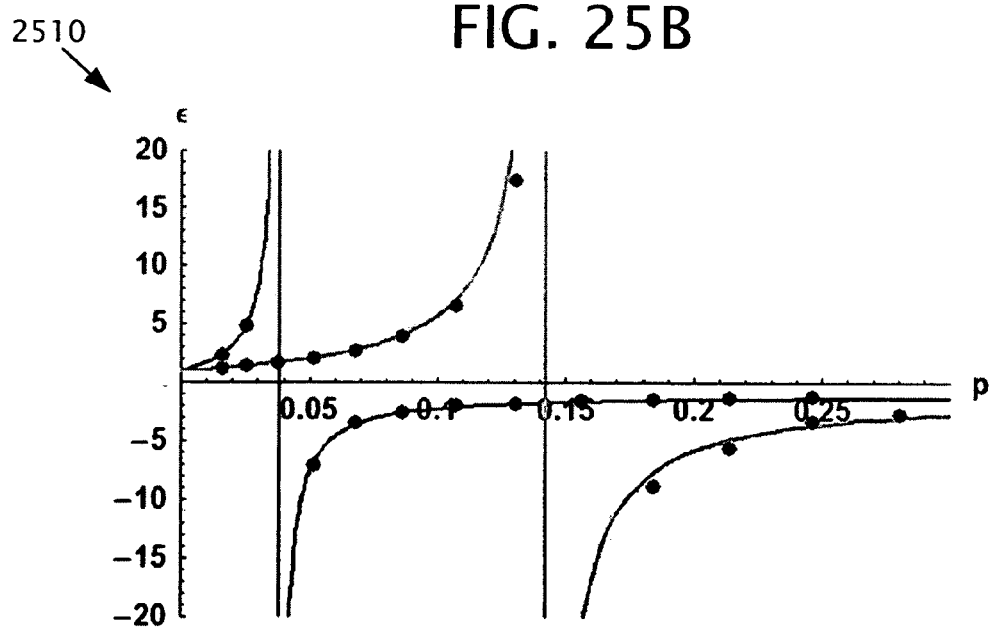
FIG. 25B is a graph showing the effective dielectric constant in a structure comprising anisotropically distributed circular metallic cylinders distributed in a dielectric host.

In FIGS. 25A and 25B, agreement between the numerical solution of Maxwell's equations to the prediction in Equation (above-1) is shown. In particular, FIGS. 25A and 25B are graphs 2500, 2510 respectively showing the effective dielectric constant in a structure comprising metallic elliptic cylinders homogenously distributed in a dielectric host (FIG. 25A) and in a structure comprising anisotropically distributed circular metallic cylinders distributed in a dielectric host (FIG. 25B), where the spatial anisotropy is 1.2, $\epsilon_d=1$, $\epsilon_m=-1.2$, and where the circles in the graphs show results of numerical simulations and the lines in the graphs represent Equation (39).

Figure 26:
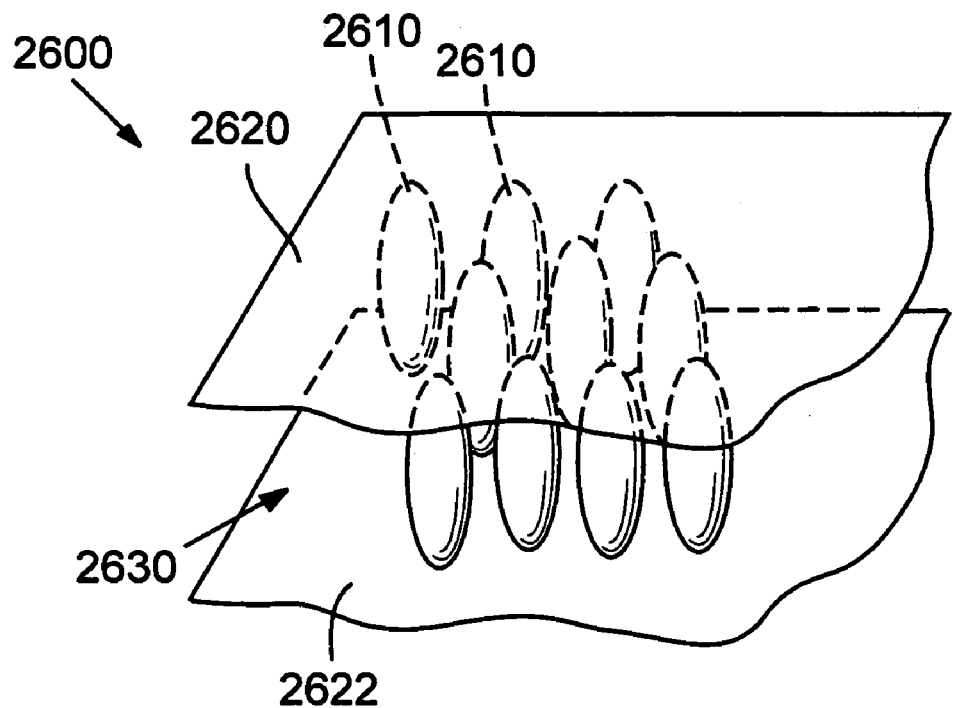
FIG. 26 is a schematic block diagram showing an exemplary composite structure comprising elliptical inclusions as may be used in the core of the exemplary waveguide architecture shown in FIGS. 1 and 6.
Figure 27:
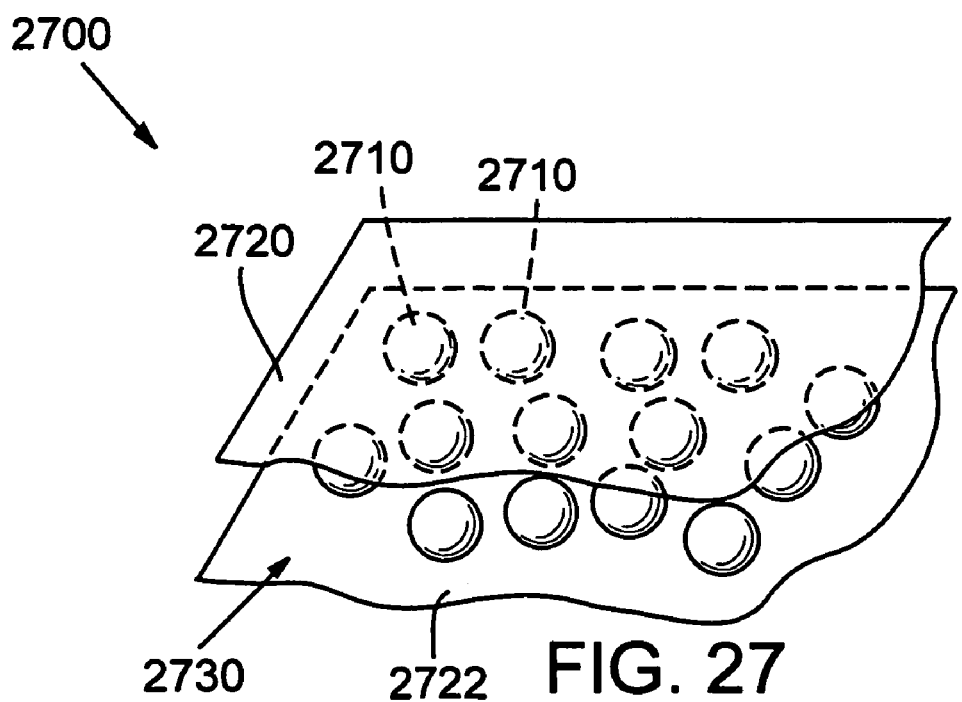
FIG. 27 is a schematic block diagram showing an exemplary composite structure comprising spherical inclusions as may be used in the core of the exemplary waveguide architecture shown in FIGS. 1 and 6.

FIGS. 26 and 27 are diagrams schematically showing examples of other possible composite structures 2600, 2700. Ellipses 2610 shown in FIG. 26 and spheres 2710 in FIG. 27 represent inclusions with a negative dielectric constant. The space between the inclusions corresponds to a material with a positive value of permittivity. Planes 2620, 2622 in FIG. 26 and planes 2720, 2722 in FIG. 27 represent waveguide walls.

More specifically, FIG. 26 schematically illustrates a composite structure 2600 comprising subwavelength (nanostructured) inclusions 2610 having an anisotropic shape (elliptical) in an isotropic dielectric host 2630. In this exemplary composite, all or substantially all of the inclusions 2610 are desirably aligned or substantially aligned and homogeneously distributed or substantially homogenously distributed in the dielectric host 2630. The shape of the inclusion generally defines the frequency range of LHM response. In certain implementations, no special arrangement of the inclusions (except for their alignment) is necessary to achieve the desired dielectric properties. To give just one example, for the composite of 10% SiC nano-spheroids with an aspect ratio of 1/2 and aligned with their shorter axis along the x axis and embedded in quartz, the following values for the dielectric constant can be obtained: $\epsilon_{\perp} \approx -2.7 + 6 \times 10^{-4}i$ and $\epsilon_{\parallel} \approx 1.6 + 1 \times 10^{-5}i$.

FIG. 27 illustrates a composite structure 2700 comprising isotropic inclusions 2710 (for example, spherical inclusions) in a dielectric host 2730. In some embodiments, the strong anisotropy of this composite can be achieved by the anisotropic distribution of the inclusions 2710. For example, one may deposit a dielectric spacer followed by a deposition of inclusions (e.g., a random deposition), or deform the composite with isotropic inclusion distribution. Numerical computations show, for example, that a composite of 15% Ag nano-spheres in TiO$_2$ with an average separation between inclusions in the x direction being half of that in the y and z directions produces the following values for the dielectric constant: $\epsilon_{\perp} \approx -25 + 2i$ and $\epsilon_{\parallel} \approx 90 + 10i$ at $\lambda = 0.75$ μm. In certain embodiments, the isotropic inclusions are embedded in a host material that is itself anisotropic. The isotropic inclusions of these embodiments can be anisotropically distributed (as above) or, in some instances, isotropically distributed.

In addition to the exemplary structures described above, other structures for realizing the desired left-handed properties are also possible. For instance, a layered structure based on multiple semiconductor quantum wells (where the mobility of the electrons is different in the x direction and the y-z plane) can be used. See, e.g., Shvets, G. "Photonic approach to making a material with a negative index of refraction," *Phys. Rev. B* 67, 035109 (2003). Additionally, a planar transmission line LHM technique can be used. See, e.g., Iyer, A. K., et al., "Experimental and theoretical verification of focusing in a large, periodically loaded transmission line negative refractive index metamaterial," *Optics Express* 11, 696 (2003).

E. Fabrication Considerations

The disclosed structures can be formed through a variety of techniques. For example, embodiments of the inclusion-based or aligned wire designs can be fabricated by depositing metal inclusions or nanowires into a dielectric host using known e-beam or ion-beam lithographic deposition techniques, colloid depositions techniques, or plasma despostions. Ion beam or e-beam shaping of dielectric, metallic, or pre-manufactured nanolayered materials can also be performed. In certain embodiments, these techniques are used to form dielectric (including vacuum or aperture) inclusions inside a metallic host. Electrochemical techniques, selective etching or other chemical processes, or any other suitable nanofabrication technique can also be used.

Embodiments of the layer-based designs can similarly be fabricated using a wide variety of suitable techniques. For example, such embodiments can be fabricated using chemical vapor deposition (CVD), metalorganic chemical vapor deposition (MOCVD), or plasma deposition of the metallic and dielectric layers. Further, lithographic techniques as described above and thermal evaporation techniques can also be used. Still further, for certain embodiments, crystal growth methods can be used.

The initial design and on-going analysis of the material can be performed, for example, numerically, via mode-matching, Finite-difference time-domain (FDTD) simulations or via solution of coupled-dipole equations (CDEs) as described above. See, e.g., Podolskiy, V. A., et al., "Plasmon Modes in Metal Nanowires," *Journal of Nonlinear Optical Physics and Materials* 11, 65 (2002); Landau, L. D., et al, *Course of Theor. Phys.*, vol, 8, 2nd ed., Reed Ltd. (1984); Purcell, E. M., et al., *Astrophys. J.* 405, 705 (1973); Draine, B. T., "Discrete dipole approximation and its application to interstellar graphite grains," *Astrophys. J.* 333, 848 (1988). For instance, the techniques for implementing the solutions of CDEs described in Podolskiy, V. A., et al., "Plasmon Modes in Metal Nanowires," *Journal of Nonlinear Optical Physics and Materials* 11, 65 (2002).

Using the combination of CDEs and the generalized Maxwell-Garnett approach described above, one can design and physically model a system with a strong anisotropy of the effective dielectric constant at desired frequencies (for example, optical frequencies). Once the physical parameters are determined, the NIM structure can be fabricated using any of the above-described techniques.

IV. Imaging Characteristics of Exemplary Embodiments of the NIM Structures

A substantially planar system with a strongly anisotropic core supports the propagation modes with a negative refraction index even when the waveguide thickness is smaller than the wavelength. Using the small (on the scale of a wavelength) variation of a waveguide thickness d in these systems, it is possible to achieve further compression of propagating free-space modes in the x direction. Due to such a compression, the local intensity of a pulse will grow $\propto 1/d^2$—a phenomenon which can be beneficial for nm-scale nonlinear photonics and all-optical processing. The energy confinement in the lateral (y, z) directions can be achieved using the effect of planar lensing, common in materials with negative refractive index, based on the reversal of Snell's law in these systems. Planar lensing is illustrated below using the example of imaging a double-slit system with the planar waveguide geometry.

In general, imaging by an arbitrary optical system can be reduced to isolating mode propagation in such a system. Specifically, the spatial resolution of any monochromatic optical system can be related to its ability to restore the broad wavevector ($k_y$) spectrum emitted by a source. The components of this spectrum can be separated into two fundamentally different parts. The waves with $|k_y|<|\omega n|/c$ will propagate away from the source, and the relative phase difference between these waves will increase as the distance between the source and the point of observation is increased. In principle, the information about the "thick" ($\geq |2n|$) features of the source, contained in these waves, can be accessed at an arbitrary point in space by compensating for this phase difference. The information about the "fine structure" of the source (features $\leq \lambda/|2n|$), however, is contained in the part of the spectrum with $|k_y| \geq |\omega n|/c$. The corresponding waves, known as evanescent waves, exponentially decay away from the source. These exponentially decaying waves (along with information they contain) can be directly accessed in the near-field proximity to the source. Alternatively, some part of the evanescent spectrum can be restored by NIMs via resonant excitation of surface waves. Such restoration, however, can be suppressed by the material absorption. Further, the boundary between the propagating and evanescent parts of the spectrum is defined by both wavelength $\lambda$ and index of refraction n of a material around the source. Therefore, it is possible to achieve the desired subwavelength far-field resolution using materials with relatively large refraction indices.

Figure 28:
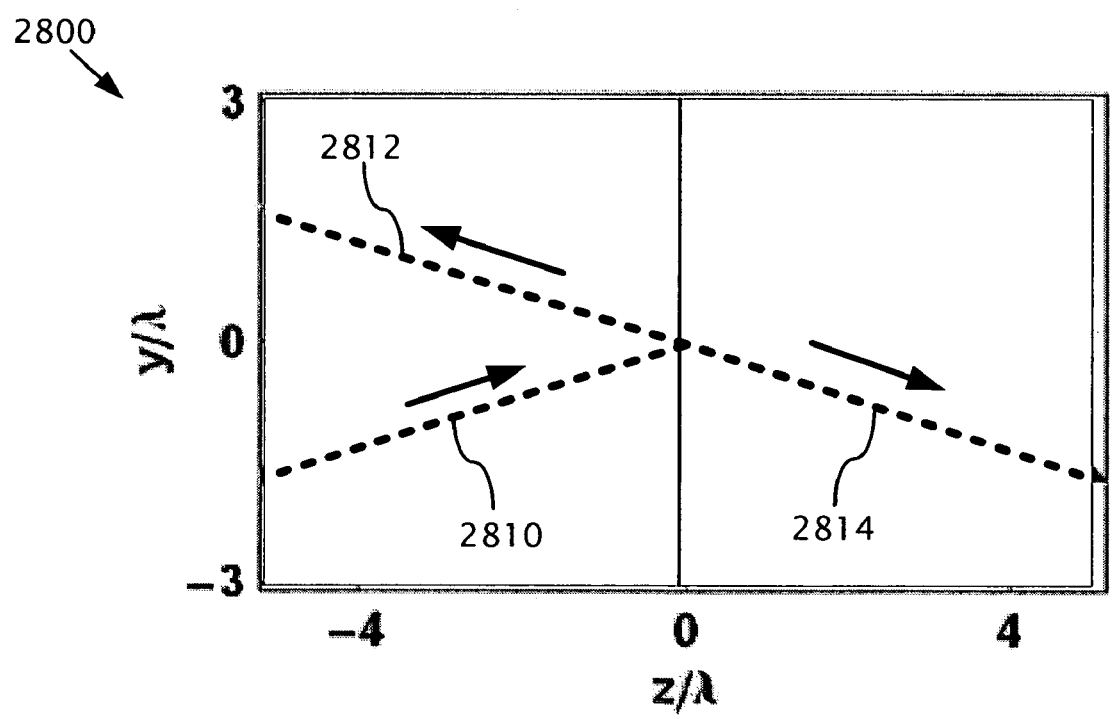
FIG. 28 is a diagram showing simulation results of the negative refraction of a single wave on the interface between an exemplary Si waveguide and an exemplary strongly anisotropic waveguide.

FIG. 28 is a diagram 2800 showing the results of simulations of the negative refraction of a single waveguide mode on the single interface between an Si waveguide (positive-n) and a strongly anisotropic waveguide (negative-n). In the simulations, a parallel slab of a strongly anisotropic material with $\epsilon_\parallel=2.329$, $\epsilon_\perp=-3.909$ (the n<0 waveguide) was located between two parallel slabs of waveguides with an Si core (the n>0 waveguides) with $\epsilon=13.0$. The angle of incidence was $\pi/10$, and the waveguide thickness d was 0.3 μm. The arrows indicate the direction of incident wave 2810, reflected wave 2812, and refracted wave 2814.

Simulations of energy emitted by a double-slit source were also performed, the results of which are shown in the respective diagrams 2900, 2902, 2904, 2906 of FIGS. 29A-D. In the simulations, it was assumed that the energy was emitted by a double-slit source with slit size w, positioned at $w \leq |x| \leq 2w$. The $k_y$ spectrum of such a monochromatic source can be given by:

$$A(k_y) = \frac{2}{k_y}[\sin(2wk_y) - \sin(wk_y)]. \tag{40}$$

As explained above, this spectrum contains the contributions from two fundamentally different types of waves: the ones where $|k_y|<|n\omega/c|$, which propagate away from the source, and the ones with $|k_y|>|n\omega/c|$, known as evanescent waves. The latter carry the information about subwavelength features ($<\lambda_0/|2n|$) of the source, and exponentially decay away from the source. The evanescent components can be restored (and correspondingly, the compression of radiation beyond the diffraction limit $\lambda_0/|2n|$ can be achieved) in the near-field proximity of the source. See, e.g., Poldolskiy, "Near-sighted Superlens," *Optics Letters* 30, 75 (2005). Far-field imaging and energy compression are naturally limited by the conventional diffraction limit.

The exemplary left-handed system simulated in FIGS. 29A-D was the same as that described above for FIG. 28. To calculate the resulting field distribution, the wave packet was represented at the z=0 plane as a linear combination of the waveguide modes. Boundary conditions at the front and back interfaces of the NIM region were used to calculate the reflection and transmission of individual mode. The solutions of Maxwell equations are then represented as a sum of solutions for the individual modes.

Figure 29A:
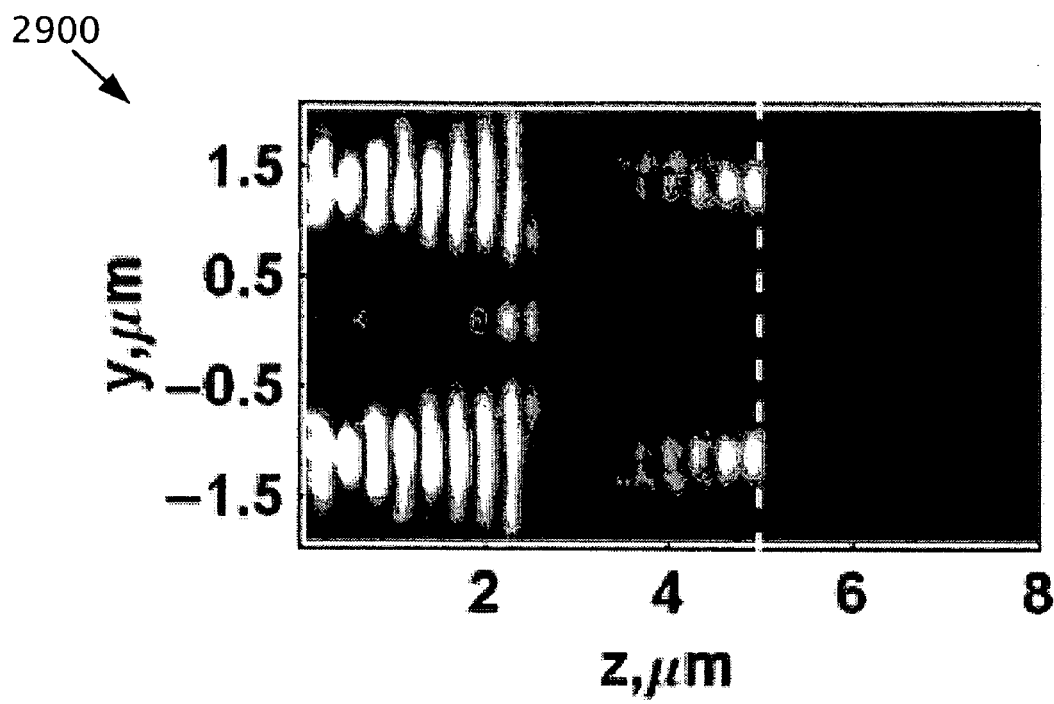
FIGS. 29A-D are images illustrating the imaging performance of exemplary waveguide embodiments of the disclosed technology.
Figure 29B:
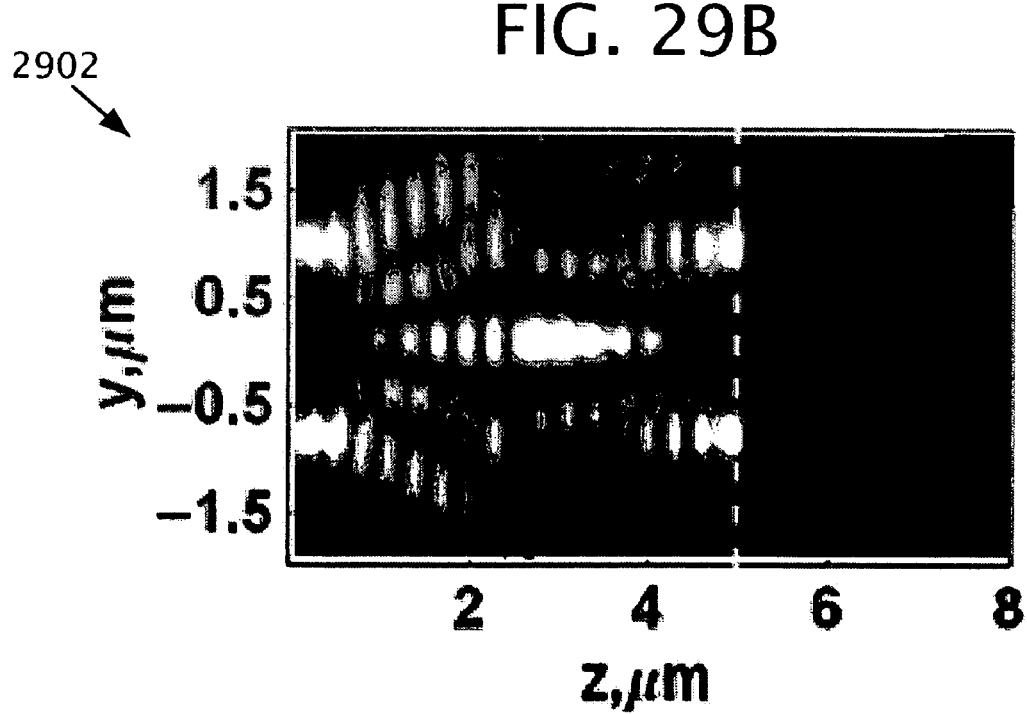
Figure 29C:
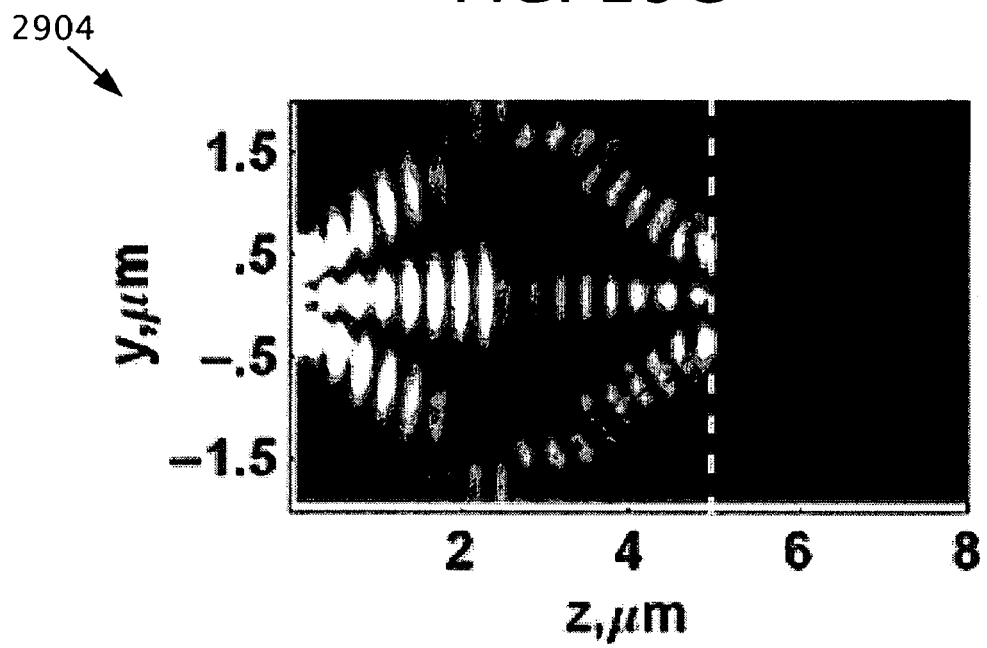

The imaging performance of the exemplary system is shown in FIGS. 29A-D. In FIGS. 29A-D, the LHM region extends from z=2.5 μm to z=5.0 μm. The focal plane corresponds to z=5.0 μm (shown as a white-dashed line). The slit size in FIG. 29A is w=0.8 μm; in FIG. 29B, w=0.6 μm; in FIG. 29C, w=0.3 μm and corresponds to the resolution limit of the system, and in FIG. 29D, w=0.15 μm, below the resolution limit of the system.

Figure 29D:
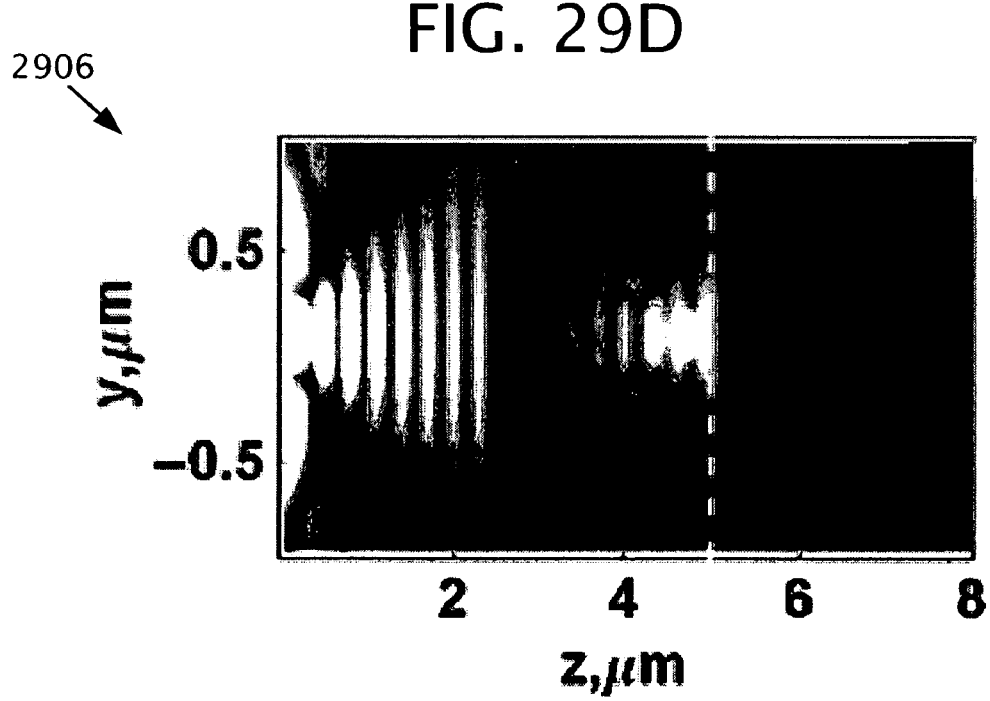

The far-field image formation in the focal plane (z=5 μm) and the appearance of the diffraction limit can be observed in FIGS. 29A-D. For example, when the slit size w is greater than the resolution limit ($\lambda/2n$), two distinct peaks can be seen, as in FIGS. 29A and 29B. When w approaches this limit as in FIG. 29C, the contrast at the focal plane weakens. In FIG. 29D, w is obviously below the diffraction limit ($\approx 0.3$ μm$\sim\lambda_0/5$), and the two subwavelength peaks have collapsed into a single diffraction-limited image.

Figure 30A:
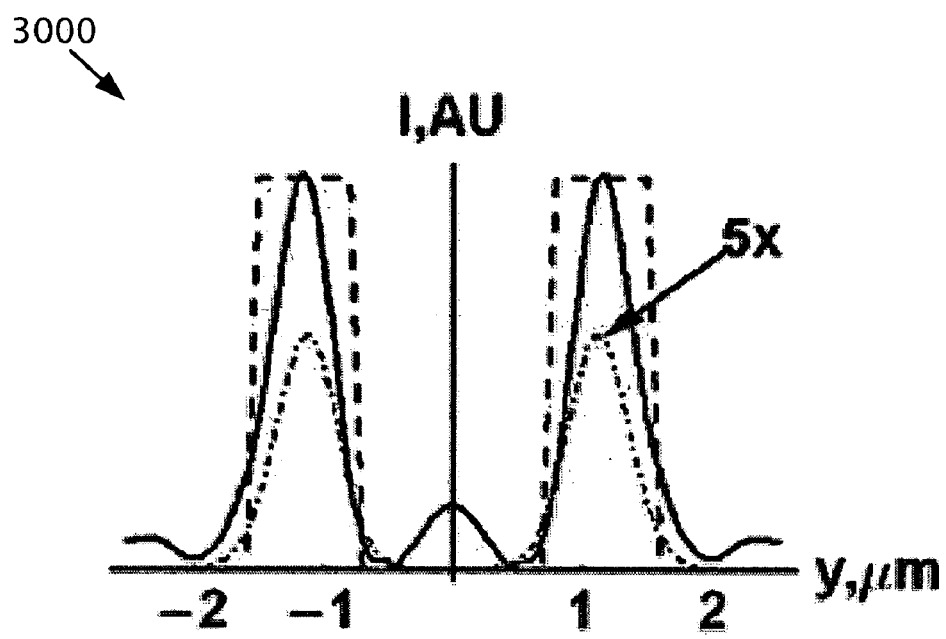
FIGS. 30A-B are graphs showing intensity as a function of displacement from the y-axis in the waveguide shown in FIGS. 29A-D for difference slit widths.
Figure 30B:
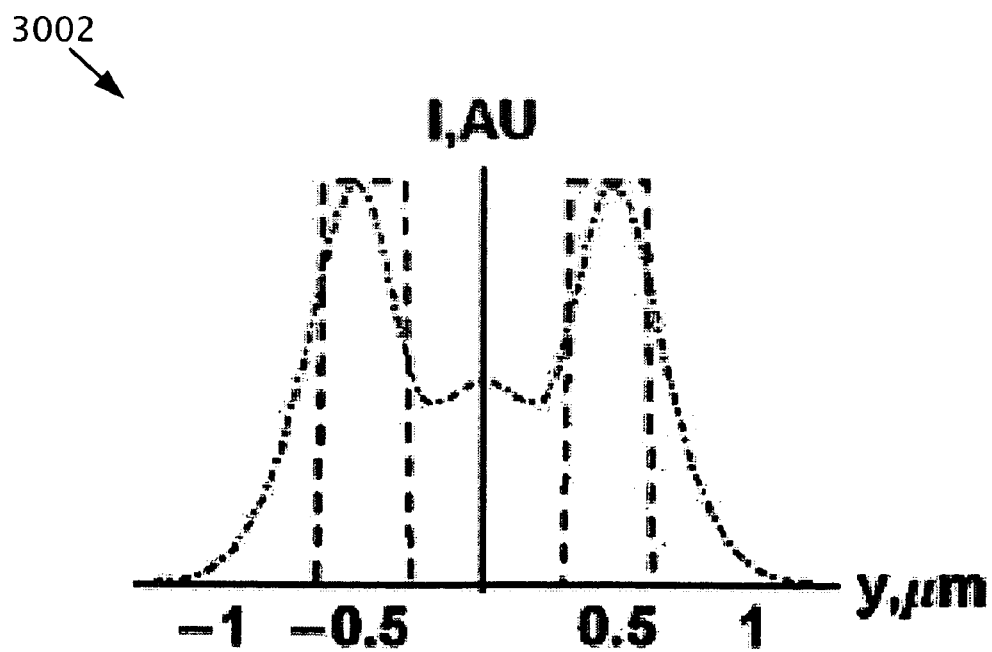

To better illustrate the imaging performance; the material absorption has been neglected in the calculations described above. However, it should be noted that the presence of relatively weak material losses do not substantially affect the resolution at the far-field limit of the system, and result only in a suppression of local intensity at the focal plane. In FIGS. 30A and 30B, for example, imaging through an exemplary planar NIM lens with and without the material absorption are compared. Graph 3000 in FIG. 30A, and graph 3002 in FIG. 30B, for example, show intensity as a function of displacement from the y-axis in the waveguide shown in FIGS. 29A-D. In FIGS. 30A and 30B, the dashed line corresponds to emitted radiation at the origin, the solid line corresponds to the focal-plane intensity distribution in the waveguide system, and the dash-dotted line is the same as the solid line but for the case of real (absorbing) NIM. In FIG. 30A, the slit size is w=0.75 μm, whereas in FIG. 30B, the slit size is w=0.3 μm. FIGS. 30A and 30B demonstrate that the presence of weak loss does not destroy the far-field imaging, although it does reduce the magnitude of the signal. The resolution $\Delta$ of the nonmagnetic NIM structure presented here is limited by the internal wavelength: $\Delta=\lambda_{in}/2=\lambda/|2n|=0.3$ μm, similar to the resolution of any far-field imaging system.

FIGS. 31A-C and 32A-C show additional diagrams 3100, 3102, 3104 and 3200, 3202, 3204 of imaging simulations for exemplary planar LHM structures. To generate the data for these figures, Maxwell's equations were numerically solved for the exemplary structure shown in FIGS. 1 and 6. In the numerical simulations, a single-mode excitation with $\varkappa=k/2$ was assumed. Further, because the principle application being investigated in the simulations concerned THz frequencies, the waveguide walls were assumed to have infinite conductivity.

In the illustrated simulations, a source of EM radiation was located at the origin (inside the RHM part of the structure), and its radiated wave was represented as a series of propagating TM modes with the same frequency and mode parameter $\varkappa$. The transmission and reflection coefficients were determined for each radiation component at the front ($z=2\lambda$) and back ($z=6\lambda$) interfaces of the LHM insert, and the EM field throughout the system was computed.

Figure 31A:
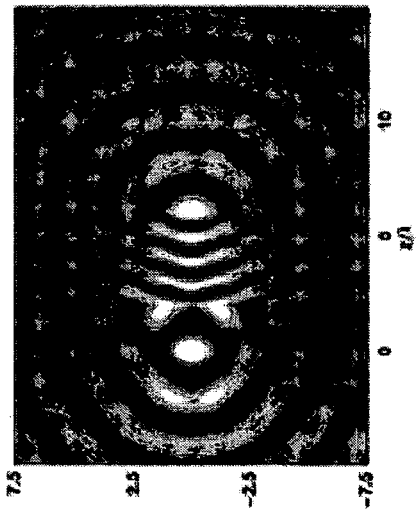
FIGS. 31A-C and FIGS. 32A-C are images illustrating the imaging performance of additional exemplary waveguide embodiments of the disclosed technology.
Figure 31B:
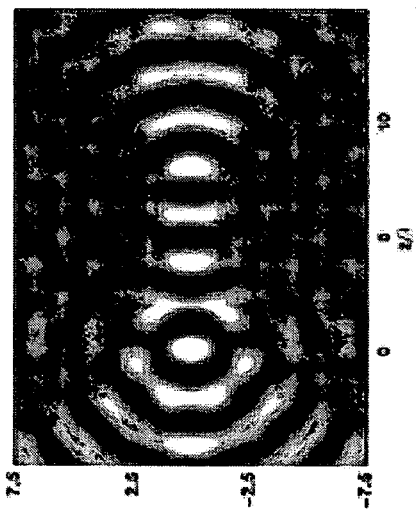
Figure 31C:
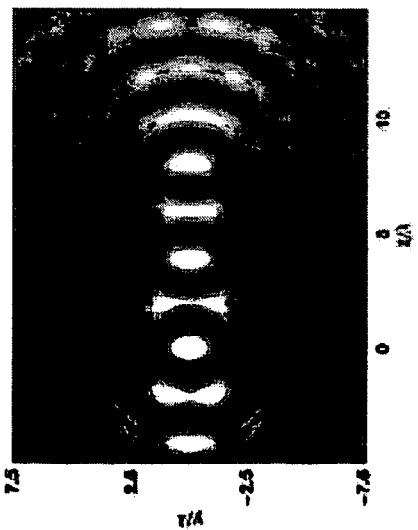
Figure 32A:
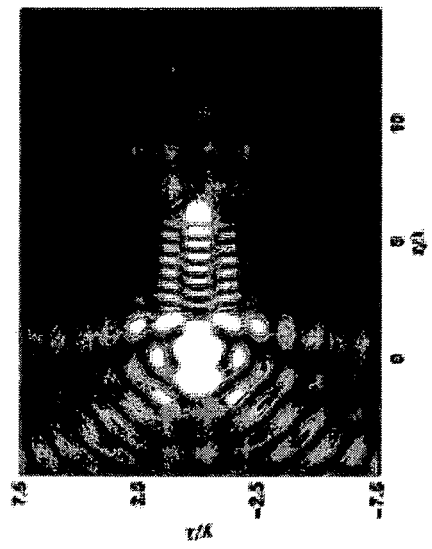
Figure 32B:
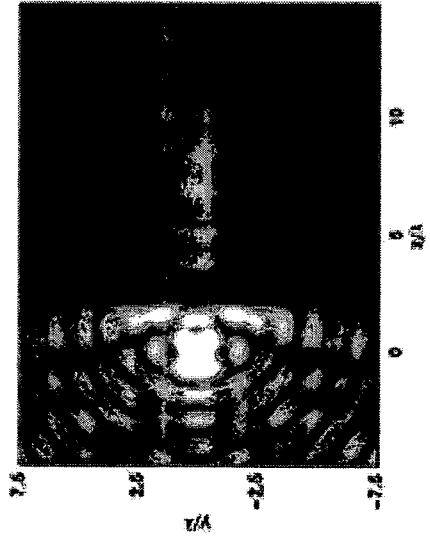
Figure 32C:
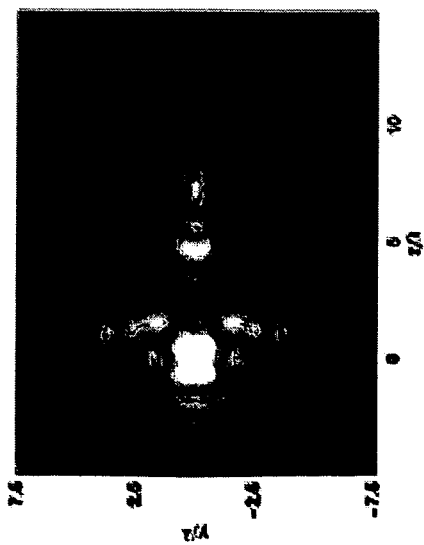

The corresponding diagrams 3100, 3102, 3104 in FIGS. 31A-C and diagram 3200, 3202, 3204 in FIGS. 32A-C represent the same imaging processes, but show either the value of the z component of the field (FIGS. 31A-C) or the total intensity at a given point (FIGS. 32A-C). FIGS. 31A-C and FIGS. 32A-C show three different cases: (i) the case of a complete $\in$-v match between the LHM and RHM region (FIG. 31A and FIG. 32A), (ii) the case when RHM and LHM structures have the same refraction index, but the constitutive parameters are not matched (FIG. 31B and FIG. 32B), and (iii) the case when no parameters matched (FIG. 31C and FIG. 32C).

More specifically, FIGS. 31A-C show simulation results of imaging using an embodiment of the disclosed LHM structure. In the figures, the electric field component $D_z$ is plotted and the left-handed material is extended from $z/\lambda=2$ to $z/\lambda=6$. Diagram 3100 in FIG. 31A shows imaging through an $\in$-v matched system ($\in_{RHM}=\in_{LHM}=1/2$, $v_{RHM}=-v_{LHM}=1/2$), diagram 3102 in FIG. 31B shows imaging through an n-matched system ($\in_{RHM}=1/2$, $\in_{LHM}=-1/4$, $v_{RHM}=1/2$, $v_{LHM}=-1$), and diagram 3104 of FIG. 31C shows imaging through the non-matched left-handed system ($\in_{RHM}=1/2$, $\in_{LHM}=-1$, $v_{RHM}=1/2$, $v_{LHM}=-1$). FIGS. 32A-C correspond to FIGS. 31A-C but show the total intensity $I \propto E_x^2+E_y^2+E_z^2$.

In each of the diagrams shown in FIGS. 31A-C and 32A-C, the formation of two images by the exemplary LHM slab can be identified. The first image is formed inside the left-handed structure, while the second one appears in the right "right-handed" system. Note that the mismatch between the refractive index of right- and left-handed media in the illustrated cases do not lead to a significant deterioration of the image quality. Further, if the source is positioned inside the LHM structure, one can effectively obtain two images on both sides of LHM region. This particular application can be useful, for example, for lasers based on sub-wavelength waveguides.

Having illustrated and described the principles of the illustrated embodiments, it will be apparent to those skilled in the art that the embodiments can be modified in arrangement and detail without departing from such principles. For example, the inclusion-based embodiments may comprise dielectric inclusions (e.g., apertures) embedded in a metallic host. Moreover, any of the waveguide embodiments may include additional boundaries (e.g., along the y-z plane, thereby enclosing the core material). Furthermore, the disclosed technology is not limited to any particular radiation frequency range.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. A waveguide structure, comprising:
   a first waveguide border element having a first substantially planar surface;
   a second waveguide border element spaced apart from the first waveguide border element and having a second substantially planar surface; and
   a core material positioned between the first substantially planar surface and the second substantially planar surface, the core material having a positive in-plane dielectric constant and a negative perpendicular-to-plane dielectric constant,
   wherein the first waveguide border element, the second waveguide border element, and the core material form a nonmagnetic waveguide exhibiting a negative index of refraction for electromagnetic radiation in a frequency range.

2. The waveguide structure of claim 1, wherein the waveguide exhibits the negative index of refraction for electromagnetic radiation in the frequency range of about $1 \times 10^9$ Hz to $1 \times 10^{15}$ Hz.

3. The waveguide structure of claim 1, wherein the waveguide exhibits the negative index of refraction for electromagnetic radiation in the frequency range of about $3 \times 10^{12}$ Hz to $7.5 \times 10^{14}$ Hz.

4. The waveguide structure of claim 1, wherein the core material comprises a composite of inclusions having a negative dielectric constant embedded in a host material having a positive dielectric constant.

5. The waveguide structure of claim 1, wherein the core material comprises inclusions distributed substantially homogenously in a host medium.

6. A waveguide structure, comprising:
   a first waveguide border element having a first substantially planar surface:
   a second waveguide border element spaced apart from the first waveguide border element and having a second substantially planar surface; and
   a core material positioned between the first substantially planar surface and the second substantially planar surface, the core material having a positive in-plane dielectric constant and a negative perpendicular-to-plane dielectric constant, wherein the first waveguide border element, the second waveguide border element, and the core material form a waveguide exhibiting a negative index of refraction for electromagnetic radiation in a frequency range, and wherein the core material comprises a composite of substantially spheroidal inclusions anisotropically distributed in a host material.

7. A waveguide structure, comprising:

a first waveguide border element having a first substantially planar surface;

a second waveguide border element spaced apart from the first waveguide border element and having a second substantially planar surface; and a core material positioned between the first substantially planar surface and the second substantially planar surface, the core material having a positive in-plane dielectric constant and a negative perpendicular-to-plane dielectric constant, wherein the first waveguide border element, the second waveguide border element, and the core material form a waveguide exhibiting a negative index of refraction for electromagnetic radiation in a frequency range, and wherein the core material comprises a composite of spheroidal inclusions distributed in an anisotropic host material.

8. The waveguide structure of claim 1, wherein the core material comprises a composite of substantially wire-shaped inclusions having major axes that are substantially aligned with one another in a host material.

9. A waveguide structure, comprising:

a first waveguide border element having a first substantially planar surface;

a second waveguide border element spaced apart from the first waveguide border element and having a second substantially planar surface; and a core material positioned between the first substantially planar surface and the second substantially planar surface, the core material having a positive in-plane dielectric constant and a negative perpendicular-to-plane dielectric constant, wherein the first waveguide border element, the second waveguide border element, and the core material form a waveguide exhibiting a negative index of refraction for electromagnetic radiation in a frequency range, and wherein the core material comprises a material with an anisotropic effective electron mass.

10. The waveguide structure of claim 1, wherein the core material comprises a layered structure.

11. The waveguide structure of claim 10, wherein at least some of the layers of the layered structure have thicknesses that are less than the wavelengths in the frequency range.

12. A waveguide structure, comprising:

a first waveguide border element having a first substantially planar surface;

a second waveguide border element spaced apart from the first waveguide border element and having a second substantially planar surface; and a core material positioned between the first substantially planar surface and the second substantially planar surface, the core material having a positive in-plane dielectric constant and a negative perpendicular-to-plane dielectric constant, wherein the first waveguide border element, the second waveguide border element, and the core material form a waveguide exhibiting a negative index of refraction for electromagnetic radiation in a frequency range, wherein the core material comprises a layered structure, and wherein at least two of the layers contain materials with respective dielectric constants having opposite signs for at least one polarization of electromagnetic radiation.

13. The waveguide structure of claim 1, wherein at least one of the waveguide border elements is solid, liquid, gaseous, or a vacuum.

14. A method comprising imaging an object using the waveguide of claim 1.

15. A method comprising modifying amplitude, phase information, or both amplitude and phase information of electromagnetic radiation using the waveguide of claim 1.

16. A waveguide configured to propagate electromagnetic radiation in a waveguide plane, the waveguide comprising:

a core having opposing substantially planar surfaces and a positive magnetic permeability, the thickness of the core being selected such that the core exhibits a negative refractive index and the positive magnetic permeability for incident electromagnetic waves in a desired frequency range.

17. The waveguide of claim 16, wherein the core has a positive dielectric constant in the selected frequency range in directions substantially parallel to the waveguide plane, and a negative dielectric constant in the selected frequency range in directions substantially perpendicular to the waveguide plane.

18. The waveguide of claim 16, wherein the core comprises a material with an anisotropic effective electron mass.

19. The waveguide of claim 16, wherein the core comprises nanowire inclusions in a host material.

20. The waveguide of claim 16, wherein the core comprises at least a first layer of material having a negative dielectric constant and a second layer having a positive dielectric constant, the second layer being adjacent the first layer.

21. A method comprising imaging an object using the waveguide of claim 16.

22. A method comprising modifying amplitude, phase information, or both amplitude and phase information of electromagnetic radiation using the waveguide of claim 16.

23. The waveguide structure of claim 1, wherein the core material comprises:

a host medium; and a plurality of anisotropically-shaped inclusions embedded in the host medium, the inclusions being substantially oriented in a common direction such that the core material exhibits the positive in-plane dielectric constant and the negative perpendicular-to-plane dielectric constant for incident electromagnetic radiation in the frequency range, wherein the inclusions and the host medium further have positive magnetic permeabilities.

24. The waveguide structure of claim 23, wherein a range of wavelengths for the incident electromagnetic radiation in the frequency range is about $1 \times 10^{-7}$ meters to $3 \times 10^{-1}$ meters.

25. The waveguide structure of claim 23, wherein the core material is a substantially planar slab sandwiched between the first waveguide border element and the second waveguide border element.

26. The waveguide structure of claim 23, wherein the inclusions have a negative dielectric constant and the host medium has a positive dielectric constant.

27. The waveguide structure of claim 23, wherein the inclusions are formed from either a plasmonic material or doped semiconductor.

28. The waveguide structure of claim 23, wherein the inclusions are formed from one of gold, silver, copper, aluminum, or silicon carbide.

29. The waveguide structure of claim 23, wherein the inclusions are substantially wire-shaped.

30. The waveguide structure of claim 23, wherein the host medium is substantially a dielectric.

31. A lens comprising the waveguide structure of claim 23.

32. The waveguide structure of claim 1, wherein the core material comprises:
   a host medium; and
   a plurality of isotropically-shaped inclusions embedded in the host medium, the inclusions being substantially anisotropically distributed throughout the host medium such that the waveguide structure exhibits the positive in-plane dielectric constant and the negative perpendicular-to-plane dielectric constant for incident electromagnetic radiation within the frequency range,
   wherein the inclusions and the host medium further have positive magnetic permeabilities.

33. The waveguide structure of claim 32, wherein a range of wavelengths for the electromagnetic radiation in the frequency range is about $1 \times 10^{-7}$ meters to $3 \times 10^{-1}$ meters.

34. The waveguide structure of claim 32, wherein the inclusions have a negative dielectric constant and the host medium has a positive dielectric constant.

35. The waveguide structure of claim 32, wherein the inclusions are formed from either a plasmonic material or doped semiconductor.

36. The waveguide structure of claim 32, wherein the inclusions are formed from one of gold, silver, copper, aluminum, or silicon carbide.

37. The waveguide structure of claim 32, wherein the inclusions are formed from a material with a substantially negative dielectric permittivity in the frequency range.

38. The waveguide structure of claim 32, wherein the host medium is substantially a dielectric.

39. The waveguide structure of claim 32, wherein the inclusions comprise apertures in the host medium.

40. The waveguide structure of claim 32, wherein the inclusion size is substantially equal to or less than the frequency range.

41. A lens comprising the waveguide structure of claim 32.

42. The waveguide of claim 16, wherein the core comprises a plurality of layers, the plurality of layers including:
   a first layer having a positive dielectric constant; and
   a second layer having a negative dielectric constant, the second layer being adjacent the first layer,
   the waveguide structure exhibiting a positive effective dielectric constant along a first plane and a negative effective dielectric constant along a second plane perpendicular to the first plane for incident radiation in the desired frequency range,
   wherein respective thicknesses of the first and the second layers are less than the wavelengths in the range of wavelengths.

43. The waveguide of claim 42, wherein the range of wavelengths for the incident electromagnetic radiation in the desired frequency range is about $1 \times 10^{-7}$ meters to $3 \times 10^{-1}$ meters.

44. The waveguide of claim 42, wherein the first layer is formed from either a plasmonic material or doped semiconductor, and wherein the second layer is formed from a dielectric.

45. The waveguide of claim 42, wherein the first layer is formed from one of gold, silver, copper, aluminum, or silicon carbide.

46. The waveguide of claim 42, wherein the second layer is formed from silicon or gallium arsenide.

47. A lens comprising the waveguide of claim 42.

* * * * *